US011830151B2

United States Patent
Tate-Gans et al.

(10) Patent No.: US 11,830,151 B2
(45) Date of Patent: *Nov. 28, 2023

(54) METHODS AND SYSTEM FOR MANAGING AND DISPLAYING VIRTUAL CONTENT IN A MIXED REALITY SYSTEM

(71) Applicant: Magic Leap, Inc., Plantation, FL (US)

(72) Inventors: June Tate-Gans, Tamarac, FL (US); Eric Norman Yiskis, Boca Raton, FL (US); Mark Ashley Rushton, Fort Lauderdale, FL (US); David William Hover, Tamarac, FL (US); Praveen Babu J D, Plantation, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/241,977

(22) Filed: Apr. 27, 2021

(65) Prior Publication Data

US 2021/0248831 A1    Aug. 12, 2021

Related U.S. Application Data

(63) Continuation of application No. 16/224,719, filed on Dec. 18, 2018, now Pat. No. 11,024,086.
(Continued)

(51) Int. Cl.
*G06T 19/00* (2011.01)
*G06T 15/08* (2011.01)
(Continued)

(52) U.S. Cl.
CPC ............ *G06T 19/006* (2013.01); *G06T 7/70* (2017.01); *G06T 15/08* (2013.01); *G06T 19/20* (2013.01);
(Continued)

(58) Field of Classification Search
CPC ......... G06T 19/006; G06T 7/70; G06T 15/08; G06T 19/20; G06T 2210/12; G06T 2219/2004; G06T 2219/2016
See application file for complete search history.

(56) References Cited

U.S. PATENT DOCUMENTS

| 5,923,318 A | 7/1999 | Zhai et al. |
| 6,629,065 B1 | 9/2003 | Gadh et al. |

(Continued)

FOREIGN PATENT DOCUMENTS

| AU | 2018261328 B2 | 8/2022 |
| CN | 103460256 | 12/2013 |

(Continued)

OTHER PUBLICATIONS

Wade et al. "A Gaze-Contingent Adaptive Virtual Reality Driving Environment for Intervention in Individuals with Autism Spectrum Disorders", 2016, ACM (Year: 2016).*

(Continued)

*Primary Examiner* — YuJang Tswei
(74) *Attorney, Agent, or Firm* — Vista IP Law Group, LLP

(57) ABSTRACT

Disclosed is an approach for managing and displaying virtual content in a mixed reality environment on a one-on-one basis independently by each application, each virtual content is rendered by its respective application into a bounded volume referred herein as a "Prism." Each Prism may have characteristics and properties that allow a universe application to manage and display the Prism in the mixed reality environment such that the universe application may manage the placement and display of the virtual content in the mixed reality environment by managing the Prism itself.

28 Claims, 43 Drawing Sheets

Related U.S. Application Data

(60) Provisional application No. 62/610,101, filed on Dec. 22, 2017.

(51) Int. Cl.
*G06T 19/20* (2011.01)
*G06T 7/70* (2017.01)

(52) U.S. Cl.
CPC .. *G06T 2210/12* (2013.01); *G06T 2219/2004* (2013.01); *G06T 2219/2016* (2013.01)

(56) References Cited

U.S. PATENT DOCUMENTS

| | | |
|---|---|---|
| 6,720,949 B1 | 4/2004 | Pryor et al. |
| 8,912,979 B1 | 12/2014 | Gomez |
| 8,924,862 B1 | 12/2014 | Luo |
| 9,411,422 B1 | 8/2016 | McClendon et al. |
| 9,671,566 B2 | 6/2017 | Abovitz et al. |
| 9,734,633 B2* | 8/2017 | Bennett ................ G06T 19/006 |
| 9,761,055 B2 | 9/2017 | Miller |
| 10,803,663 B2* | 10/2020 | Wang ..................... G06F 3/011 |
| 2002/0033845 A1 | 3/2002 | Elber et al. |
| 2006/0193510 A1* | 8/2006 | Matsumoto ............. G06T 15/06 |
| | | 382/154 |
| 2008/0115081 A1 | 5/2008 | Sankaravadivelu et al. |
| 2009/0089364 A1 | 4/2009 | Hamilton, II et al. |
| 2012/0030617 A1 | 2/2012 | Louch |
| 2012/0131496 A1 | 5/2012 | Goossens et al. |
| 2012/0179426 A1 | 7/2012 | Fontes et al. |
| 2012/0212484 A1 | 8/2012 | Haddick et al. |
| 2012/0249741 A1 | 10/2012 | Maciocci et al. |
| 2012/0266101 A1 | 10/2012 | Shah |
| 2012/0294539 A1 | 11/2012 | Lim et al. |
| 2013/0278631 A1 | 10/2013 | Border et al. |
| 2013/0342572 A1 | 12/2013 | Poulos et al. |
| 2014/0002444 A1 | 1/2014 | Bennett et al. |
| 2014/0118397 A1 | 5/2014 | Lee et al. |
| 2014/0168262 A1 | 6/2014 | Forutanpour et al. |
| 2014/0184496 A1 | 7/2014 | Gribetz et al. |
| 2014/0195988 A1* | 7/2014 | Kramer ................... G06F 3/017 |
| | | 715/863 |
| 2014/0200863 A1 | 7/2014 | Kamat et al. |
| 2014/0225922 A1 | 8/2014 | Sbardella |
| 2014/0232639 A1 | 8/2014 | Hayashi et al. |
| 2014/0237393 A1* | 8/2014 | Van Wie ................ G06Q 10/10 |
| | | 715/757 |
| 2014/0248950 A1 | 9/2014 | Tosas Bautista |
| 2014/0267228 A1* | 9/2014 | Ofek ........................ G06T 19/20 |
| | | 345/419 |
| 2014/0306866 A1 | 10/2014 | Miller et al. |
| 2014/0337792 A1 | 11/2014 | Phang et al. |
| 2014/0375683 A1 | 12/2014 | Salter et al. |
| 2015/0143302 A1 | 5/2015 | Chang et al. |
| 2015/0163345 A1* | 6/2015 | Cornaby ............. G06F 3/04817 |
| | | 345/633 |
| 2015/0185825 A1 | 7/2015 | Mullins |
| 2015/0206343 A1 | 7/2015 | Mattila et al. |
| 2015/0206349 A1 | 7/2015 | Rosenthal et al. |
| 2015/0253862 A1 | 9/2015 | Seo et al. |
| 2015/0268831 A1 | 9/2015 | Sripada |
| 2015/0277699 A1 | 10/2015 | Algreatly |
| 2015/0302651 A1 | 10/2015 | Shpigelman |
| 2015/0317831 A1 | 11/2015 | Ebstyne et al. |
| 2015/0331240 A1 | 11/2015 | Poulos et al. |
| 2015/0332509 A1 | 11/2015 | Jovanovic |
| 2016/0026253 A1 | 1/2016 | Bradski et al. |
| 2016/0027214 A1 | 1/2016 | Memmott et al. |
| 2016/0048204 A1 | 2/2016 | Scott et al. |
| 2016/0077677 A1 | 3/2016 | Valdes |
| 2016/0180602 A1 | 6/2016 | Fuchs |
| 2016/0210602 A1 | 7/2016 | Siddique et al. |
| 2016/0300392 A1 | 10/2016 | Jonczyk et al. |
| 2016/0321378 A1 | 11/2016 | Kagan et al. |
| 2017/0011557 A1 | 1/2017 | Lee et al. |
| 2017/0046881 A1 | 2/2017 | Kuribara |
| 2017/0052994 A1 | 2/2017 | Jain et al. |
| 2017/0054569 A1* | 2/2017 | Harms ..................... H04W 4/33 |
| 2017/0060514 A1 | 3/2017 | Kaufthal |
| 2017/0109936 A1 | 4/2017 | Powderly et al. |
| 2017/0132835 A1 | 5/2017 | Halliday et al. |
| 2017/0235848 A1 | 8/2017 | Van Dusen et al. |
| 2017/0256096 A1* | 9/2017 | Faaborg ................ G06T 19/003 |
| 2017/0256099 A1 | 9/2017 | Li |
| 2017/0258526 A1 | 9/2017 | Lang |
| 2017/0287218 A1 | 10/2017 | Nuernberger et al. |
| 2018/0004283 A1 | 1/2018 | Mathey-Owens et al. |
| 2018/0005034 A1 | 1/2018 | Kaehler et al. |
| 2018/0012330 A1 | 1/2018 | Holzer et al. |
| 2018/0033204 A1 | 2/2018 | Dimitrov et al. |
| 2018/0045963 A1 | 2/2018 | Hoover et al. |
| 2018/0082480 A1 | 3/2018 | White et al. |
| 2018/0095276 A1 | 4/2018 | Ng-Thow-Hing |
| 2018/0101994 A1* | 4/2018 | Da Veiga ............ G06F 3/04812 |
| 2018/0131788 A1 | 5/2018 | Roberts |
| 2018/0144111 A1 | 5/2018 | Katingari |
| 2018/0144556 A1 | 5/2018 | Champion et al. |
| 2018/0150204 A1 | 5/2018 | Macgillivray |
| 2018/0210206 A1 | 7/2018 | Eronen et al. |
| 2018/0225885 A1 | 8/2018 | Dishno |
| 2018/0349485 A1 | 12/2018 | Carlisle et al. |
| 2018/0365897 A1* | 12/2018 | Pahud ................... G06F 3/1454 |
| 2018/0374143 A1 | 12/2018 | Williamson et al. |
| 2019/0005724 A1 | 1/2019 | Pahud et al. |
| 2019/0025999 A1 | 1/2019 | Murphy et al. |
| 2019/0043259 A1* | 2/2019 | Wang ..................... G06F 3/012 |
| 2019/0079648 A1 | 3/2019 | Karunamuni et al. |
| 2019/0156585 A1 | 5/2019 | Mott et al. |
| 2019/0197785 A1 | 6/2019 | Tate-gans et al. |
| 2021/0097775 A1 | 4/2021 | Zurmoehle et al. |

FOREIGN PATENT DOCUMENTS

| | | |
|---|---|---|
| CN | 105229719 | 1/2016 |
| EP | 1556805 | 8/2011 |
| JP | 2009-518699 | 5/2009 |
| JP | 2010-534974 | 11/2010 |
| JP | 2014-515962 | 7/2014 |
| JP | 2016-500891 | 1/2016 |
| JP | 2016-508257 | 3/2016 |
| JP | 2016-511492 | 4/2016 |
| KR | 10-2014-0071086 | 6/2014 |
| KR | 10-2017-0018930 | 2/2017 |
| WO | WO 2007/038090 | 4/2007 |
| WO | WO 2015/033377 | 3/2015 |
| WO | WO 2016/203792 | 12/2016 |
| WO | WO 2017/040442 | 3/2017 |
| WO | WO 2017/062289 | 4/2017 |

OTHER PUBLICATIONS

Foreign OA for JP Patent Appln. No. 2020-534227 dated May 20, 2022 with English translation.

PCT International Search Report and Written Opinion for International Appln. No. PCT/US20/26656, Applicant Magic Leap, Inc., dated Jun. 22, 2020 (13 pages).

Non-Final Office Action for U.S. Appl. No. 16/839,727 dated Feb. 10, 2021.

Amendment Response to NFOA for U.S. Appl. No. 16/839,727 dated May 10, 2021.

Notice of Allowance for U.S. Appl. No. 16/971,603 dated Feb. 18, 2021.

PCT International Search Report and Written Opinion for International Appln. No. PCT/US19/18920, Applicant Magic Leap, Inc., dated May 14, 2019.

Foreign OA for CN Patent Appln. No. 201880043910.4 dated May 31, 2021.

Non-Final Office Action for U.S. Appl. No. 17/142,210 dated Aug. 5, 2021.

Foreign Response for EP Patent Appln. No. 18891755.3 dated Jul. 29, 2021.

(56) References Cited

OTHER PUBLICATIONS

Extended European Search Report for EP Patent Appln. No. 19756664.9 dated Mar. 29, 2021.
RCE and Amendment Response to FOA for U.S. Appl. No. 16/839,727, filed Sep. 30, 2021.
Foreign Response for EP Patent Appln. No 19756664.9 dated Oct. 25, 2021.
Foreign Response for EP Patent Appln. No. 19757809.9 dated Oct. 22, 2021.
Foreign Exam Report for AU Patent Appln. No. 2018261328 dated Sep. 6, 2021.
Foreign OA for JP Patent Appln. No. 2019-559343 dated Oct. 6, 2021 (with English translation).
Uchiyama, H., et al., "Method for Displaying Images on Urban Structures by Augmented Reality," IEICE technical report, JP, The Institute of Electronics, Information and Communication Engineers, Mar. 22, 2012, vol. 111 No. 499, 141-146.
Foreign OA for CN Patent Appln. No. 201880043910.4 dated Jan. 5, 2022.
Foreign OA for KR Patent Appln. No. 10-2019-7035273 dated Sep. 16, 2021.
Foreign OA for KR Patent Appln. No. 10-2019-7035273 dated Jan. 18, 2022.
Final Office Action for U.S. Appl. No. 16/839,727 dated Jun. 30, 2021.
Non-Final Office Action for U.S. Appl. No. 16/839,727 dated Nov. 9, 2021.
Amendment Response for U.S. Appl. No. 16/839,727 dated Feb. 7, 2022.
Foreign Exam Report for IN Patent Appln. No. 201947046799 dated Feb. 11, 2022.
Notice of Allowance for U.S. Appl. No. 17/142,210 dated Feb. 18, 2022.
Non-Final Office Action for U.S. Appl. No. 17/368,495 dated Feb. 25, 2022.
Notice of Allowance for U.S. Appl. No. 16/839,727 dated Feb. 28, 2022.
Foreign OA for JP Patent Appln. No. 2020-544237 dated Feb. 21, 2022 (with English translation).
Foreign FOA for JP Patent Appln. No. 2019-559343 dated Mar. 8, 2022 (with English translation).
Foreign OA for IL Patent Appln. No. 270249 dated Jan. 28, 2022.
Foreign Response for CN Patent Appln. No. 201880043910.4 dated Mar. 16, 2022.
Foreign Response for KR Patent Appln. No. 10-2019-7035273 dated Mar. 15, 2022.
Foreign OA for JP Patent Appln. No. 2020-544190 dated Mar. 15, 2022 (with English translation).
Foreign Rejection Decision for CN Patent Appln. No. 201880043910.4 dated Apr. 29, 2022 (with English translation).
Foreign Response for JP Patent Appln. No. 2020-544237 dated May 17, 2022.
Foreign NOA for KR Patent Appln. No. 10-2019-7035273 dated May 9, 2022.
Amendment Response to NFOA for U.S. Appl. No. 17/368,495 dated May 25, 2022.
Foreign OA for JP Patent Appln. No. 2020-534227 dated May 20, 2022.
Foreign Response for IL Patent Appln. No. 270249 dated May 26, 2022.
Foreign Response for EP Patent Appln. No. 18794284.2 dated Jun. 3, 2022.
Foreign Response for JP Patent Appln. No. 2019-559343 dated Jun. 7, 2022.
Foreign Response for JP Patent Appln. No. 2020-544190 dated Jun. 13, 2022.
Foreign NOA for JP Patent Appln. No. 2020-544190 dated Jun. 24, 2022.
Foreign OA for JP Patent Appln. No. 2022-143449 dated Nov. 1, 2022.
Foreign NOA for JP Patent Appln. No. 2020-534227 dated Nov. 15, 2022.
Foreign Response for CN Patent Appln. No. 201880043910.4 dated Nov. 18, 2022.
Non-Final Office Action for U.S. Appl. No. 17/663,792 dated Nov. 22, 2022.
Notice of Allowance for U.S. Appl. No. 15/968,673 dated Jul. 15, 2020.
PCT Notification of the International Search Report and Written Opinion dated Jul. 11, 2018 for PCT Application No. PCT/US2018/030535, Applicant Magic Leap, Inc., 14 pages.
Extended European Search Report for EP Appln. No. 18794284.2 dated Jan. 29, 2020 (7 pages).
Foreign Response to 70(2) for EP Patent Appln. No. 18794284.2 dated Aug. 28, 2020.
Non-Final Office Action for U.S. Appl. No. 15/968,673 dated Oct. 17, 2019.
Final Office Action for U.S. Appl. No. 15/968,673 dated Mar. 30, 2020.
Amendment Response to Non-Final Office Action for U.S. Appl. No. 15/968,673 dated Jan. 17, 2020.
Amendment Response to Final Office Action for U.S. Appl. No. 15/968,673 dated Jun. 26, 2020.
Non-Final Office Action for U.S. Appl. No. 16/281,540 dated May 4, 2020.
Amendment Response to Non-Final Office Action for U.S. Appl. No. 16/281,540 dated Aug. 4, 2020.
PCT International Search Report and Written Opinion for International Appln. No. PCT/US2019/018932, Applicant Magic Leap, Inc., forms PCT/ISA/210, 220, and 237, dated May 14, 2019.
Non-Final Office Action for U.S. Appl. No. 16/224,719 dated Feb. 6, 2020.
Final Office Action for U.S. Appl. No. 224719 dated Jun. 18, 2020.
Amendment Response to Non-Final Office Action for U.S. Appl. No. 16/224,719 dated May 6, 2020.
IT Jungles, "iPhone—How to Move Re-arrange Home Screen Icons", Mar. 15, 2015, YouTube.com (Year: 2015).
PCT Invitation to Pay Additional Fees for International Patent Appln. No. PCT/US18/66331, Applicant Magic Leap Inc., form PCT/ISA/206, dated Mar. 13, 2019 (3 pages).
PCT International Search Report and Written Opinion for International Patent Appln. No. PCT/US18/66331, Applicant Magic Leap Inc., forms PCT/ISA/210, 220, and 237, dated May 8, 2019 (11 pages).
Amendment After Final for U.S. Appl. No. 16/224,719 dated Sep. 18, 2020.
Non-Final Office Actino for U.S. Appl. No. 16/224,719 dated Oct. 5, 2020.
Notice of Allowance for U.S. Appl. No. 15/968,673 dated Oct. 7, 2020.
Final Office Action for U.S. Appl. No. 16/281,540 dated Oct. 27, 2020.
Amendment Response to NFOA for U.S. Appl. No. 16/224,719 dated Jan. 5, 2021.
RCE and Response to Final Office Action for U.S. Appl. No. 16/281,540, filed Jan. 27, 2021.
Notice of Allowance for U.S. Appl. No. 16/224,719 dated Jan. 27, 2021.
Notice of Allowance for U.S. Appl. No. 16/281,540 dated Feb. 11, 2021.
Extended European Search Report for EP Appln. No. 18891755.3 dated Dec. 23, 2020 (9 pages).
Dieter Schmal stieg et al: "The 1-13 Studierstube Augmented Reality Project—TR-186-2-00-22", Technical Reports of the Technical University of Vienna, Dec. 31, 2000 (Dec. 31, 2000), pp. 1-24, XP055270593, Retrieved from the Internet: URL:https://www.cg.tuwien.ac.at/research/publications/2000/Schm-2000-Stb/TR-186-2-00-22Paper.pdf.
Foreign NOA for IL Patent Appln. No. 270249 dated Dec. 4, 2022 in English.
Foreign NOA for IL Patent Appln. No. 276629 dated Dec. 21, 2022 in English.

(56) References Cited

OTHER PUBLICATIONS

Foreign NOA for IL Patent Appln. No. 276621 dated Dec. 21, 2022 in English.
Foreign Response for JP Patent Appln. No. 2022-143449 dated Jan. 24, 2023.
Foreign NOA for CN Patent Appln. No. 201880043910.4 dated Jan. 11, 2023.
Foreign OA for KR Patent Appln. No. 10-2022-7027516 dated Dec. 5, 2022.
Foreign Exam Report for AU Patent Appln. No. 2022271460 dated Dec. 7, 2022.
Foreign NOA for IL Patent Appln. No. 275461 dated Nov. 9, 2022 in English.
Foreign Response for KR Patent Appln. No. 10-2020-7021106 dated Dec. 9, 2022.
Notice of Allowance for U.S. Appl. No. 17/368,495 dated Dec. 14, 2022.
Foreign Response for EP Patent Appln. No. 19756664.9 dated Dec. 20, 2022.
Foreign Response for AU Patent Appln. No. 2018261328 dated Jul. 20, 2022.
Final Office Action for U.S. Appl. No. 17/368,495 dated Jul. 27, 2022.
Foreign Exam Report for IN Patent Appln. No. 202047032176 dated Jul. 19, 2022.
Non-Final Office Action for U.S. Appl. No. 17/241,977 dated Aug. 3, 2022.
Extended European Search Report for EP Patent Appln. No. 20784393.9 dated Jun. 20, 2022.
Foreign OA for JP Patent Appln. No. 2020-544237 dated Aug. 4, 2022.
Foreign NOA for JP Patent Appln. No. 2019-559343 dated Aug. 12, 2022.
Foreign Reexamination Decision for CN Patent Appln. No. 201880043910.4 dated Aug. 22, 2022.
Foreign NOA for AU Patent Appln. No. 2018261328 dated Aug. 10, 2022.
Foreign Exam Report for IN Patent Appln. No. 202047029094 dated Aug. 26, 2022.
Amendment After Final for U.S. Appl. No. 17/368,495 dated Sep. 22, 2022.
Foreign OA for CN Patent Appln. No. 201880043910.4 dated Sep. 23, 2022 (with English translation).
Foreign OA for CN Patent Appln. No. 202080026322.7 dated Oct. 12, 2022.
Schmalstieg, D., et al., "The Studierstube Augmented Reality Project," Presence, vol. 11, No. 1, Feb. 2002, 33-54, © 2002 by the Massachusetts Institute of Technology.
Foreign OA for KR Patent Appln. No. 10-2020-7021106 dated Oct. 14, 2022.
Foreign NOA for KR Patent Appln. No. 10-2022-7027516 dated Apr. 10, 2023.
Non-Final Office Action for U.S. Appl. No. 17/316,925 dated Feb. 16, 2023.
Amendment Response to NFOA for U.S. Appl. No. 17/663,792 dated Feb. 22, 2023.
Foreign Response for KR Patent Appln. No. 10-2022-7027516 dated Feb. 3, 2023.
Foreign Response for CN Patent Appln. No. 202080026322.7 dated Feb. 9, 2023.
Foreign Decision of Rejection for CN Patent Appln. No. 202080026322.7 dated Mar. 18, 2023.
Foreign NOA for JP Patent Appln. No. 2022-143449 dated Apr. 4, 2023.
Amendment Response to NFOA for U.S. Appl. No. 17/316,925 dated May 16, 2023.
Foreign NOA for KR Patent Appln. No. 10-2020-7021106 dated Apr. 18, 2023.
Foreign Response for CN Patent Appln. No. 202080026322.7 dated Jun. 26, 2023.
Amendment After Final for U.S. Appl. No. 17/663,792 dated Jul. 24, 2023.
Extended European Search Report for EP Patent Appln. No. 23159324.5 dated Jun. 1, 2023.
Foreign Exam Report for CA Patent Appln. No. 3060209 dated Jun. 30, 2023.
Final Office Action for U.S. Appl. No. 17/663,792 dated May 24, 2023.
Foreign Exam Report for NZ Patent Appln. No. 758288 dated May 12, 2023.

* cited by examiner

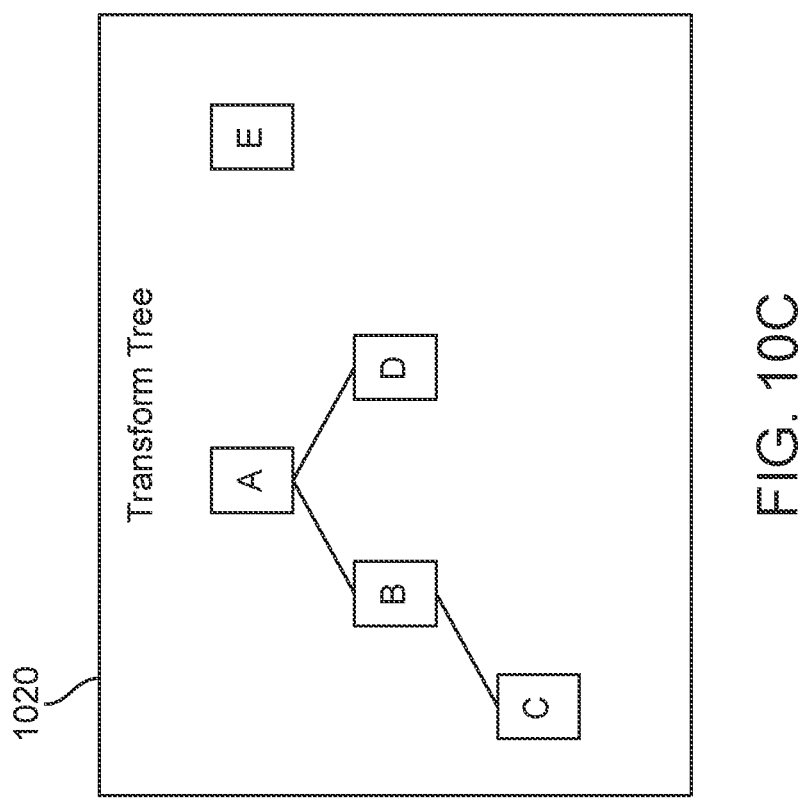

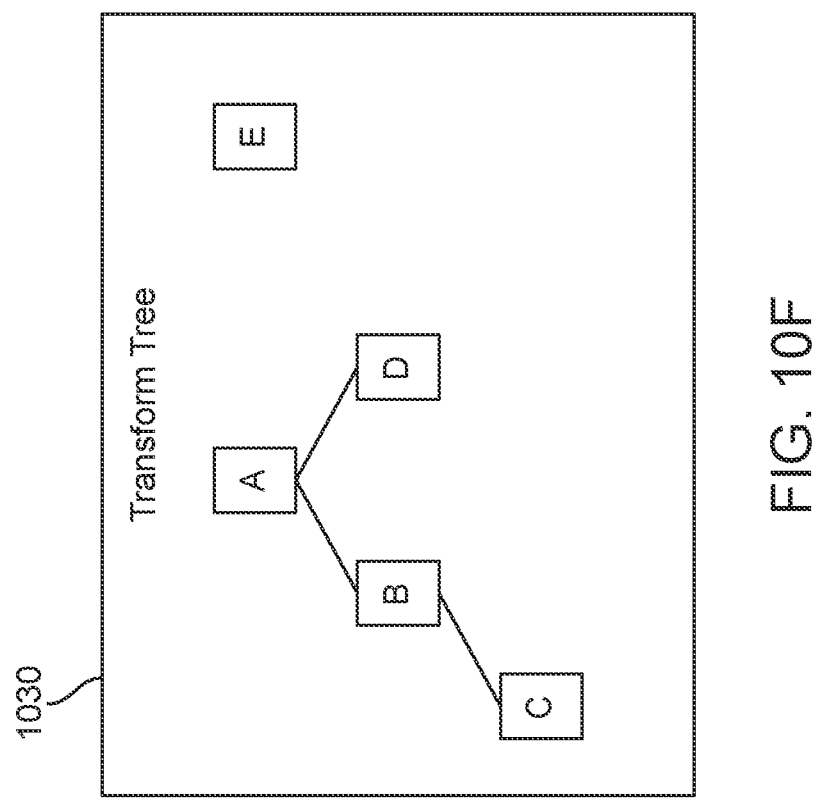

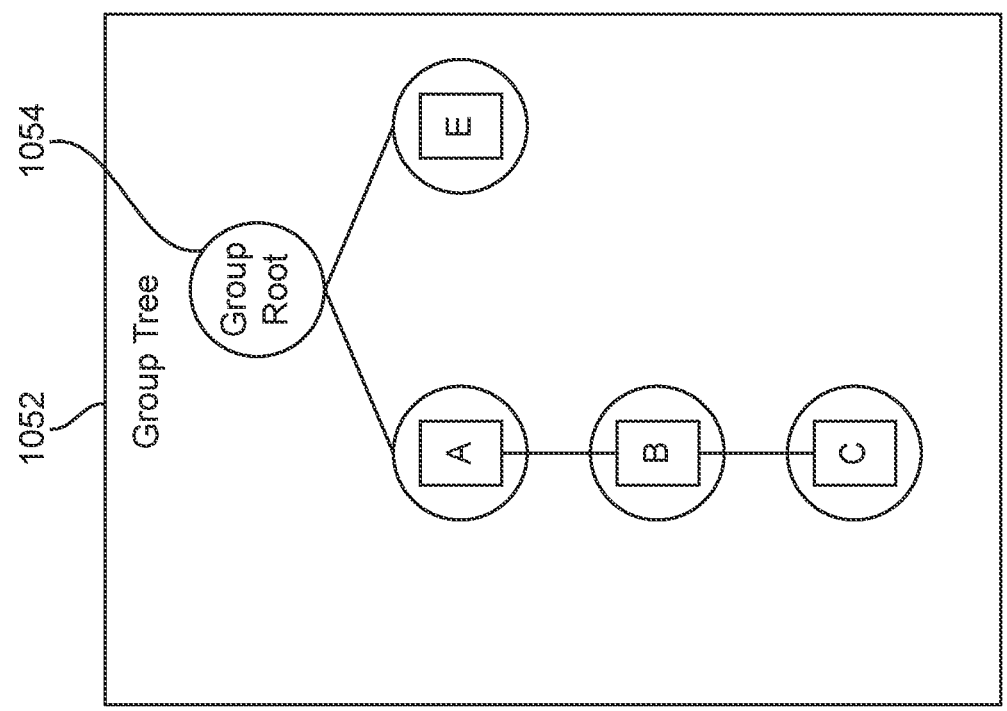
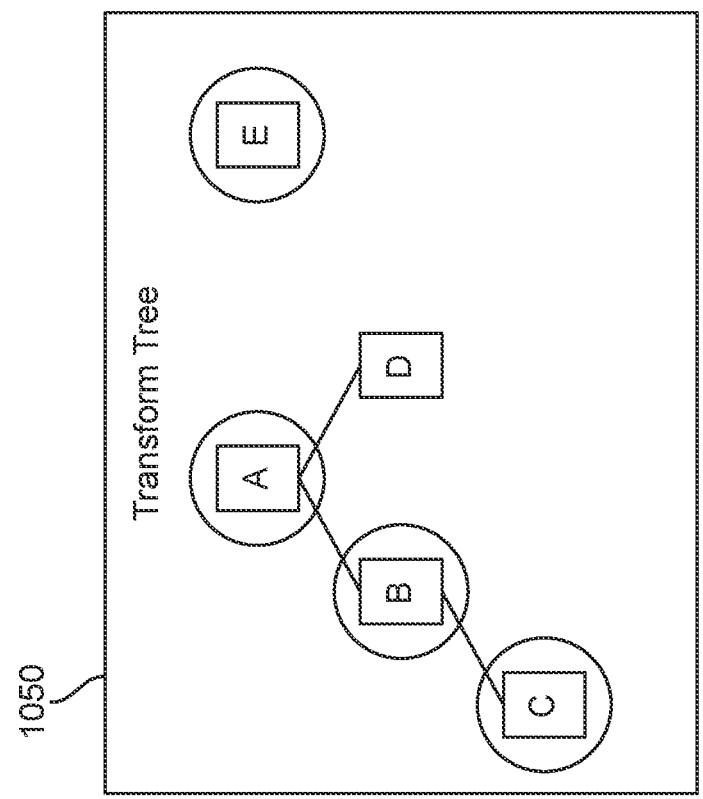
FIG. 10N

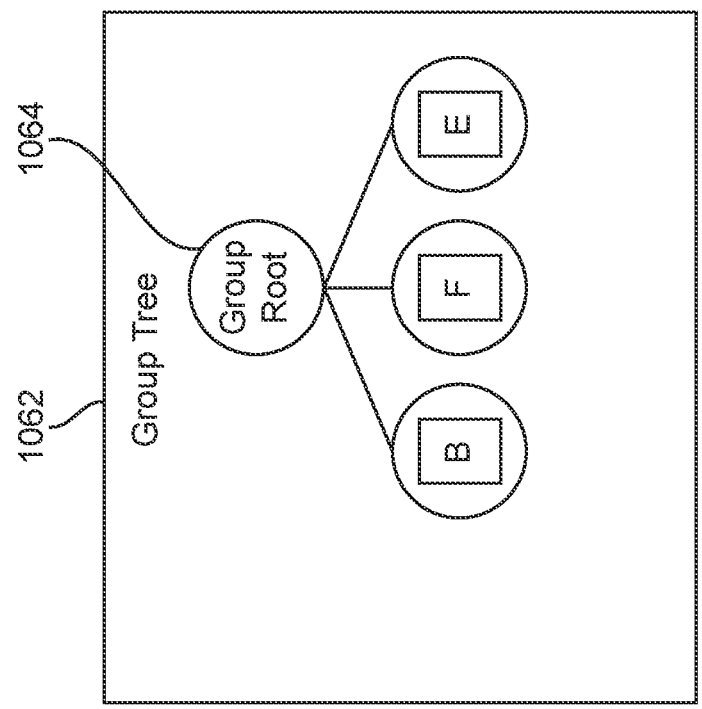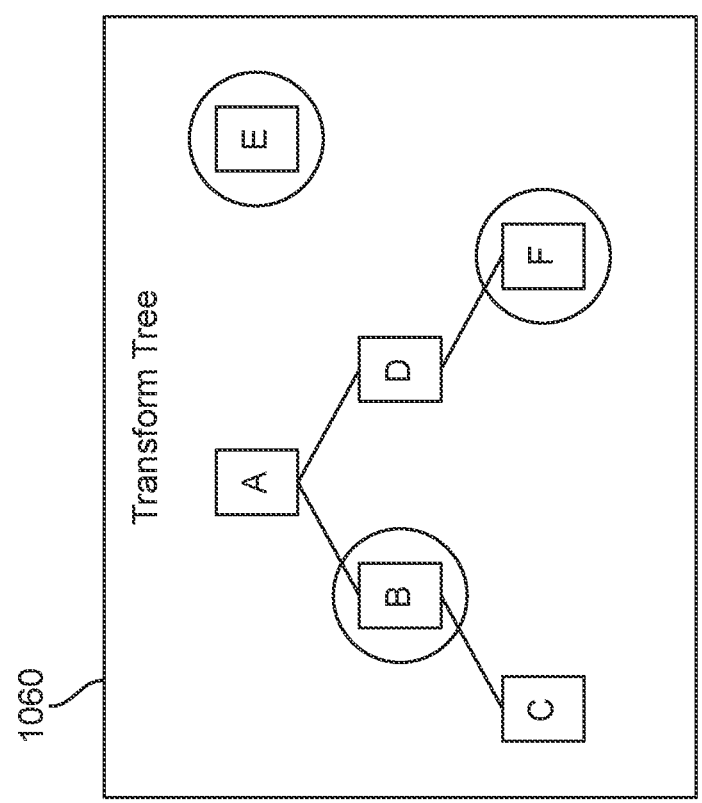
FIG. 10O

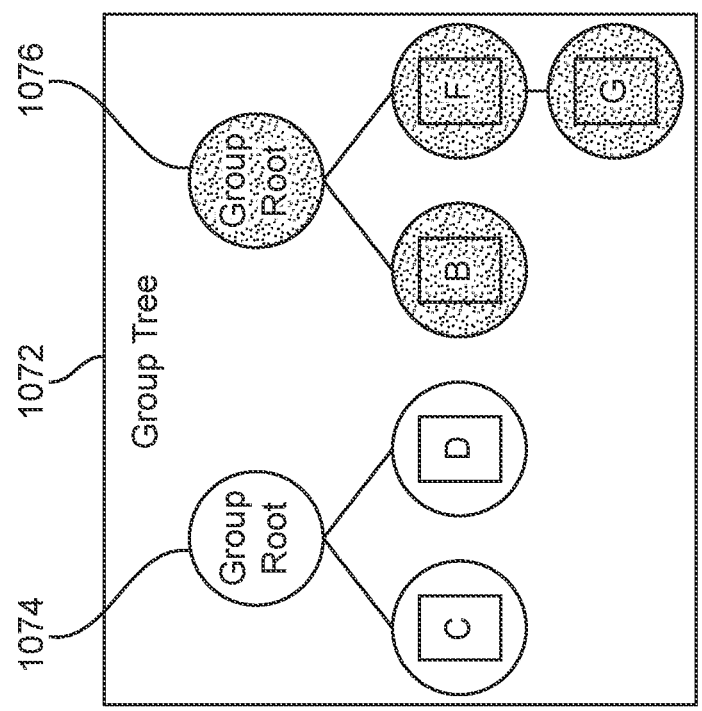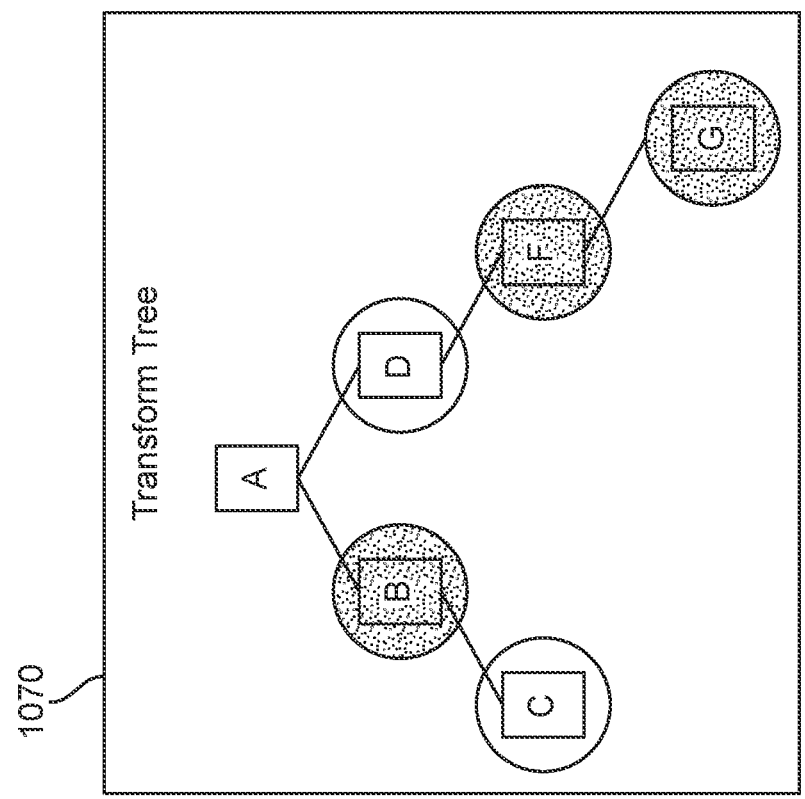
FIG. 10S

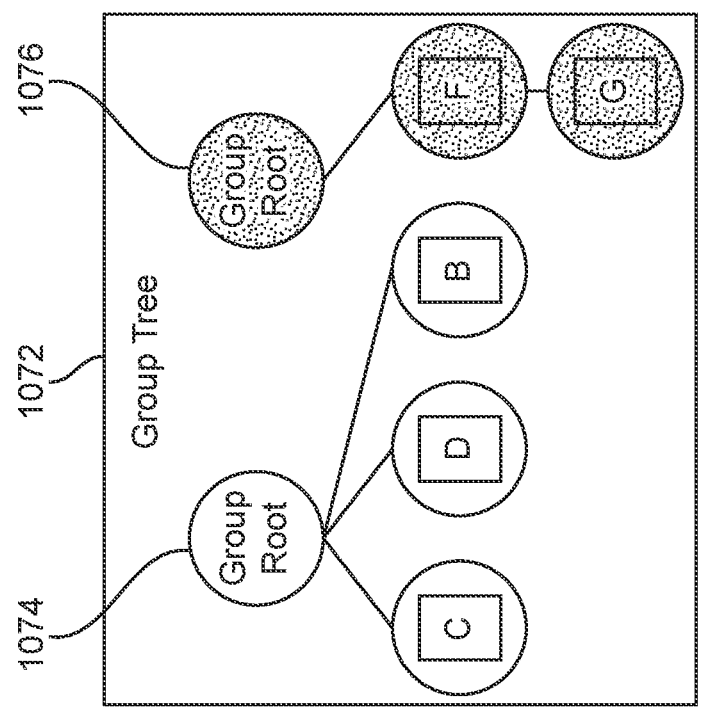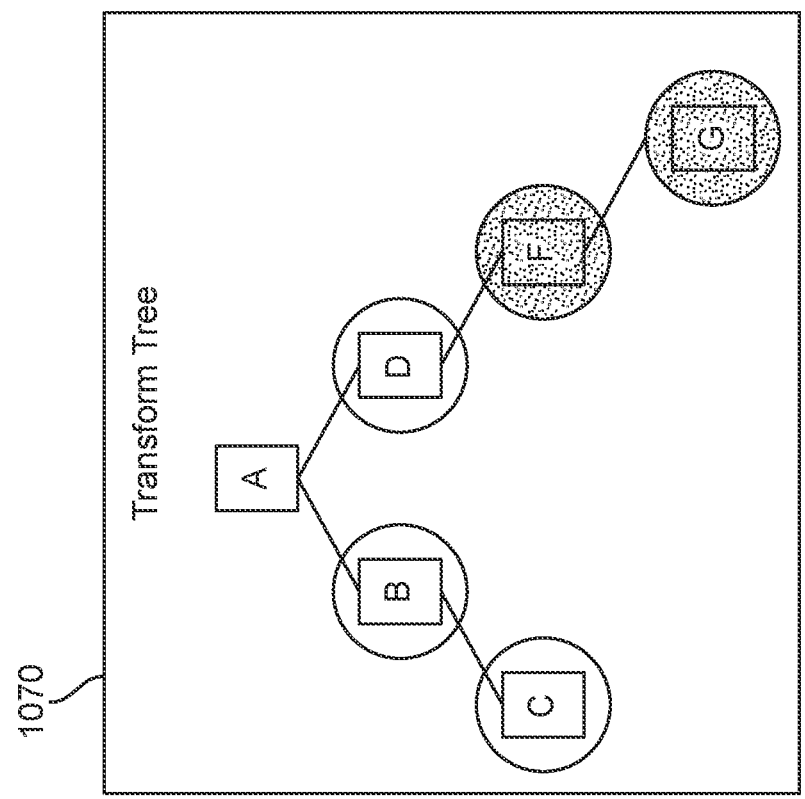
FIG. 10T

METHODS AND SYSTEM FOR MANAGING AND DISPLAYING VIRTUAL CONTENT IN A MIXED REALITY SYSTEM

CROSS-REFERENCE TO RELATED APPLICATIONS

This application is a continuation of pending U.S. patent application Ser. No. 16/224,719, filed Dec. 18, 2018, now U.S. Pat. No. 11,024,086, issued on Jun. 1, 2021, which claims the benefit under 35 U.S.C. § 119 to U.S. Provisional Patent Application Ser. No. 62/610,101 filed on Dec. 22, 2017, entitled "METHODS AND SYSTEM FOR MANAGING AND DISPLAYING VIRTUAL CONTENT IN A MIXED REALITY SYSTEM." The contents of the aforementioned patent applications are hereby incorporated by reference into the present application in their entirety.

The present disclosure is related to co-owned U.S. patent application Ser. No. 14/205,126, filed on Mar. 11, 2014, entitled "SYSTEM AND METHOD FOR AUGMENTED AND VIRTUAL REALITY", which is hereby incorporated by reference in its entirety.

FIELD OF INVENTION

The present disclosure generally relates to systems and methods configured to facilitate interactive virtual or augmented reality environments for one or more users.

BACKGROUND

Modern computing and display technologies have facilitated the development of systems for so-called "virtual reality" (VR), "augmented reality" (AR) experiences, and/or "mixed reality" experiences (hereinafter collectively referred to as "mixed reality" and/or "MR"), where digitally reproduced images or portions thereof are presented to a user in a manner where they seem to be, or may be perceived as, real. A VR scenario typically involves presentation of digital or virtual image information without transparency to other actual real-world visual input, whereas an AR or MR scenario typically involves presentation of digital or virtual image information as an augmentation to visualization of the real world around the user such that the digital or virtual image (e.g., virtual content) may appear to be a part of the real world. However, MR may integrate the virtual content in a contextually meaningful way, whereas AR may not.

Therefore, there is a need for an approach to manage and display virtual content in a mixed reality environment.

SUMMARY

In accordance with some embodiments, instead of managing and displaying virtual content in a mixed reality environment on a one-at-a-time basis independently by each application, each virtual content is rendered by its respective application into a bounded volume, which hereinafter may be referred to as a "Prism." Each Prism may have characteristics and properties that allow an application, sometimes called a universe application, to manage and display the Prism in the mixed reality environment such that the universe application may manage the placement and display of the virtual content in the mixed reality environment by managing the Prism itself.

One embodiment is directed to a method for displaying virtual content in a 3D spatial environment, the method comprising 1) receiving, from an application, a request to display a virtual content in a 3D spatial environment, 2) creating a Prism for managing the display of the virtual content, wherein the Prism is a cubic and/or rectangular volume of space configured to bound the virtual content inside a boundary of the Prism, 3) receiving the virtual content from the application, 4) rendering the virtual content inside the boundary of the Prism, associating the Prism to an object in the 3D spatial environment based at least in part on a user input, and 6) anchoring the Prism into the 3D spatial environment.

In one or more embodiments, borders of the boundary of the Prism are not displayed. The 3D spatial environment may be a physical real world environment of a user. The Prism may be created automatically having a set of functionalities. The set of functionalities may comprise a minimum/maximum size allowed for the Prism, and/or an aspect ratio for resizing the Prism. The set of functionalities may comprise an association between the Prism to the object in the 3D spatial environment. The application may render additional virtual content into additional Prisms, wherein each virtual content may be rendered into a separate Prism.

In one or more embodiments, the Prism does not overlap with other Prisms in the 3D spatial environment. The Prism may comprise one or more universal features to ensure different applications interact appropriately with one another, and/or one or more application-specific features, wherein the one or more universal features and the one or more application-specific features are selected from a list of pre-approved options.

Another embodiment is directed to a display system for displaying virtual content in a 3D spatial environment, the display system may include an augmented reality head-mounted display system, and one or more modules for processing data, wherein the one or more modules are stored in one or more memory, the one or more modules configured to perform 1) receiving, from an application, a request to display a virtual content in a 3D spatial environment, 2) creating a prism, wherein the prism is a volume of space configured to bound the virtual content inside a boundary of the prism, 3) receiving the virtual content from the application, 4) rendering the virtual content inside the boundaries of the prism, and 5) associating the prism to an object in the 3D spatial environment.

In one or more embodiments, borders of the boundary of the Prism are not displayed. The 3D spatial environment may be a physical real world environment of a user. The Prism may be created automatically having a set of functionalities. The set of functionalities may comprise a minimum/maximum size allowed for the Prism, and/or an aspect ratio for resizing the Prism. The set of functionalities may comprise an association between the Prism to the object in the 3D spatial environment. The application may render additional virtual content into additional Prisms, wherein each virtual content may be rendered into a separate Prism.

In one or more embodiments, the Prism does not overlap with other Prisms in the 3D spatial environment. The Prism may comprise one or more universal features to ensure different applications interact appropriately with one another, and/or one or more application-specific features, wherein the one or more universal features and the one or more application-specific features are selected from a list of pre-approved options.

Another embodiment is directed to a method for starting a mixed reality system, the method may include determining a current location of a user, retrieving one or more Prisms previously deployed at the current location, restoring the one or more Prisms at the current location of the user, and displaying the one or more Prisms restored at the current location of the user.

In one or more embodiments, a Prism is a cubic and/or rectangular volume of space that virtual content from an application is displayed into, wherein the may render into more than one Prism. In other words, in some embodiments, a single application may correspond to more than one Prism. In some embodiments, a single application corresponds to a single prism. A Prism represents a sub-tree of a multi-application scene graph for the current location of the user. Retrieving the one or more Prisms previously deployed at the current location of the user may comprise retrieving instance data for the one or more Prisms, from an external database for example, and reconstructing a local Prism database with the instance data for the one or more Prisms, wherein the instance data for each Prism include a data structure of Prism properties defining the Prism, the Prism properties comprising at least one of a location, an orientation, an extent width, an extent height, an extent depth, an anchor type, and/or an anchor position, wherein the instance data for each Prism include key value pairs of application specific properties comprising state information of virtual content previously rendered into the Prism by an application. In some embodiments, data is stored locally and an external database is not needed.

In one or more embodiments, restoring the one or more Prisms comprises launching respective applications corresponding to the one or more Prisms previously deployed at the current location, creating one or more new Prisms corresponding to the one or more Prisms previously deployed, and rendering respective virtual content into the one or more new Prisms.

In one or more embodiments, further comprising updating the local Prism database of the user with updated Prism instance data as the user interacts with the one or more Prisms, and synchronizing the local Prism database with the external database.

Some embodiments are directed to a method for managing application states of virtual content in a mixed reality system, the method may include segmenting a 3D volume into a volumetric grid. The method may also include determining a first location of a user within the volumetric grid. The method may further include determining a second location of an application within the 3D volume. The method may also include calculating a distance between the user and the application within the 3D volume. The method may additionally include modifying a state of the application based at least in part on the distance calculated between the user and the application.

Another embodiment is directed to a method for managing application states of virtual content in a mixed reality system, the method comprising recording a spatial position of one or more applications in a volumetric grid, the one or more applications providing content displayed inside one or more respective Prisms, the volumetric grid corresponding to a coarse representation of a physical environment in an x, y, and z axis. Identifying a cell of the volumetric grid comprising applications located within the cell, wherein a width of the cell is equal to or larger than a radius of an active zone. Determining a distance of known positions of each application within the cell and neighboring cells when a user using a mixed reality device moves within the cell. And modifying a state of an application based at least in part on a distance between the mixed reality device and each application within the cell and neighboring cells.

In one or more embodiments, the radius of the active zone defines a circular/spherical area around the user using the mixed reality device, wherein the user may be at the center of the circle/sphere. In some embodiments, modifying the state of the application may be based, at least in part, on whether the application is occluded by another application. In some embodiments, modifying the state of the application is based, at least in part, on a head pose of the user. A head pose of the user is a measurement of a location and/or orientation of a user's head. The head pose can be used to render a scene to match a user's dynamically changing head location and orientation to provide an increased sense of immersion in a virtual/augmented/mixed space. In some embodiments, the head pose may be determined, at least in part, by an inertial measurement unit mounted on the head mounted display system, or the user's head, although other suitable methods may also be used. The distance of known positions of each application within the cell may be determined only for the cell the user using the mixed reality device is in and the neighboring cells.

In one or more embodiments, there may be a buffer zone around an exterior of the active zone, wherein the buffer zone prevents intermittent or rapid changes to the state of the applications.

Another embodiment is directed to a method for launching an application from a launcher menu for displaying virtual content in a mixed reality system, the method comprising receiving a request for starting an application. Creating, by a universe application, a Prism for displaying and managing virtual content, wherein the Prism is a volumetric display space having boundaries for the application to render the virtual content into. Starting, by the Prism, the application through a lifecycle service. Determining, by the Prism, a unique identifier (UID) of the application through the package manager service. Registering, by the application, a listener with the universe application. Determining, by the universe application, the UID of the application. Associating, by the universe application, the Prism to the listener. Assigning, by the universe application, the Prism to the application using the listener of the application. And placing the Prism in a sub-set of a 3D displayable space of the mixed reality system.

Some embodiments are directed to a method for opening and placing an application in an augmented reality environment, the method may include receiving a first user input from a user indicating an interest in content. The method may also include launching an application to generate the content. The method may further include creating a mini display volume of a 3D display volume managing unit, wherein a page preview is displayed in the mini display volume, wherein the mini display volume managing unit is created simultaneously with the launching of the application. The method may further include receiving a second user input indicating a movement of the mini display volume. The method may also include receiving a third user input indicating a placement of the mini display volume at a location in the augmented reality environment, and expanding the 3D display volume managing unit in place of the mini display volume at the location, the 3D display volume managing unit displaying the content fully loaded within the 3D display volume managing unit.

In one or more embodiments, the first user input may be a cursor movement over a link on a web page, wherein the second user input is a selection of the link, and movement of the mini display volume. The mini display volume may be an initial default size of the 3D display volume managing unit. The content may be loaded into the mini display volume while the user is moving and placing the mini display volume. The location may be fixed to an object in the augmented reality environment, wherein the object is the user.

Some embodiments may be directed to a method for managing virtual content, the method may include receiving content from a content generating application. The method may also include displaying the content in a 3D spatial environment by a universe application. The method may further include constantly managing the display of the content in the 3D spatial environment by the universe application.

Some embodiments may be directed to a method that includes accessing a scene graph for a scene, wherein the scene graph comprises one or more transform trees, each tree comprising a plurality of nodes. The method may also include adding a tag to one or more nodes from a plurality of nodes within the one or more transform trees, wherein the one or more nodes tagged form a transform group, wherein the one or more nodes tagged comprise a first tagged node and a second tagged node. The method may further include moving the first tagged node, wherein moving the first tagged node causes the second tagged node to move.

Another embodiment is directed to a method of displaying virtual content in a 3D shared space, the method may include generating, by a first application, virtual content in the 3D shared space, and displaying, by a second application, the virtual content generated by the first application, the first application and the second application being different applications.

Some embodiments may be directed to a method for assigning to a Prism universal features and application selected features from a list of pre-approved options for configurations of display customizations by an application. Another embodiment is directed to a method for displaying virtual content into one or more Prisms, wherein the one or more Prisms do not overlap with one another. Another embodiment is directed to a method for changing a state of a Prism based at least in part on a relative position and location of the Prism to a user. Another embodiment is directed to a method for managing content creation in an application and managing content display in a separate application. Another embodiment is directed to a method for opening an application that will provide content into a Prism while simultaneously placing the Prism in a mixed reality environment.

Some embodiments may be directed to a method for assigning location, orientation, and extent data to a Prism for displaying virtual content within the Prism, the virtual content is 3D virtual content.

In one or more embodiment, the location is a coordinate of an anchor position of the Prism in a mixed reality environment. The extent data defines a size of the Prism.

Some embodiments may be directed to a method for pinning a launcher application to a real world object within a mixed reality environment.

In one or more embodiments, the pinned launcher application launches content of the application within a Prism in a same location as the pinned launcher application.

Some embodiments may be directed to a method for assigning a behavior type to each Prism, the behavior type comprising at least one of a world lock, a billboard, an edge billboard, a follow headlock, a follow based on external sensor, or a fade (described in more detail below). Some embodiments are directed to a method for identifying a most used content specific to a placed location of a launcher application. Some embodiments are directed to a method for displaying favorite applications, by a placed launcher application, the favorite applications based at least in part on context relative to a location of the placed launcher.

Additional and other objects, features, and advantages of the disclosure are described in the detail description, figures and claims.

BRIEF DESCRIPTION OF THE DRAWINGS

The drawings illustrate the design and utility of preferred embodiments of the present disclosure, in which similar elements are referred to by common reference numerals. In order to better appreciate how the above-recited and other advantages and objects of the present disclosure are obtained, a more particular description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings).

FIGS. 10B-10AA illustrate various transform trees and group trees, according to some embodiments.

DETAILED DESCRIPTION

The present disclosure is directed to managing and displaying virtual content in a mixed reality system. Instead of allowing multiple applications to manage and display virtual content in a mixed reality system independently of one another, embodiments of the present disclosure disclose a universe application that manages (e.g. how and where) virtual content to be displayed and managed in the mixed reality system using 3D windows called Prisms.

This disclosure provides a description of an illustrative mixed reality system with which some embodiments of the disclosure may be practiced, followed by a description of one or more embodiments of processes and mechanisms to manage and display virtual content in the mixed reality system.

The description that follows pertains to an illustrative mixed reality system with which the disclosure may be practiced. However, it is to be understood that the disclosure also lends itself to applications in other types of AR and virtual reality (VR) systems, and therefore the disclosure is not to be limited to only the illustrative system disclosed herein.

Figure 1:
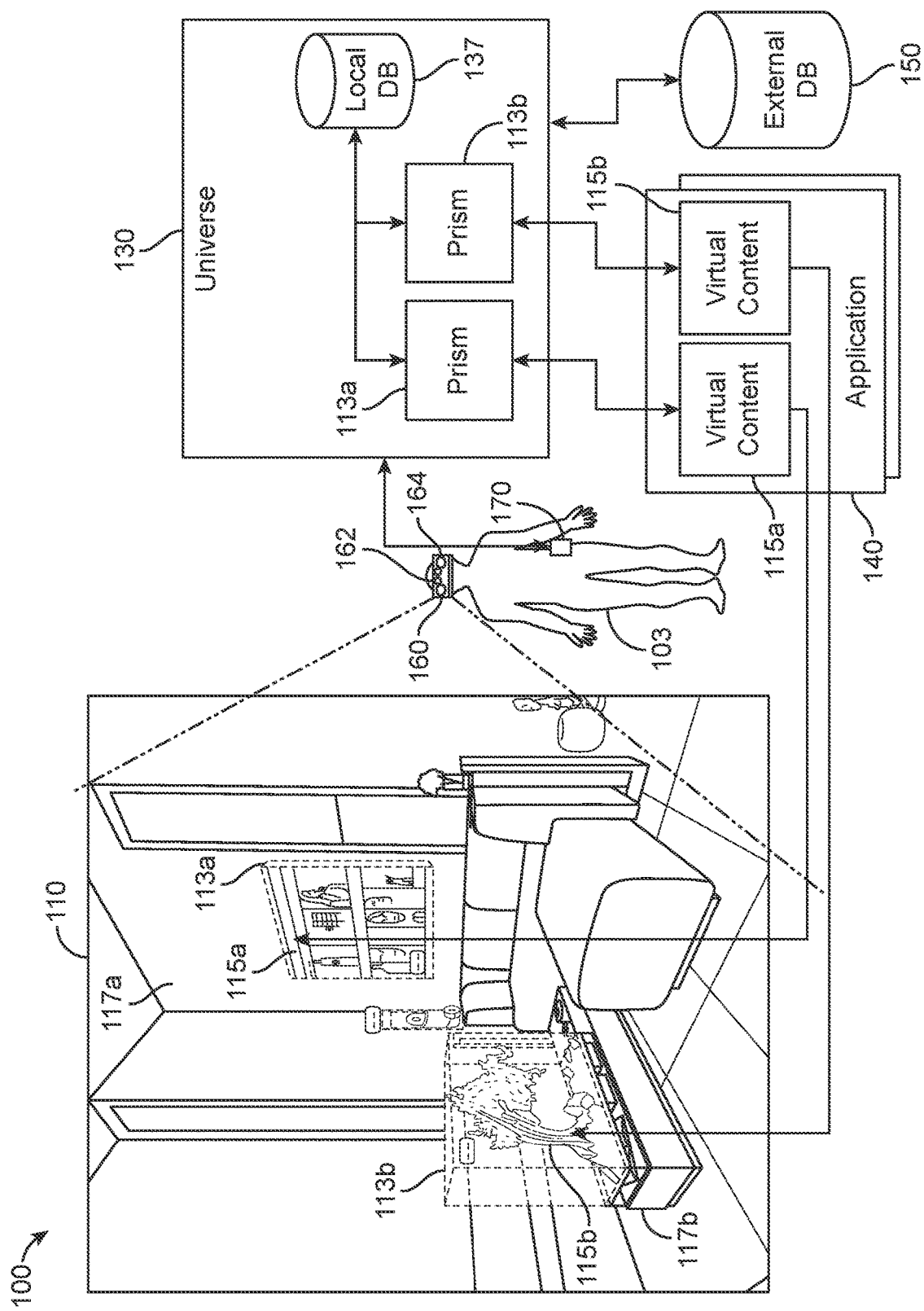
FIG. 1 shows an example user physical environment and system architecture for managing and displaying virtual content in a mixed reality system, according to some embodiments.

Figure (FIG. 1, shows an example user physical environment and system architecture for managing and displaying virtual content in a mixed reality system. The representative environment 100 includes a user's landscape 110 as viewed by a user 103 through a head-mounted system 160. The user's landscape 110 is a 3D view of the world where user-placed content may be composited on top of the real world. The representative environment 100 further includes accessing a universe application 130 via a processor 170 operatively coupled to a network (not shown). Although the processor 170 is shown as an isolated component separate from the head-mounted system 160, in an alternate embodiment, the processor 170 may be integrated with one or more components of the head-mounted system 160, and/or may be integrated into other system components within the representative environment 100 such as, for example, a network to access a computing network (not shown) and external storage device(s) 150. In some embodiments, the processor 170 may not be connected to a network. The processor 170 may be configured with software (e.g., a universe application 130) for receiving and processing information such as video, audio, and/or other data (e.g. depth camera data) received from the head-mounted system 160, a local storage device 137, application(s) 140, a computing network, and/or external storage device(s) 150.

The universe application 130 may be a 3D windows manager that is analogous to a 2D windows manager running on, for example, a desktop computer for managing 2D windows displayed on the display screen of the desktop computer. However, the universe application 130 (hereinafter may be referred to as "the Universe") manages the creation, placement and display of virtual content 115 in a 3D spatial environment, as well as interactions between a plurality of virtual content 115 displayed in a user's landscape 110. Virtual content 115 from applications 140 are presented to users 103 inside of one or more 3D window display management units such as bounded volumes and/or 3D windows, hereinafter may be referred to as Prisms 113.

A bounded volume/3D window/Prism 113 may be a rectangular, cubic, cylindrical, or any other shape volume of space that may be positioned and oriented in space. A Prism 113 may be a volumetric display space having boundaries for content (e.g., virtual content) to be rendered/displayed into, wherein the boundaries are not displayed. In some embodiments, the boundaries may be displayed. The Prism 113 may present a standard base level of interaction and control over an application's content and its placement. The Prism 113 may represent a sub-tree of a multi-application scene graph, which may be embedded inside of the Universe, or may be external to but accessed by the Universe. A scene graph is a general data structure commonly used by vector-based graphics, editing applications and modern gaming software, which arranges the logical and often (but not necessarily) spatial representation of a graphical scene. A scenegraph may be considered a data-structure that defines how content is positioned and transformed relative to each other within its structure. Application(s) 140 are given instances of Prisms 113 to place content within. Applications may render 2D/3D content within a Prism 113 using relative placement algorithms and arbitrary transforms, but the Universe may still ultimately be in charge of gross interaction patterns such as content extraction. Multiple applications may render to the Universe via the Prisms 113, with process boundaries separating the Prisms 113. There may be n number of bounded volumes/Prisms 113 per application process, but this is explicitly an n:1 relationship such that only one process for each application may be running for each bounded volume/Prism 113, but there may be a number of m processes running, each with their own bounded volume/Prism 113.

The Universe operates using a Prism/distributed scene graph approach for 2D and/or 3D content. A portion of the Universe's scene graph is reserved for each application to render to. Each interaction with an application, for example the launcher menu, the landscape, or body-centric application zones (all described in more detail below) may be done through a multi-application scene graph. Each application is allocated 1 to n rectangular Prisms that represent a sub-tree of the scene graph. Prisms are not allocated by the client side applications, but instead are created through the interaction of the user inside of the Universe, for example when the user opens a new application in the landscape by clicking a button on a controller. In some embodiments, an application can request a Prism from the Universe, but the request may be denied. In some embodiments, if an application requests and is allowed a new Prism, the application may only transform the new Prism relative to one of its other Prisms.

The Universe encloses virtual content 115 from application(s) 140 in objects called Prisms 113. Each application process or instance may render its virtual content into its own individual Prism 113 or set of Prisms. The Universe manages a world space, sometimes called a landscape, where Prisms 113 are displayed. In some embodiments, the Universe provides the ability to attach applications to walls and surfaces, place Prisms at an arbitrary location in space, register them with the mixed reality system's world database, and/or control sharing of content between multiple users of the mixed reality system.

In some embodiments, the purpose of the Prisms 113 is to provide behaviors and control over the rendering and display of the content. Much like a 2D display, where a window may be used to define location, menu structures, and display of 2D content within a 2D window, with 3D virtual display, the Prism allows the mixed reality system (e.g., the Universe) to wrap control relating to, for example, content locations, 3D window behavior, and/or menu structures around the display of 3D content. For example, controls may include at least placing the virtual content in a particular location in the user's landscape 110, removing the virtual content from the landscape 110, copying the virtual content and/or placing the copy in a different location, etc. In some embodiments, Prisms may be created and destroyed by the user and only the user. This may be done explicitly to help control abuse of the interfaces provided and to help the user maintain control of the user's content. Additionally, in some embodiments, application(s) 140 do not know where their volumes are placed in the landscape—only that they exist. In some embodiments, applications may request one or more Prisms, and the request may or may not be granted. After the new Prism is created, the user may change the position, and/or the application may automatically position the new Prism relative to a currently existing Prism associated with the application. In some embodiments, each application 140 making use of the Universe service to render 3D content (e.g. composited 3D content) into the Universe process may be required to first register a listener with the Universe. This listener may be used to inform the application 140 of creation and destruction of rendering Prisms, based upon user movement and user interaction with those Prisms. A listener is an interface object that receives messages from an inter-process communication system. For example, in the Android operating system, a listener is an object that receives messages through an Android Binder interface. However, any IPC system may be used such that a Binder is not always used.

In some embodiments, Prisms may be created from the following interactions: (1) The user has extracted content from an extractable node (disclosed further below); (2) The user has started an application from the launcher; (3) The user has downloaded a nearby passable world map tile that includes a placed instance of an application that the user has permission to see; (4) The user has downloaded a nearby passable world map tile that includes an object that the passable world object recognizer infrastructure has detected, that a given application must render content for; and/or (5) The user has triggered a dispatch from another application that must be handled in a different application. In some embodiments, a passable world model allows a user to effectively pass over a piece of the user's world (e.g., ambient surroundings, interactions, etc.) to another user.

Extractable Content is content inside a Prism (including but not limited to an icon, 3D icon, word in a text display, and/or image) that can be pulled out of the Prism using an input device and placed in the landscape. For example, a Prism might display a web page showing a running shoe for sale. To extract the running shoe, the shoe can be selected and "pulled" with an input device. A new Prism would be created with a 3D model representing the shoe, and that Prism would move out of the original Prism and towards the user. Like any other Prism, the user may use an input device to move, grow, shrink or rotate the new Prism containing the shoe in the 3D space of the landscape. An Extractable Node is a node in the Prism's scene graph that has been tagged as something that can be extracted. In the Universe, to extract content means to select an extractable node, and use an input device to pull the content out of the Prism. The input to initiate this pull could be aiming a *6dof* pointing device at extractable content and pulling the trigger on the input device.

Each user's respective individual mixed reality system (e.g., mixed reality devices) captures information as the user passes through or inhabits an environment, which the mixed reality system processes to produce a passable world model. More details regarding a passable world are described in U.S. patent application Ser. No. 14/205,126, filed on Mar. 11, 2014, entitled "SYSTEM AND METHOD FOR AUGMENTED AND VIRTUAL REALITY", which has been previously incorporated by reference. The individual mixed reality system may communicate or pass the passable world model to a common or shared collection of data, referred to as the cloud. The individual mixed reality system may communicate or pass the passable world model to other users, either directly or via the cloud. The passable world model provides the ability to efficiently communicate or pass information that essentially encompasses at least a field of view of a user. In one embodiment, the system uses the pose and orientation information, as well as collected 3D points described above in order to create the passable world. In some embodiments, the passable world model allows the user the ability to integrate content (e.g., virtual and/or physical content) with the real world. A passable world system may include one or more mixed reality systems or mixed reality user devices that are able to connect to a cloud network, a passable world model, a set of object recognizers, and a database (e.g., external database 150). The passable world model may be configured to receive information from the mixed reality user devices and also transmit data to them through the network. For example, based on the input from a user, a piece of the passable world may be passed on from one user to another user. The passable world model may be thought of as a collection of images, points and other information (e.g. real world information) based on which the mixed reality system is able to construct, update and build the virtual world on the cloud, and effectively pass pieces of the virtual world to various users. For example, a set of real world points collected from a mixed reality user device may be collected in the passable world model. Various object recognizers may crawl through the passable world model to recognize objects, tag images, etc., and attach semantic information to the objects. The passable world model may use the database to build its knowledge of the world, attach semantic information, and store data associated with the passable world.

In the case of a Prism that is visible to the user but whose controlling application is not currently installed, the Universe may render a temporary placeholder for that application that, when interacted with, redirects the user to the application store page for that application.

In some embodiments, Prisms may be destroyed in similar interactions: (1) The user has walked far enough from a passable world map tile that the placed instance of an application has been unloaded (i.e. removed) from volatile memory; (2) The user has destroyed a placed instance of an application; and/or (3) An application has requested that a Prism be closed.

In some embodiments, if no Prisms for an application are visible and/or loaded, then the process associated with those Prisms may be paused or ended. Once a placed Prism for that application is visible again, the process may be restarted. Prisms may also be hidden, but, in some embodiments, this may only happen at the behest of the Universe and the user. In some embodiments, multiple Prisms may be placed at the same exact location. In such embodiments, the Universe may only show one instance of a placed Prism in one place at a time, and manage the rendering by hiding the visibility of a Prism (and its associated content) until a user interaction is detected, such as the user "swipes" to the next visible element (e.g., Prism) in that location.

In some embodiments, each Prism 113 may be exposed to the application 140 via a volume listener interface with methods for accessing properties of the Prism 113 and registering content in a scene graph sub-tree for shared resources such as meshes, textures, animations, and so on.

In some embodiments, since the application 140 does not know where a given Prism 113 is placed in 3D space, the volume listener interface may provide accessor methods to a set of hints that help to define where the given Prism is present in the Universe, for example hand centric, stuck in the landscape, Body Centric, etc. These properties additionally specify expected behavior of the Prisms, and may be controlled in a limited fashion either by the user, the application 140, or the Universe. A given Prism can be positioned relative to another Prism that an application owns. Applications can specify that Prisms should snap together (two sides of their bounding volumes touch) while Prisms from that application are being placed. Additionally, Prisms may provide an API for key-value data storage. Some of these key-value pairs are only writable by privileged applications.

In some embodiments, application(s) 140 are client software applications that provide content that is to be displayed to the user 103 in the user's landscape 110. For example, an application 140 may be a video streaming application, wherein video data may be streamed to the user to be displayed on a 2D planar surface. As another example, an application 140 may be a Halcyon application that provides 3D imaging of physical objects that may denote a period of time in the past that was idyllically happy and peaceful for the user. Application 140 provides the content that a user may want to include in the user's landscape 110. The Universe via the Prisms 113 manages the placement and management of the content that is generated by application 140.

When a non-immersive application is executed/launched in the user's landscape 110, its content (e.g., virtual content) is rendered inside of a Prism 113. A non-immersive application may be an application that is able to run and/or display content simultaneously with one or more other applications in a shared 3D environment. Although the virtual content may be contained within the Prism, a user may still interact with the virtual content, such as, for example, hovering over an object, clicking on it, etc. The Prism 113 may also bound application 140's displayed content so different applications 140 do not interfere with each other or other objects in the user's landscape 110. Prisms 113 may also provide a useful abstraction for suspending, pausing, and/or minimizing virtual content from application(s) 140 that are out of view or too far away from the user.

The Prisms 113 may be anchored/attached/pinned to various objects within a user's landscape 110, including snapping or anchoring to another Prism. For example, Prism 113a, which displays virtual content 115 (e.g., a video 115a from a video streaming application), may be anchored to a vertical wall 117a. As another example, Prism 113b, which displays a 3D tree 115b from a Halcyon application, is shown in FIG. 1 to be anchored to a table 117b. Furthermore, a Prism 113 may be anchored relative to a user 103 (e.g., body-centric), wherein the Prism 113 which displays virtual content 115 may be anchored to a user's body, such that as the user's body moves, the Prism 113 moves relative to the movement of the user's body. A body-centric content may be application content such as planes, meshes, etc. that follow the user and remain positionally consistent with the user. For example, a small dialog box that follows the user around but exists relative to the user's spine rather than the landscape 110. Additionally, a Prism 113 may also be anchored to a virtual object such as a virtual display monitor displayed within the user's landscape 110. The Prism 113 may be anchored in different ways, which is disclosed below.

The Universe may include a local database 137 to store properties and characteristics of the Prisms 113 for the user. The stored Prism information may include Prisms activated by the user within the user's landscape 110. Local database 137 may be operatively coupled to an external database 150 that may reside in the cloud or in an external storage facility. External database 150 may be a persisted database that maintains information about the mixed reality environment of the user and of other users.

For example, as a user launches a new application to display virtual content in the user's physical environment, the local database 137 may store information corresponding to a Prism that is created and placed at a particular location by the Universe, wherein an application 140 may render content into the Prism 113 to be displayed in the user's landscape 110. The information corresponding to the Prism 113, virtual content 115, and application 140 stored in the local database 137 may be synchronized to the external database 150 for persistent storage.

In some embodiments, the persisted storage may be important because when the mixed reality system is turned off, data stored in the local database 137 may be erased, deleted, or non-persisted. Thus, when a user turns on the mixed reality system, the Universe may synchronize with the external database 150 to retrieve an instance of the local database 137 corresponding to the user 103 and the user's landscape 110 prior to the mixed reality system being turned off. The local database 137 may be an instance of the external database 150, wherein the instance of the local database 137 includes information pertinent to the user 103 and the user's current environment. The external database 150 may additionally store instances of local databases of other users, multiple users, the same user over time, and/or other environments. The external database 150 may contain information that is used to manage and share virtual content between multiple users of the mixed reality system, whereas the local database 137 stores and maintains information corresponding to the user 103.

The Universe may create a Prism 113 for application 140 each time application(s) 140 needs to render virtual content 115 onto a user's landscape 110. In some embodiments, the Prism 113 created by the Universe allows application 140 to focus on rendering virtual content for display while the Universe focuses on creating and managing the placement and display of the Prism 113 having the virtual content 115 displayed within the boundaries of the Prism by the application 140.

Each virtual content 115 rendered by an application 140, displayed in the user's landscape 110, may be displayed within a single Prism 113. For example, if an application 140 needs to render two virtual contents (e.g., 115a and 115b) to be displayed within a user's landscape 110, then application 140 may render the two virtual contents 115a and 115b. Since virtual contents 115 include only the rendered virtual contents, the Universe may create Prisms 113a and 113b to correspond with each of the virtual content 115a and 115b, respectively. The Prism 113 may include 3D windows management properties and characteristics of the virtual content 115 to allow the Universe to manage the virtual content 115 inside the Prism 113 and the placement and display of the Prism 113 in the user's landscape 110.

The Universe may be the first application a user 103 sees when the user 103 turns on the mixed reality device. The Universe may be responsible for at least (1) rendering the user's world landscape; (2) 2D window management of planar applications and 3D windows (e.g., Prisms) management; (3) displaying and executing the application launcher menu; (4) allowing the user to place virtual content into the user's landscape 110; and/or (5) managing the different states of the display of the Prisms 113 within the user's landscape 110.

The head-mounted system 160 may be a mixed reality head-mounted system that includes a display system (e.g., a user interface) positioned in front of the eyes of the user 103, a speaker coupled to the head-mounted system and positioned adjacent the ear canal of the user, a user-sensing system, an environment sensing system, and a processor (all not shown). The head-mounted system 160 presents to the user 103 the display system (e.g., user interface) for interacting with and experiencing a digital world. Such interaction may involve the user and the digital world, one or more other users interfacing the representative environment 100, and objects within the digital and physical world.

The user interface may include viewing, selecting, positioning and managing virtual content via user input through the user interface. The user interface may be at least one or a combination of a haptics interface devices, a keyboard, a mouse, a joystick, a motion capture controller, an optical tracking device, an audio input device, a smartphone, a tablet, or the head-mounted system 160. A haptics interface device is a device that allows a human to interact with a computer through bodily sensations and movements. Haptics refers to a type of human-computer interaction technology that encompasses tactile feedback or other bodily sensations to perform actions or processes on a computing device.

An example of a haptics controller may be a totem (not shown). In some embodiments, a totem is a hand-held controller that tracks its position and orientation relative to the headset 160. In this example, the totem may be a six degree-of-freedom (six DOF) controller where a user may move a Prism around in altitude and azimuth (on a spherical shell) by moving the totem up or down. In some embodiments, to move the object closer or farther away, the user may use the joystick on the totem to "push" or "pull" the Prism, or may simply move the totem forward or backward. This may have the effect of changing the radius of the shell. In some embodiments, two buttons on the totem may cause the Prism to grow or shrink. In some embodiments, rotating the totem itself may rotate the Prism. Other totem manipulations and configurations may be used, and should not be limited to the embodiments described above.

The user-sensing system may include one or more sensors 162 operable to detect certain features, characteristics, or information related to the user 103 wearing the head-mounted system 160. For example, in some embodiments, the sensors 162 may include a camera or optical detection/scanning circuitry capable of detecting real-time optical characteristics/measurements of the user 103 such as, for example, one or more of the following: pupil constriction/dilation, angular measurement/positioning of each pupil, sphericity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's landscape 110. Objects or information detected by the sensors 164 may be provided as input to the head-mounted system 160. In some embodiments, this input may represent user interaction with the virtual world. For example, a user (e.g., the user 103) viewing a virtual keyboard on a desk (e.g., the table 188) may gesture with their fingers as if the user were typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for capturing and interpreting scene information, for example, through continuously and/or intermittently projected infrared structured light. The environment-sensing system may be used for mapping one or more elements of the user's landscape 110 around the user 103 by detecting and registering one or more elements from the local environment, including static objects, dynamic objects, people, gestures and various lighting, atmospheric and acoustic conditions, etc. Thus, in some embodiments, the environment-sensing system may include image-based 3D reconstruction software embedded in a local computing system (e.g., the processor 170) and operable to digitally reconstruct one or more objects or information detected by the sensors 164.

In some embodiments, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of the system of the representative environment 100, or may be an isolated device (wearable or separate from the user 103) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., a computing network, and the user-sensing system and the environment-sensing system from the head-mounted system 160) into image and audio data, wherein the images/video and audio may be presented to the user 103 via the user interface (not shown).

The processor 170 handles data processing for the various components of the head-mounted system 160 as well as data exchange between the head-mounted system 160 and the software applications such as the Universe, the external database 150, etc. For example, the processor 170 may be used to buffer and process data streaming between the user 103 and the computing network, including the software applications, thereby enabling a smooth, continuous and high fidelity user experience. The processor 170 may be configured to execute a set of program code instructions. The processor 170 may include a memory to hold the set of program code instructions, in which the set of program code instructions comprises program code to display virtual content within a subset of available 3D displayable space by displaying the virtual content within a volumetric display space, wherein boundaries of the volumetric display space are not displayed. In some embodiments, the processor may be two or more processors operatively coupled.

In some embodiments, the mixed reality system may be configured to assign to a Prism universal features and application selected/application-specific features from a list of pre-approved options for configurations of display customizations by an application. For example, universal features ensure different applications interact well together. Some example of universal features may include max/min size, no overlapping Prisms (excluding temporary overlap from collision behavior), no displaying content outside the boundaries of the Prism, applications need permission from user if the application wants to access sensors or sensitive information. Application selected/application-specific features enable optimized application experiences. Application-selected/application-specific features may include max/min size (within limits from the system), default size (within limits from the system), type of body dynamic (e.g., none/world lock, billboard, edge billboard, follow/lazy headlock, follow based on external sensor, fade—discussed below), child Prism spawn location, child headpose highlight, child Prism relational behavior, on surface behavior, independent transformation control, resize vs. scale, idle state timeout, collision behavior, permission/password to access application, etc. In another embodiment, the mixed reality system may be configured to display virtual content into one or more Prisms, wherein the one or more Prisms do not overlap with one another, in some embodiments. In some embodiments, one or more Prisms may overlap in order to provide specific interactions. In some embodiments, one or more Prisms may overlap, but only with other Prisms from the same application. In another embodiment, the mixed reality system may be configured to change a state of a Prism based at least in part on a relative position and location of the Prism to a user. In another embodiment, the mixed reality system may be configured to manage content creation in an application and manage content display in a separate application. In another embodiment, the mixed reality system may be configured to open an application that will provide content into a Prism while simultaneously placing the Prism in a mixed reality environment.

In some embodiments, the mixed reality system may be configured to assign location, orientation, and extent data to a Prism for displaying virtual content within the Prism, where the virtual content is 3D virtual content. In some embodiments, the mixed reality system may be configured to pin a launcher application to a real world object within a mixed reality environment. In some embodiments, the mixed reality system may be configured to assign a behavior type to each Prism, the behavior type comprising at least one of a world lock, a billboard, an edge billboard, a follow headlock, a follow based on external sensor, or a fade (described below in more detail). In some embodiments, the mixed reality system may be configured to identify a most used content or an application that is specific to a placed location of a launcher application, and consequently re-order to the applications from most to least frequently used, for example. In another embodiment, the mixed reality system may be configured to display favorite applications at a placed launcher application, the favorite applications based at least in part on context relative to a location of the placed launcher.

Figure 2:
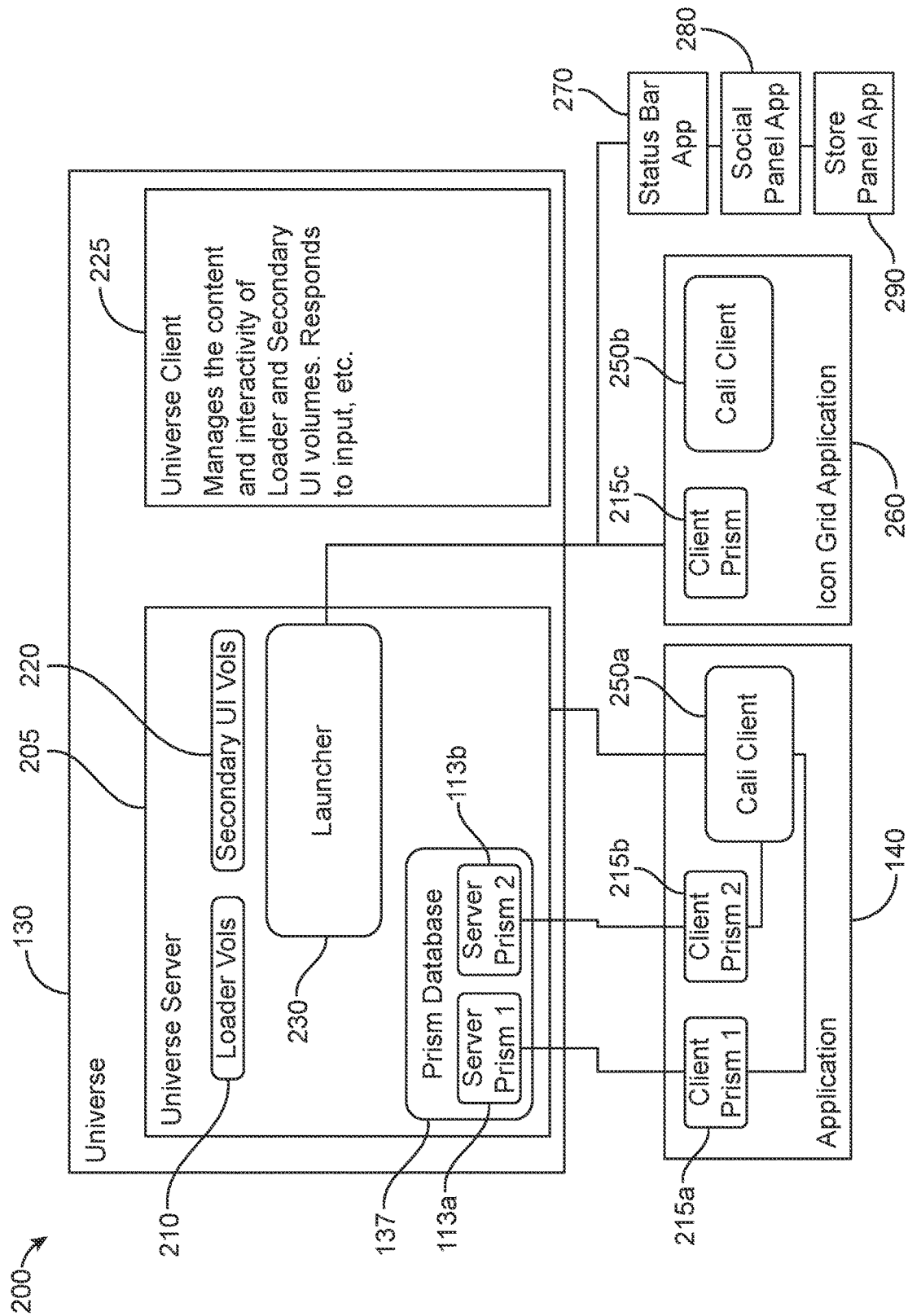
FIG. 2 shows a system architecture for managing and displaying virtual content in a mixed reality system, according to some embodiments.

FIG. 2 shows a system architecture for managing and displaying virtual content in a mixed reality system, according to some embodiments. System 200 includes a Universe 130, application 140, icon grid application 260, status bar app 270, social panel app 280, and store panel app 290. These applications may represent the base level of applications on system 200, however, in some embodiments, more or fewer applications may be part of system 200.

As discussed in FIG. 1 above, the Universe may be thought of as a 3D windows (e.g., Prisms) manager, analogous to a 2D windows manager that manages 2D windows in conventional computer desktop systems and such. FIG. 2 may provide further details of the Universe from FIG. 1. Here, the universe application 130 may also include universe server 205, loader volumes 210, secondary UI volumes 220, universe client 225, launcher application 230, and universe server 205. Universe server 205 may be a processing thread of the Universe in a multi-threaded processing environment for multi-parallel processing.

Loader volumes 210 are placeholder volumes that are displayed to a user while the Universe is creating a Prism for displaying virtual content in the user's landscape 110. For example, when a user selects an application to display in the user's landscape 110 at a particular location, for example, on a vertical wall of the user's landscape 110, while the Universe is setting up the Prism and starting the application for rendering the virtual content into the Prism, the Universe may display a loader volume 210 with a default icon as a placeholder volume to indicate to the user that the Universe is setting up the Prism for display. Once the application finishes rendering the virtual content into the Prism for display in the user's landscape, the loader volume 210 is replaced with the actual Prism containing the rendered virtual content.

In some embodiments, while the Universe is starting up an application for displaying virtual content, the user 103 may move the loader volume 210 to a desired different location. In some embodiments, the user may move the loader volume 210 to a location that is different than the location of the loader volume/Prism that was initially selected. Once the universe is done creating the Prism and the application has rendered the virtual content into the Prism, the Universe may replace the loader volume 210, wherever the user may have placed the loader volume 210, with the Prism displaying the virtual content.

Secondary UI volume 220 is another Prism that may be created when a Prism 113 (e.g., its "parent Prism") is created. The Secondary UI volume 220 provides a universal interface of Prisms for users. For example, the Secondary UI volume 220 may be considered as window dressing because the Secondary UI volume 220 provides a mechanism to manage a Prism (e.g., close/remove, share, follow, take a screenshot of the Prism's content, etc.). When a Prism is created, a Secondary UI volume 220 may be created for the Prism if the Prism is NOT part of the Launcher (Launcher applications may not have Secondary UI volumes). The Secondary UI volume 220 provides the space/volume to display graphical user interface icons such as close/remove, share, follow, screenshot, etc. for the user to interact with and manage the Prism. The Secondary UI volume 220 is associated to the parent Prism and may be grouped with the parent Prism. The Secondary UI volume 220 lifetime ends when the parent Prism lifetime it is associated with ends.

In some embodiments, the Secondary UI volume 220 may have at least three states: (1) Display nothing when the parent Prism is out of focus; (2) Display the component's "visible name" when the parent Prism is in focus; and (3) Display a "carousel" of application menu option icons when a specific user interaction is detected, for example, a home button of a handheld controller (e.g., a Totem, or other suitable user interaction controllers) has been held for a certain number of seconds, wherein the carousel displays a collection of icons, one of which may be a large "X" icon for closing the Prism. In some embodiments, the Secondary UI volume 220 receives input via its parent Prism. In other words, the parent Prism may determine if the Secondary UI volume 220 is displaying its carousel, and if so the parent Prism redirects user input to the Secondary UI. The carousel of the Secondary UI volume 220 is disclosed below.

In some embodiments, the launcher may be the default "home" menu for the mixed reality system. The launcher may bring together multiple panels of content alongside a system status bar. Each panel may represent a different content type. Applications may be pulled from the launcher and pinned into the landscape for quick recall. The launcher itself may be placed into the landscape for customization per location and/or for quick access.

Launcher 230 provides the user with the ability to launch new applications into the user's landscape 110. The launcher 230 may be an application composed of a series of body-centric Prisms called panels. The panels may be vertically and horizontally scrollable and a user may switch between panels with a swiping motion, for example. In some embodiments, one panel may be visible at a time (e.g., a central panel), with its two neighboring panels visible as placeholder panels at its side. When the user swipes to the next panel, the placeholder panels may expand to show the full panel. Panels may include an Icon Grid application 260, a Social panel 280, and a Store panel 290. In some embodiments, when the user swipes to the next panel, the panels themselves are not moved or changed, but instead, contents (e.g., icons) within the different panels may be animated in and out of the central panel (e.g., active panel). Furthermore, applications may be pulled from the launcher 230 and pinned into the user's landscape 110 for customization per location, discussed further below.

In some embodiments, an application 140 may communicate with the Universe via a centralized rendering service client 250 on each application 140. The centralized rendering service client 250 may be in communication with a universe server 205 within the Universe 130. The centralized rendering service client 250 may be a client service of a centralized rendering system that allows application(s) 140 and other applications that generate content for display in the user's landscape to communicate with the Universe via the universe server 205.

The universe server 205 may comprise a service of the centralized rendering system that allows the Universe to communicate with applications that provide the Universe content to be displayed in the user's landscape. In some embodiments, the communication may comprise more than rendering data, for example, input data, requesting a security privilege, requesting to show or hide the virtual keyboard, etc.

In some embodiments, the centralized rendering system may be a system of hardware and software resources dedicated to receiving graphical data from multiple applications to be displayed on a single display (e.g., in a user's landscape in the mixed reality system). The centralized rendering system combines graphical data from multiple applications 140 into a "centralized" data structure, such as a scene graph, which may be used to render, to a display, a scene reflecting the graphical data from the multiple applications in a realistic and efficient manner. In order to achieve the centralized rendering system, in some embodiments, an application may make changes to a local representation of the Prism called the Client Prism (e.g. Client Prism 215 from FIG. 2). These changes may then be sent to the Universe Server 205 and stored in a Server Prism. The centralized rendering system may then render the updated data in the Server Prism. The centralized rendering system may hereinafter be referred to as the "Cali" or *Kali* system. The Universe may be thought of as an enhanced version of the Cali Server, for example, because the Universe can manage the Prisms in the real world.

In some embodiments, each application 140 that creates virtual content 115 for the Universe communicates with the centralized rendering system and the Universe via the centralized rendering service client 250 (hereinafter may be referred to as a "Cali client") installed on each of the respective application(s) 140. More information may be disclosed in a related Application Ser. No. 62/479,134 entitled "CENTRALIZED RENDERING", filed on Mar. 30, 2017, and which is hereby incorporated by reference in its entirety. The centralized rendering system improves the user's experience by ensuring that virtual content from multiple different applications are properly analyzed and processed, if necessary, to ensure the virtual content are displayed in a realistic manner to the user. In some embodiments, the Universe is an instance of a Cali Server with additional functionality, such as managing Prisms. In some embodiments, a Client Prism is an instance of a Cali Client Volume and a Server Prism is an instance of a Cali Server Volume, with additional functionality, such as the ability to bring up an App Options display, to display a Loader Volume while the Prism is loading its content, to collide with other Prisms, and to be part of a Transform Tree.

Client Prism 215a and Client Prism 215b comprise virtual content that is generated by the application 140 and sent by the Cali Client 250a to the Universe Server 205 to be displayed in the user's landscape. In some embodiments, as the application 140 makes changes to the virtual content 115a and 115b, the changes to the virtual content are communicated from the Client Prism 215 to the Universe Server 205, and that information is stored inside the Universe in the corresponding Server Prism data structures 113. In some embodiments, the application 140 does not know where in the user's landscape a virtual content 115a is displayed. The Universe may manage display location of the virtual content 115a via the corresponding Server Prism 113a that is associated to the Client Prism 215a (e.g., the virtual content 115a after it has been processed by the centralized rendering system). The application 140 may request a new Prism by accessing Universe Server 205. In some embodiments, the universe server 205 may be a software module in the Universe that communicates with centralized rendering service client(s) 250 from applications that provide virtual content for display in the user's landscape 110. For example, when a user wants to launch an application and display virtual content from the application in the user's landscape, the application may provide the virtual content to the Universe via the centralized rendering service client from the application to the universe centralized rendering service on the Universe to be displayed in a Prism that may be anchored in the user's landscape.

In some embodiments, the icon grid application 260 may comprise a recent application section (not shown) and/or a general application section (not shown). The general application section comprises an icon representing each application installed on the mixed reality system. The general application section may be initially populated with a call to a Package Manager (not shown) to determine a list of installed packages. An icon is added for each application in each package. When the Package Manager notifies the Universe of package installation and uninstallation, the icon grid application 260 adjusts its icons accordingly. The Package Manager Service manages the installation of applications and maintains information about those applications such as their names, icon graphics, security permissions, executable files and data files.

The recent icon section may be initially reconstructed from a log on disk, and then updated by calls from other services. The package name may be logged to disk when a Lifecycle Service notifies the launcher of an application start event, and when the Package Manager notifies the launcher of a package uninstallation event. A user may interact with the icon grid application 260 by choosing icons to launch, or extracting icons to place into the landscape.

The Lifecycle Service may be a centralized service that manages the process of starting, stopping, putting to sleep, and waking up applications. The Lifecycle Service also knows when applications terminate unexpectedly (crash). When any of these events happen, the service's listeners are notified, and the Universe is one of the listeners. The Universe accesses this service to start, stop, sleep and wake applications. In some embodiments, the Lifecycle Services provide application programming interfaces (APIs) for controlling the lifecycle of application processes running in the mixed reality system. The Lifecycle Services may spawn new processes to run application binaries with a set of permissions, and call APIs on a predefined interface implemented by the applications to control their lifecycle. The Lifecycle Service also provides a listener interface through which other modules may keep track of applications being started/stopped/paused/resumed. The Lifecycle Services may be a separate program from the launcher or the Universe. In some embodiments, the Lifecycle Services may be a middleware.

In some embodiments, as shown in FIG. 2, the icon grid application 260 comprises a centralized rendering service client 250b and a Client Prism 215c. As discussed above, in some embodiments, applications that display content within a user's landscape may send their content to the Universe via the centralized rendering service client 250 in communication with the universe server 205. Here, the icon grid application 260, which provides the icons of installed applications on the mixed reality system, for the launcher menu, is like any other application that provides content for display in the user's landscape. However, in some embodiments, the icons within the icon grid application, when selected by a user, may instruct the Universe to launch and startup a new application, at which point, the new application may request the Universe to create a new Prism (e.g. through Universe Server 205) so that the application may provide content to be displayed into the new Prism. If the application is already executing, the Universe may request the application to open a new Prism.

The status bar application 270 comprises status indicators for the mixed reality system. The status indicators and the status bar application 270 may not be adjustable by the user. The status indicators may be initially populated by querying a first service for operating and maintaining WiFi service, a second service for maintaining Bluetooth Service, and a third service for Status. When these services notify the Status Bar application 270 of an updated status, the status bar may adjust accordingly. The status bar provides the user quick glanceable information that they may react to quickly and efficiently from anywhere in the system. In some embodiments, the status bar may be displayed above the launcher. The four major sections in the status bar may be (1) global search, (2) notifications, (3) quick settings, and (4) power. Additional temporary sections may be added to the status bar when needed such as Music, Call, Sharing, etc.

When the user is in the Launcher menu, the status bar is condensed to glanceable icons. When the user swipes up to the top, it may trigger an animation and the status bar may expand. The status bar may stay up above the launcher while the user may swipe left and right through the launcher panels. When the status bar is highlighted, it may expand and animate forward. The sub-selection highlight may appear on the left by default, for example, on the global search. If there are other sections that have more pressing content (e.g., recent notifications, low battery, etc.) the sub-selection highlight may appear on that section instead.

The social panel application 280 may be composed of a series of contacts that the user may interact with. The social panel may be initially populated with a call to a Contacts Service for available contacts. Each contact may be added to the social panel and displayed to the user as an icon. When the social panel application 280 receives a new contact, updated contact, and removed contact events, the social panel application 280 may adjust its contacts information accordingly. The user may interact with contact icons by clicking on a contact icon to pop up an option menu with the various contact providers available. When the user selects a provider, the launcher application may start an associated application with the contact's information.

The store panel application 290 may allow the user to search for, download, and install application(s) 140 for the mixed reality system. When a user requests to download and install an application, the launcher application 230 may verify the user's identity with an identity verifying service (not shown), then may install the application with the Package Manager. The Lifecycle Service may be invoked if the user starts the application from the panel. In some embodiments, each panel in the launcher may function as separate applications instead of as one launcher application.

In some embodiments, the universe client 225 renders content specific for the Universe. The universe server 205 does not render $3^{rd}$ party applications. This is because content within a Prism can only be rendered by the universe client 225 and not the universe server 205. Thus, to render the infinity Prism, loader volume/Prism, and/or Secondary UI Prisms, work may need to be delegated to the universe client 225 to render those particular types of content for the server. An infinity Prism may be used by the universe to render additional graphics around Prisms, for example, when two Prisms collide. Infinity Prisms are discussed further below. With the loader Prism and the Secondary UI Prisms, there may be specific communication between the universe server 205 and the universe client 225 to coordinate certain functionalities. For example, the universe server 205 may be told that an application is done loading. The universe server 205 may then notify a client-side loader Prism that was currently loading the application. The loader Prism would have to react to the event that the application is done loading by showing the animation. Once the client-side loader Prism is done showing the animation, the loader Prism may notify the universe server 205 that it is done animating. Then, the universe server 205 may react to notification that the loader Prism is done animating by force-placing the loader Prism, destroying the loader Prism, and displaying the App Prism with the rendered animation in place of the loader Prism). What has been disclosed is just one example of how the universe client 225 functions. One of ordinary skill in the art may appreciate there may be other examples of when the universe client 225 may assist the universe 130.

Figure 3:
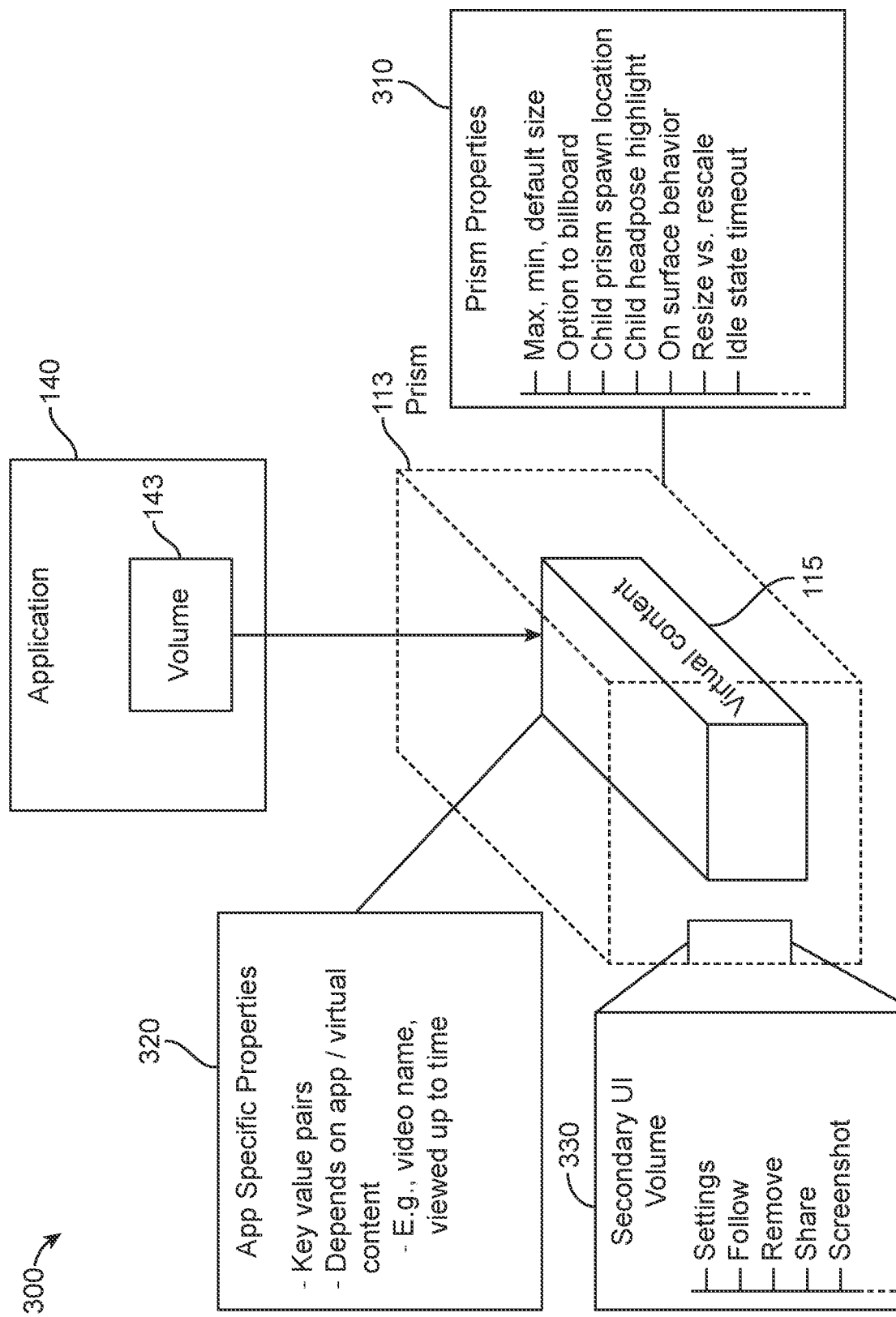
FIG. 3 shows a Prism/bounding volume, according to some embodiments.

FIG. 3 shows an example bounding volume/Prism, according to some embodiments. Application content is presented to a user inside of one or more bounding volumes called Prisms. As discussed above, when a non-immersive application is executed in the mixed reality system, its content is rendered inside of a Prism. The properties and characteristics of a Prism allow the Universe to consistently manage Prisms within the user's landscape.

The volume space of a Prism 113 may have clear and definitive boundaries as indicated with dashed lines in FIG. 3. The boundaries provide a bounding volume for the virtual content 115 to only be displayed within the boundaries of the Prism 113. The boundaries of the Prism prevent the content from the application, displayed within the Prism, to overflow or spill outside of the Prism and into the user's landscape. The boundaries of the Prism 113 may not be displayed to the user when the user sees the virtual content 115 displayed within the Prism 113. This is an important feature because, in order to maintain a realistic display of a 3D content within the user's landscape, it is important to not show the boundaries of the Prism that are bounding the virtual content 115. One of ordinary skill appreciates the importance of not displaying the boundaries of the Prism that wraps around the virtual content 115 so the virtual content may be displayed in a more realistic way in the user's landscape. In contrast to 2D windows, the borders and boundaries of a 2D window is generally displayed so the user of the computer displaying the 2D windows may clearly distinguish content within one 2D window from content from another 2D window. In some embodiments, however, it may be advantageous to at least temporarily display the boundaries of the Prism, for example, to help troubleshoot problems with one or more applications.

Applications are given instances of Prisms 113 by the Universe to place content within. Applications may render 2D and/or 3D content within the Prism 113 using relative placement algorithms and/or arbitrary transforms, but the Universe is still ultimately in charge of gross interaction patterns such as content extraction. Multiple applications may render to the Universe via the Prisms 113, with process boundaries separating the Prisms.

Each Prism allocated in the Universe has an associated set of key-value properties that may be adjusted and may determine various bits of behavior or convey information about why a given Prism exists. Some properties are read-only for normal applications, but for applications with the private API, these properties are writeable. A Prism 113 may comprise Prism properties 310, application specific properties 320, and virtual content 115. Additionally, some Prisms 113 comprise Secondary UI volume 330 for providing users with additional Prism management options. However, in some embodiments, Prisms may not have a Secondary UI volume 330, for example, because these other types of Prisms (e.g., Launcher Menu Prisms) may not require the features provided by the Secondary UI volume 330. As with the boundaries of the Prisms, the Secondary UI volume 330 may not be displayed to the user as well. When a user wants to make changes to a Prism, the user may initiate a request to display an Application Options Menu that displays the UI controls of the Prism within the volume space of the Secondary UI volume.

Depending on the application that they hold, Prisms may require different properties in order to afford the proper feedback and behavior for their content. Application developers may select from a number of pre-programmed options for their Prism when they create their application so their content may be represented correctly, based on their preferences. Below are examples of some of these options.

The Prism properties 310 define a Prism, at least in part, and allow the Universe to manage and maintain the Prisms within the user's landscape. For example, Prism properties 310 may include one or more of a default size, a maximum size, a minimum size, an anchor/placement type (e.g., Option to billboard, etc.), a behavior of a given Prism to the anchor type, an anchor location, a child Prism spawn location, a child head pose highlight, an on surface behavior, an independent transformation control, a resize vs. rescale indicator, an idle state timeout variable, etc. The Prism properties 310 allow the Universe the ability to track and manage each and every Prism within the user's landscape. Having a single application managing the virtual content displayed within the user's landscape assures content displayed within a user's landscape are displayed in a consistent and reliable manner. Some of the Prism properties 310 are further disclosed below.

Maximum, Minimum and Default Size: Applications may have upper and lower bounds specified by an application developer (optionally, with additional limits from the Universe). Additionally, application developers may have a Default size when the application first launches.

Option to Billboard During Movement Sequence: Certain objects (e.g. content that is planar), make sense to billboard towards the user during a movement sequence to encourage legibility and less management. For example, a certain content displayed on a planar surface may be positioned at a specific location and/or relative to an object, but their orientation is automatically computed so that the content displayed on the planar surface always faces the direction of the user viewing the content displayed on the planar surface. Other optional body dynamics behaviors could be added to this as well.

Child Prism spawn location: Prisms may spawn children to create flexible layouts. The application developers should be able to determine a responsive range of locations in which the children may spawn relative to the parent Prism.

Child Head pose Highlight: Applications may be able to choose whether head pose highlight on children Prisms may be treated as separate highlights or if it continues to highlight all Child/Parent Prisms as one unit.

Child Prism relational behavior: Prisms may determine whether their child Prism(s) may be anchored to them or not in translation, rotation and scale, and also choose whether the child Prism(s) will close with the main Prism.

On Surface behavior: Prisms may be snapped to a surface and query that surface to determine if they want a size/scale change. If the surface has space, the Prism may resize to fit all or a percentage of the surface and factor in field of view (FOV) of the user.

Independent transformation control: An application may request independent control over its translation, rotation, and scaling. This may allow the application to move and transform itself.

Resize vs. Scale: Some applications may choose to resize their bounds instead of only scaling their content. This may accommodate more content to be displayed within their bounds. This may function more like existing computer 2D windows.

Idle State Timeout: Applications may be able to choose how long it takes for them to go into their idle state. This may handle situations where applications may wish to continue playing content even though they are out of view. For example, an application that displays live video may wish to continue to display content and play audio even though the user has temporarily looked away.

The application specific properties 320 may be a list of key value pairs that stores the application specific state information for each Prism. The list of key value pairs are specific to the application and the key value pairs provide the state information of the content of the application that is being displayed or rendered within the Prism. The list of key value pairs may be different for each Prism, depending on the application that is rendering into the Prism. For example, if the application is a video streaming application, some key value pairs may include a video name, a viewed up to time for the video, an aspect ratio for displaying the video, etc.

Both the Prism properties 310 and the application specific properties 320 for each Prism may be stored within a data structure of the local database 137. The Prism data are constantly updated while the user is operating the mixed reality system and interacting with the Prisms. As discussed above, the Prism instance data of the local database 137 may be persisted by synchronizing with the external database 150 on a periodic basis. In some embodiments, the local database 137 and the external database 150 may be synchronized in near real-time.

When a user launches an application in the Universe, the user may pull a Prism out of the Launcher Menu and place the resulting volume into space. Other methods of launching an application may be used, such as clicking on an application icon. In some embodiments, the user may move the Prism around in altitude and azimuth (on a spherical shell) by moving a controller/input device (e.g., a totem) up or down. To move the object closer or farther away, the user may use a joystick on the totem to "push" or "pull" the Prism, or may slide the user's finger over a touch sensitive part of the totem. This has the effect of changing the radius of the shell. In some embodiments, two buttons on the totem may cause the Prism to grow or shrink. Finally, rotating the totem itself may rotate the Prism. This assumes totems may have six degrees of freedom (DOF). This is consistent with the kind of controls used in VR painting applications, for example, but the totem could be any suitable user input device.

In some embodiments, Prisms may not allow themselves to be placed in such a way that they fully or partially intersect other Prisms. Prisms may either not intersect at all, or may not inhabit/be actively displaying at the exact same location (anchor point), with the exception that Prisms may overlap a small amount for physics purposes, as discussed below. If more than one Prism is placed in the exact same location, the active application may be displayed and other applications anchored at the exact same location may be hidden. The user may be able to tell there are multiple applications at a location by, for example, dots displayed in the volume. For example, if there are three Prisms/applications at a particular spot, there may be three dots. If the user is viewing application #2 of three, then the second dot may be brightened, while the other dots may be dimmed. The user may then swipe or scroll through different applications. The graphics may switch, and the dots may update (e.g., by brightening the active dot) to show which application is currently active.

In some embodiments, several Prisms may be co-located at the same anchor location. At first glance, this may seem like an odd thing to do. With all of 3D space available for placing applications in the user's landscape, why place them in the same spot? Actually, it makes perfect sense. For example, a user's favorite place to play virtual board games may be on a kitchen table. In the morning the user may like to play "Ticket To Ride" while eating breakfast. But when the user gets home from work, the user may like to play "Risk" against a computer. The user may have a plurality of board games located in the same spot, and switch between them when necessary.

In some embodiments, Prisms may be placed at an arbitrary location in space. In this case, the Prism may be anchored by a center point of the cubic/rectangular volume. But if (e.g. during placement) a Prism is moved near a horizontal surface in the landscape, the Prism may try to snap to the surface. The anchor point may then become the center of the bottom plane of the Prism. Similarly, if a Prism is moved towards a vertical surface (e.g. a wall) then it may try to snap to it, and the anchor point may become the side of the Prism that is next to the vertical surface.

The purpose of an anchor point may be to place the Prism so that it does not interpenetrate with the surface the Prism is anchored to. The anchor point may also move with the object it is anchored to. When multiple Prisms share the same location, that location may be the anchor point and not the center point of their respective volumes. Applications don't know and don't need to know where they are located, but the applications may ask their respective Prism to see how the respective Prism is being anchored. Applications may also specify which anchoring types are valid. For example, it doesn't make sense to anchor a Halcyon to a vertical surface.

All of the content (graphics) for the application may be contained within the volume of the Prism. The Universe may mask out graphics that extend outside the Prism automatically. Because applications don't know about other applications in the world, the Universe may manage interactions that happen between different Prisms of different applications.

The user interface design for placing Prisms may call for Prisms to sway in a physical way (like an object on a string) while the Prisms are being moved in the placement state. Instead of trying to predict what kinds of physical behaviors different applications are going to want, the Prism may feed movement information to the application (through a binder interface) while it's being placed. The application may then behave appropriately.

There may also be physical behavior between Prisms as they are being placed. This may override the application's physicality implementation, and the application may stop receiving movement data.

Prisms may initially resist intersecting. If the user continues to push two Prisms into the same location, then the Prisms may snap to the anchor location of the Prism it's intersecting with. This could be done in a way that feels elastic (e.g., similar to soap bubbles interacting with one another) and is roughly based in physics.

Audio emitters may be placed as child nodes in an application's scene graph. These nodes may be local to a root node transform. Thus, a Prism may be moved wherein the movement of the Prism does not require the application to update the audio node's transform. The Universe may be responsible for the final transform of the audio emitter to the world space. The Prism may also be responsible for constraining audio nodes to its boundaries. Applications may not emit audio from a point outside of their respective Prisms.

In some embodiments, it may not be desirable to spatialize audio. For example, if a user places a virtual TV on a wall, and is focused on the TV image, the TV's audio may be provided through to the user without modification. This is likely to provide a better audio experience to the user. In the case of surround sound, the audio signal already has spatial information. The sound may be emitted from virtual speakers placed in optimal locations relative to the TV.

In some embodiments, on a button press to control audio strength by the user, the Universe may check the head pose to determine which Prism the user is looking at and send a volume-up or volume-down event to the corresponding Prism. The Prism may forward that information on to the application running in the Prism, and the application could decide how to interpret it. If there are no applications in focus in the landscape, then volume button settings may adjust the global volume.

In some embodiments, one difference between traditional 2D windows and Prisms 113 is that with 2D windows, borders that set the boundaries of a 2D window are intended to be seen by users to provide a concrete border for encompassing content within the 2D window separate from content outside of the borders of the 2D window. However, in some embodiments, borders of the 3D windows (e.g., Prisms 113) are meant to be invisible. If users can see the outline (e.g., borders) of every Prism, it would break the illusion of "reality" and the virtual content displayed within the Prism having its borders displayed would appear like computing/digital/virtual content instead of real. In some embodiments, the borders may be displayed, for example to enable user manipulation as needed.

Another difference is that 2D windows are commonly meant to be controlled and/or interacted with by the user. For example, a close button may be always appearing in the upper right-hand corner of a traditional 2D window, or a menu bar may be displayed at the top border of a 2D window. However, with the Prisms, a user generally does not interact with the Prism and its boundaries. Instead, a secondary menu (e.g., an apps option menu) may be pulled down temporarily for the user to control and manage/manipulate the Prism from a list of options.

Furthermore, 2D windows are independent from its surroundings. For example, what is displayed on a computer screen does not automatically change if the user moves the screen. However, Prisms need to be placed in context with the real world. For example, each Prism may be placed into the real world relative to (1) objects in the real environment such as a wall, a table, etc.; (2) virtual objects created to provide a backdrop or canvas for the Prism to anchor to; and/or (3) the user. In some embodiments, the Prisms may be placed in context with a passable world as well as the real world.

Yet even further, in some embodiments, Prisms may not be allowed to overlap/interpenetrate with one another, with the exception that Prisms may overlap a small amount for physics purposes. For example, in some embodiments, when virtual content within two or more Prisms collide, the virtual content may appear to show a bounce between the two virtual contents when they appear to collide with one another. Here, the Prisms may overlap for a small amount to create the effect of the bounce between the two virtual content. In some embodiments, when the bounding boxes for two or more Prisms collide, the Prism, and hence the Prism's content, may appear to bounce. However, 2D windows on a computer do overlap and, in many cases, 2D windows may be cascaded on top of one another, hiding each other from view of the user. In some embodiments, if two Prisms are anchored at the same location in the user's landscape 110, one of the Prisms may be displayed while the other Prism is minimized from display wherein an icon or a text or an image (or any other visual indicator) is displayed to indicate to the user that another Prism is anchored at the exact same location. In some embodiments, an infinity Prism may be implemented to render additional graphics around Prisms, for example, when they collide. In some embodiments, an infinity Prism may be a Prism with its bounds set to infinity. For example, if two Prisms are close to colliding, the Universe may render a glow in the region of space between the two Prisms. In order to handle these exceptions, the Universe may create an infinity Prism that may encompass all space around/surrounding the two Prisms, the user's entire field of view (what the user can currently see), the user's entire field of regard (what the user could see if they moved around), etc. This may allow the Universe to draw graphics anywhere between the two Prisms. In some embodiments, the infinity Prism may not collide or interact in any way. In some embodiments, the infinity Prism does not have a secondary UI, etc. In some embodiments, only the Universe may have access to the infinity Prism. The infinity Prism may be created at Universe initialization and may always be present until the Universe shuts down. In a second example, an infinity Prism may be useful in order to have a character (e.g. avatar, personal assistant, butterfly, animal, etc.) move between the other landscape apps to, for example, explain to the user what each application is and/or how to use the application.

Figure 4:
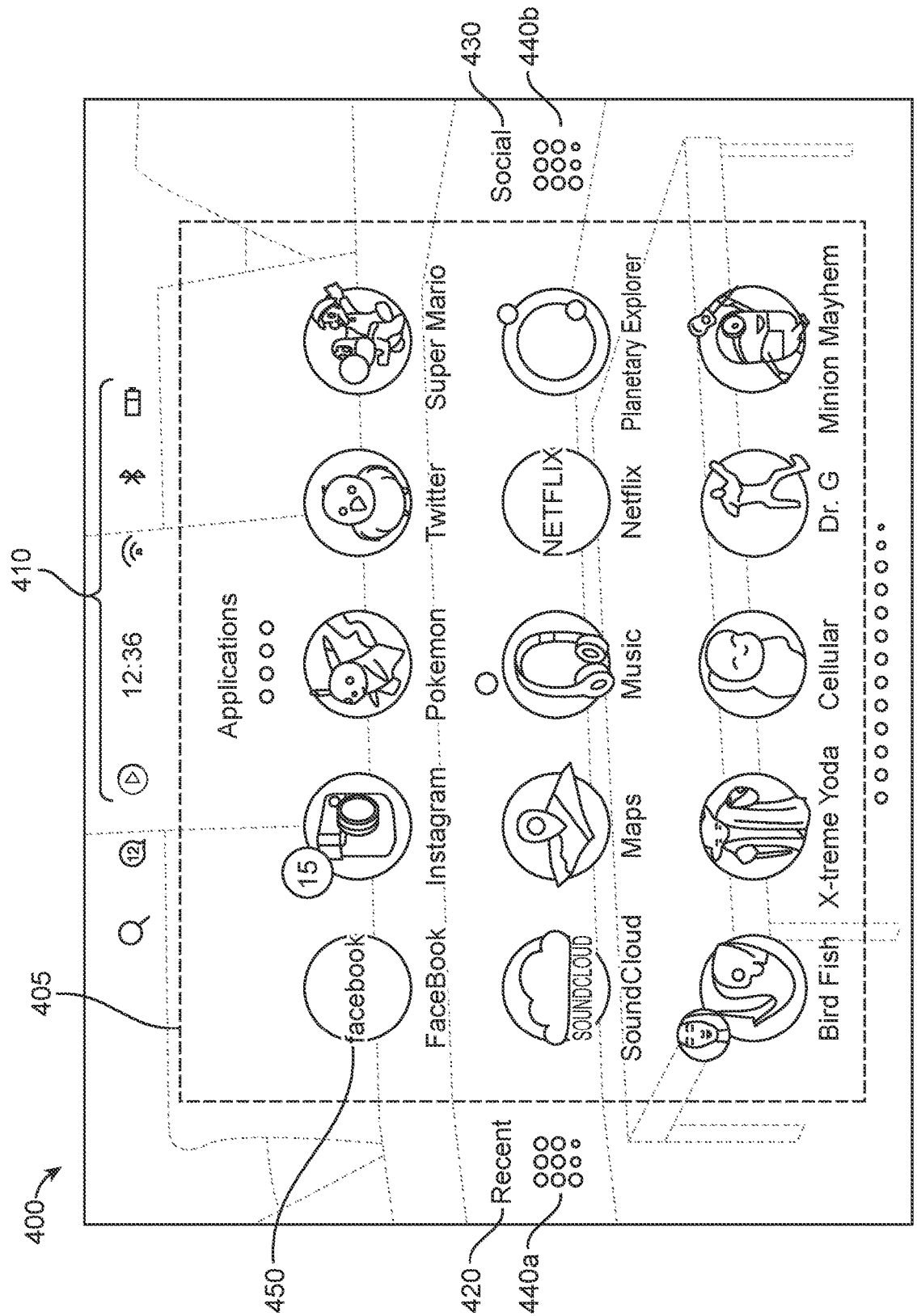
FIG. 4 shows a launcher menu for launching applications to display virtual content, according to some embodiments.

FIG. 4 shows an example launcher menu as seen by a user wearing, for example, a head-mounted system 160 for launching applications to display virtual content, according to some embodiments. The launcher menu may exist as its own application because of the elevated privileges it requires to launch other applications. The launcher menu 400 may comprise a status bar 410 and may have body-centric bounded volumes (e.g., Prisms) called panels. In some embodiments, the launcher panel comprises several different applications that give the appearance of a single application. For example, each panel may be a separate application, but may give the appearance of a single launcher application. The Universe may make explicit creation calls for each panel during a launcher menu summoning (e.g. a request to open the launcher menu).

In some embodiments, a separate application process may render into each panel. The processes may use the same content rendering techniques as the rest of the universe but, in some embodiments, with a one or more of the following exceptions: (1) The launcher menu may trigger the start of other applications; (2) The launcher menu icons and widget icons may be extracted and placed in the landscape—placed icons may be referred to as shortcuts; (3) The launcher menu itself may be placed in the landscape and moved around; (4) When content extraction has started on a launcher icon, the launcher may load a placeholder content anchored to the user's hand, 6dof controller, or other controller such that once the extraction is finalized, the Universe launches the application into a Prism that replaces the placeholder content; and (5) the user may swipe between panels in the launcher menu and expand individual panels. In some embodiments, the panels may not be implemented as carousels. Instead, the launcher panels may be co-located such that the main panel is always fixed as the central panel and content from the minimized panels are animated in and out of the central panel as the user performs a swipe left, right, up, or down. In some embodiments, the launcher application itself may be placed within the user's passable world by the user, thereby creating a launcher shortcut or placed launcher within the user's passable world and/or landscape.

In some embodiments, the launcher menu 400 may organize the series of body-centric panels as a panel carousel. The panel carousel may display one panel at a time such that each panel is running its own application process, and/or each panel is a separate application. In some embodiments, only one current panel 405 may be expanded and visible at a time. Two body-centric placeholder panels (e.g., 440*a* and 440*b*) may be a fixed distance from the current expanded panel 405 on either side of the current expanded panel 405. The placeholder panels 440*a* and 440*b* may be individual Prisms created by the Universe representing the condensed form of the two panels adjacent to the current expanded panel 405. In some embodiment, when the user swipes to the next panel, the panel represented by the placeholder may become the current Panel. The placeholder panel's physical model may remain the same no matter which panel it is representing. In some embodiments, the only visual difference between placeholders representing different panels is the label (e.g., Recent and Social as shown in FIG. 4). Other embodiments may have different panels in the same location but with a different icon specific to the panel, see FIG. 11.

In some embodiments, the launcher menu 400 manages the flow of panels, ideally caching the left and right panels. The panel carousel may comprise a recently accessed applications panel 420, a general applications panel 425, a social application panel 430, and a store panel (not shown). The recently accessed applications panel 420 may comprise icons of applications recently accessed by the user. The recently accessed applications panel 420 may be shown in a minimized state when the current panel 405 for the general applications panel 425 is currently displayed. The recently accessed applications panel 420 may be expanded to show its icons when the user swipes in the corresponding direction (e.g., to the right) to bring the recently accessed applications panel 420 front and center, or according to other embodiments, contents pertaining to the respective panels may animate in and out of the central panel. In some embodiments, the recently accessed applications panel 420 may display first, and may comprise a ring of applications. Any number of panels may be used, and those panels may display in any order. The order and number of panels may be based on user testing, ease of user, and/or user preference.

In some embodiments, the social applications panel 430 may be shown in a minimized state when the current panel 405 for the general applications 425 (or any other panel) is currently displayed. The social applications panel 430 may be expanded to show its icons if the user swipes in the corresponding direction (e.g., to the left) to bring the social applications panel 430 front and center, or in some embodiments, contents associated to the social applications are animated/displayed into the central panel while the labels on the placeholder panels are changed accordingly.

In some embodiments, the icons 450 of the general applications panel 425 may represent icons within an icon grid application similar to the icon grid application 260 from FIG. 2. The icons 450 may represent applications that are installed in the mixed reality system. A user may launch an application by selecting a particular icon 450. In some embodiments, a user may extract the icon 450 from the panel and place the icon 450 in the user's landscape, at which point, the Universe may initiate the startup process for the application corresponding to the extracted icon 450. When the corresponding application completes its rendering of its content, the extracted icon 450 may be replaced with a Prism, with the application's rendered content displayed within the Prism.

As discussed above, in some embodiments, the status bar 410 may comprise status indicators of the mixed reality system. The status indicators may be initially populated by querying, for example, a first service for operating and maintaining WiFi service, a second service for maintaining Bluetooth Service, and a third service for Status. When these services notify the Status Bar of an updated status, the status bar may adjust accordingly. The status bar may contain status indicators for services such as audio volume, current time, WiFi connection/strength, Bluetooth and power. Other services may be included in the status indicators, in combination with or in replacement of the services mentioned above.

In some embodiments, on a request to launch an application from the launcher menu 400, an icon grid application may communicate with the Universe, through for example, a Prism service and/or a Universe service, to start an application. The universe may create a Prism with a specified package name and/or component name. The Universe may give the Prism to the application using the application's listener. The Prism may now be in "placement mode." Once the user has placed the Prism, the user may modify the Prism in any number of ways, for example, using the Secondary UI application options menu.

Figure 5:
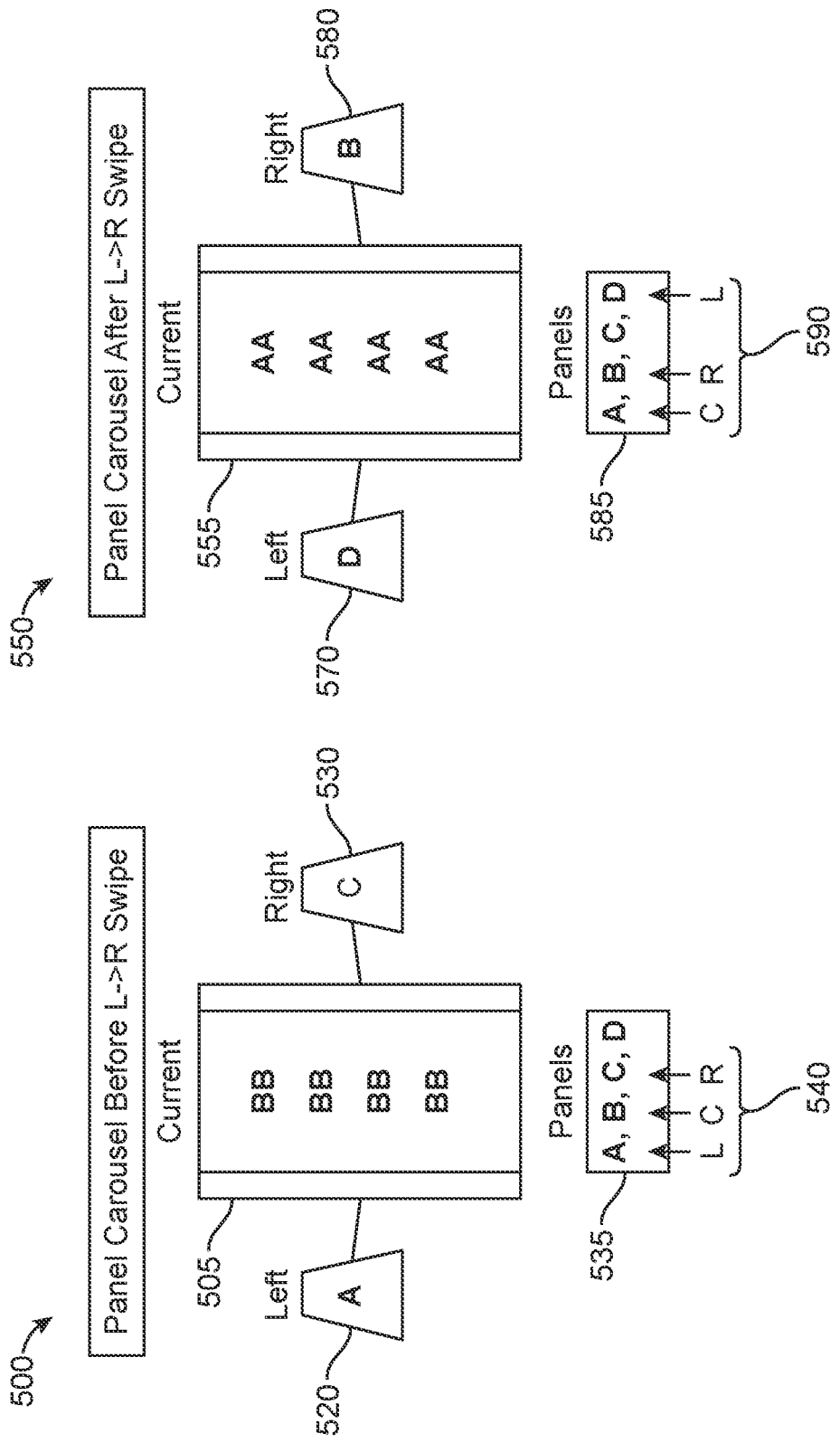
FIG. 5A-5B shows a panel carousel change, according to some embodiments.

FIG. 5A-5B shows an example panel carousel change, according to some embodiments. FIG. 5A shows an example view of a launcher menu having placeholder panels represented as the Left 520 (e.g., 440*a* from FIG. 4) and Right 530 (e.g., 440*b* from FIG. 4) Panels before a Left to Right swipe. Current active panel 505 shows an example icon grid depicting icons within the icon grid as "BB" within the active panel 505. In some embodiments, the icon grid may be a grid, a list, one or more columns with one or more rows, a circle of icons, and/or one or more icons forming any other shape. Miniature panel 535 shows the available panels in the panel carousel (in some embodiments, the miniature panel 535 is not shown to the user). Panel position indicators 540 showing a center panel represented as "C" pointing to the "B" panel, a left panel represented as "L" pointing to the "A" panel, and a right panel represented as "R" pointing to the "C" panel with the "D" panel not currently in view, and thus, not designated with a panel position indicator 540 (in some embodiments, also not shown to the user).

FIG. 5B shows an example view of the launcher menu as shown in FIG. 5A after a Left to Right swipe. The new active panel 555 is now the "A" panel, having "AA" as the icons within the icon grid of new active panel 555. The two placeholder panels Left 570 panel shows the "D" panel and the Right 580 panel shows the "B" panel from the previous active panel 505 in FIG. 5A. Additionally, Miniature panel 585 now shows the available panels in the panel carousel, as panels A, B, C, D. However, the Panel position indicators 590 have changed accordingly now showing the center panel represented as "C" is now pointing to the "A" panel, the left panel represented as "L" is now pointing to the "D" panel and the right panel represented as "R" is now pointing to the "B" panel.

In some embodiments, the placeholder panels themselves may remain constant, with only the label reflecting the changing underlying Panel. For example, in FIG. 4, if a user performed a Left to Right swipe, similar to the Left to Right swipe of FIG. 5B, the new active panel would be the "Recent" panel with the right placeholder panel being displayed with a new panel title of "General" and the left placeholder panel being displayed with a new panel title of "Store" (assuming only the panel carousel only has the four panels disclosed in FIG. 4). The image of the placeholder panels may stay the same, but the titles of the left and right placeholder panels may change accordingly. The Panel shifts may be based on the switching actions of a user motion, for example, a swipe left to right. One of ordinary skill in the art may appreciate that any other methods of switching between panels may also be used.

Figure 6:
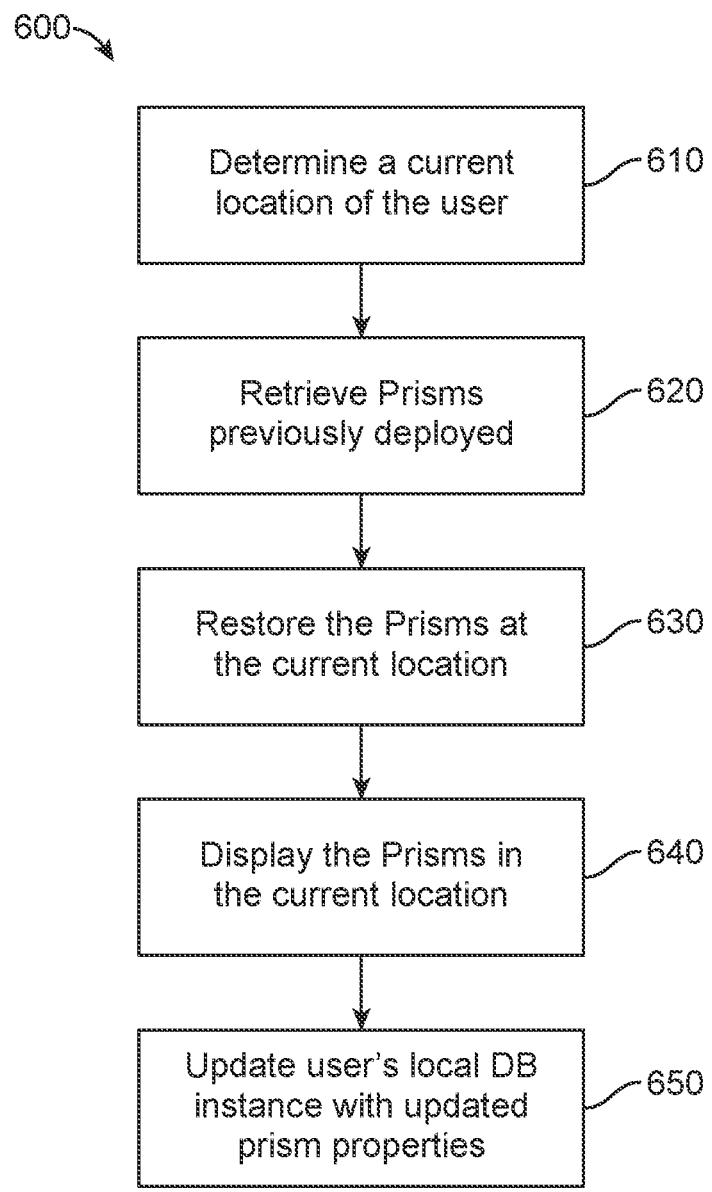
FIG. 6 shows a flowchart for an approach for starting a mixed reality system, according to some embodiments.

FIG. 6 shows a flowchart for an approach for starting a mixed reality system after a previous use of the mixed reality system, according to some embodiments. Startup process 600 shows a process for powering up/starting a mixed reality system, after a user has previously used the mixed reality system and powered off the mixed reality system. At 610, the mixed reality system identifies the location of the user and establishes a head pose to determine the location and/or orientation of the user (e.g. the user's head). The head-mounted system 160 may include GPS for determining, at least in part, a location of the user.

At 620, the Universe may access a passable world system (e.g., external database 150) and retrieve instances of Prisms previously displayed in the current user's landscape. The passable world may return instance data so the Universe may reconstruct the previous state of the Prisms in the user's landscape by reconstructing the user's local database 137 with the retrieved Prisms instance data. The passable world system persistently stores information about the environment of the user, for example, which Prisms were previously active in the user's landscape 110 as well as the state of each Prism when the user previously shut down the system. Since the user's Prism instance data that is stored in the local database 137 may be erased when the user shuts down the mixed reality system, upon restart of the mixed reality system, the user's Prism instance data in the local database 137 may be reconstructed based on the instance data retrieved from the passable world system (e.g., external database 150 from FIG. 1).

In some embodiments, the instance data may include, one or more of the following, for each Prism, (1) Prism properties, wherein the Prism properties may comprise location, orientation, extent width, extent height, extent depth, anchor types, and/or anchor positions; and (2) application specific properties comprising state information of the virtual content previously rendered by respective applications. For example, if an application rendering into the Prism is a video streaming application, the application specific information may include the title of the video, the point in time the video was played up to, and the aspect ratio of the video being rendered. The application specific information may be a list of key-value pairs that stores state information for each application. The list of key-value pairs may be specific to respective applications and the key-value pairs may provide the state information for the content of the application that is being displayed or rendered within the Prism.

In some embodiments, each user 103 may have their own Prism instance data stored in their local database 137 while a master Prism database instance data is stored in the passable world system (e.g., external database 150) that includes other Prism instance data for other users of the mixed reality system and/or Prism instance data for other locations besides the user's current location. Prism data for users of the mixed reality system may be stored in the passable world system. In some embodiments, a first user may want to share a virtual content displayed within a Prism from the first user's landscape with a second user who is using a mixed reality system at the same location, or in some embodiments, at a different physical location than the first user. Since the Prism information is available to the first user at the local database of the first user, upon sharing the Prism to the second user, instance data for the Prism from the first user may be uploaded to the passable world system. The instance data for the Prism may then be transmitted to, or retrieved by, the second user to be stored in a local database of the second user so that a universe application of the second user may reconstruct the Prism's instance data into the second user's local database and consequently, display the Prism into the landscape of the second user.

At 630, the Prism may be restored at the current location of the user. Once the instance data for the Prisms that were previously deployed at the user's location is reconstructed in the user's local database 137, the respective applications corresponding to the Prisms that were previously deployed at the user's current location may be launched. Since the mixed reality system is just starting up, the applications which were previously providing content to the mixed reality system may need to be started, but at this point, only the applications that were previously providing content to the user's landscape need to be launched. As part of the launching of the applications, the applications may request that the Universe create Prisms for the applications to render content into, wherein the Prisms to be created correspond to the Prisms that were previously deployed prior the user shutting down the mixed reality system, for displaying in the user's landscape. Once the applications are launched and the Prisms are created, the applications may provide the content to the Universe for rendering the content into respective Prisms.

In some embodiments, one application may provide content to more than one Prism deployed at the user's location. In such an embodiment, the one application may deploy multiple instances or processes of the one application to render content for each instance or process of the one application into one or more Prisms.

At 640, the Prisms may be displayed into the user's landscape at a location that the Prisms were displayed prior to the user shutting down the mixed reality system. Because the Prisms and the applications that render into the Prisms are persisted, the mixed reality system may reconstruct the user's landscape by deploying/displaying the Prisms along with the respective virtual content at the location of the user's landscape based at least in part on each the Prism properties of each of the Prisms. In some embodiments, placeholder Prisms such as loader volumes 210 from FIG. 2 may be displayed in a location of a currently loading Prism upon startup. In such embodiments, once the new Prisms are created and restored, displaying the new Prisms in place of the placeholder Prisms may be as simple as replacing the respective placeholder Prism with the newly created Prism at the location of the placeholder Prism. If a Prism had the property marking it as being anchored to the user instead of the landscape, then that Prism may be restored in a position relative to the user's current position.

In some embodiments, an application rendering in a Prism may be deployed in a state consistent with the state when the user previously shut down the mixed reality system. For example, a user's field of view of the user's landscape may have had four Prisms deployed where one of the four Prisms had an application that was in a sleeping state, while the other three Prisms each had an application that was actively rendering. When the mixed reality system is restarted and the four Prisms are displayed, three of the Prisms may have an actively rendering state while the fourth Prism may have an application that is in a sleeping state until either the user reactivates the sleeping state of the fourth Prism, or the Prism is configured such that if the user looks in its general vicinity, the state may be automatically changed to actively rendering. Changing the state of a Prism is further disclosed below. In some embodiments, other methods may be used to change the state of a Prism.

At 650, the user's local database may be constantly (or at a regular interval, or as triggered by an event) and automatically updated with Prism information as the user interacts with the Prisms in the user's landscape. For example, when applications for certain Prisms change state from actively rendering to active but not rendering, or to sleeping, the user's local database is updated with the updated state information for the application within that Prism. The updated information from the user's local database may be immediately or periodically updating the passable world system (e.g., external database 150) to ensure the passable world system is kept up to date with the changing state of the applications and Prisms within the user's landscape. One of ordinary skill in the art may appreciate that this is merely one example of how a Prism property or an application specific property is changed and how updates are made to the local database and then to the external database and that many other similar types of changes to a Prism or to the application that is providing content to the Prism may be made.

The problem of keeping virtual content from one application displayed in a 3D spatial environment private from, but still interactable with, virtual content from a different application displayed in the 3D spatial environment may be solved by having one program manage the content creation (e.g., application(s) 140 from FIG. 1) and a separate program (e.g., universe application 130 from FIG. 1) manage the content display.

Figure 7:
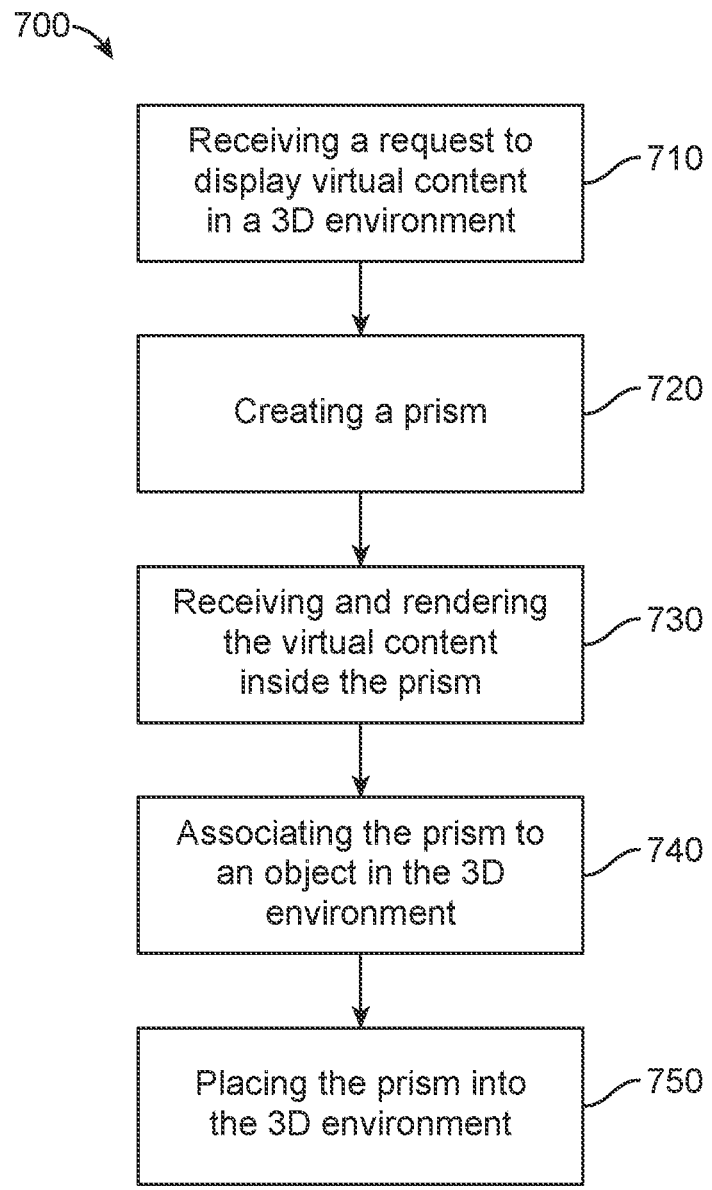
FIG. 7 shows a flowchart for an approach for displaying a virtual content in a mixed reality environment, according to some embodiments.

FIG. 7 shows a flowchart for an approach for displaying, by a universe application, a virtual content provided by an application into a mixed reality 3D spatial environment, according to some embodiments. At step 710, a universe application of the user may receive a request to display virtual content in the user's landscape (e.g., 3D spatial environment). In some embodiments, the request may have been initiated by a user interaction with a launcher menu wherein the user chooses an icon from an icon grid to launch an application to provide virtual content into the user's landscape. As discussed above, one application may (e.g., application 140 from FIG. 1) manage the content creation and a separate application (e.g., universe application 130 from FIG. 1) may manage the content display. This separation of processing may allow multiple applications to create content to display within the user's landscape while the management of the display of the content is managed by a separate application to ensure the multiple virtual content displayed within the user's landscape is displayed accurately and realistically to the user, especially when the virtual content begins to interact with one another.

At 720, the Universe may create a Prism so that the content created by the application may be displayed within the boundaries of the Prism in the user's landscape. It is important to note that although the Prism may include boundaries which defines the boundaries of the volumetric space of the Prism, the borders of the boundaries of the Prism may not be displayed to the user. This may be important because the virtual content rendered inside the Prism to be displayed in the user's landscape should appear as real as possible to the user viewing the virtual content in the user's landscape. If the borders of the boundaries volumetric space bounding the virtual content is viewable to the user, the virtual content may inevitably appear as computer generated within a confined space. Therefore, although the Prism may include borders and boundaries to confine the virtual content within the boundaries of the Prism, the borders may not be displayed to the user. Borders of the Prisms may be displayed in certain circumstances such as during system development and testing, etc. In some embodiments, the borders/boundaries of the Prism may be displayed to the user, for example, during placement so the user can more easily understand where the Prism will be located.

In some embodiments a single application may be requested by the user to display multiple virtual content within the user's landscape. Each virtual content displayed by the single application may be associated to and displayed by its own individual Prism, or may share a single Prism. Therefore, in some embodiments, if the application requests additional virtual content to be displayed, the Universe may create one or more additional Prisms for the application, where each of the additional content may require its own Prism to be deployed/anchored within the user's landscape.

The Prism created may be provided with a unique identifier of the application requesting to display the content so that the when the application provides the content to be displayed in the user's landscape, the Universe may be able to uniquely identify the Prism to render the content received from the application. Furthermore, the Prism may be created with automatically having a set of functionalities predefined, which, in some embodiments, may be predefined by the application and/or the Universe. For example, the set of functionalities may include a default min/max size allowed for the Prism, an aspect ratio for resizing the Prism based on how far or close the Prism may be anchored in the user's landscape relative to the user, an anchor type for anchoring the Prism in the user's landscape, etc. The set of functionalities may be stored in the local database as Prism properties. Furthermore, depending on the application invoking the creation of the Prism, certain application specific properties may also be created for the Prism as well.

At 730, the universe may receive the virtual content created by the application. Upon receipt of the content, the Universe may render the virtual content to be displayed within the boundaries of the Prism. As discussed above in FIG. 2, in some embodiments, the application may create the content and may send the content via the centralized rendering service client to the universe centralized rendering service running in the Universe. From there, the Universe may render the content into the Prism created for the application requesting to display the content. The Universe may also be responsible for ensuring that the Prism is displayed correctly in the user's landscape. For example, the Universe may make sure that the Prism does not overlap with other Prisms in the user's landscape. The Universe makes sure that a new Prism cannot be placed in an overlapping position relative to existing Prisms or real world content, unless an exception as described above applies (e.g., common anchor point). The Universe may not allow a user to place a Prism in a location where Prisms overlap. In some embodiments, the client/server communication with the applications may not be necessary. If the operating system (e.g. the portion of the system that manages the rendering) is configured for multi-threading, then the applications could render themselves into Prisms directly without the client/server structure. A central authority, like the Universe server could then be responsible for managing collisions, moving, inputs, etc.

At 740, the Prism may be associated to (1) a fixed location in space in the user's landscape, (2) a physical object within the user's landscape, (3) a virtual object displayed within the user's landscape, or (4) a fixed distance relative to a particular object (e.g., the user's body or body part, also hereinafter referred to a body-centric anchor), based on either a user's input or a default anchoring rule that may apply to the particular application or Prism. In some embodiments, the body-centric anchor may be relative to the user's body parts (e.g., body fixed), or a head/view position (e.g., head fixed). For example, the Prism may be associated to a body fixed position such that the Prism is fixed relative to the user's body. If the user moves his head, the content may not move, but if the user walks, the Prism may move with the user to maintain the fixed position relative to the user's body. As another example, the Prism may be associated to a head fixed position such that the Prism is fixed relative to a user's head or pose. If the user rotates his head, the Prism may move relative to the user's head movement. Also, if the user walks, the content may also move relative to the user's head.

At 750, the Prism is placed/anchored into the user's landscape. Depending on how the user launched the application, the Prism may already have been associated with a particular anchor/location. For example, the user may have launched the application by dragging the application icon from an icon grid within a launcher menu and placed the icon on a particular location in the user's landscape, at which point, the Prism may be created at that location and the content is rendered into the Prism at that particular location.

Figure 8:
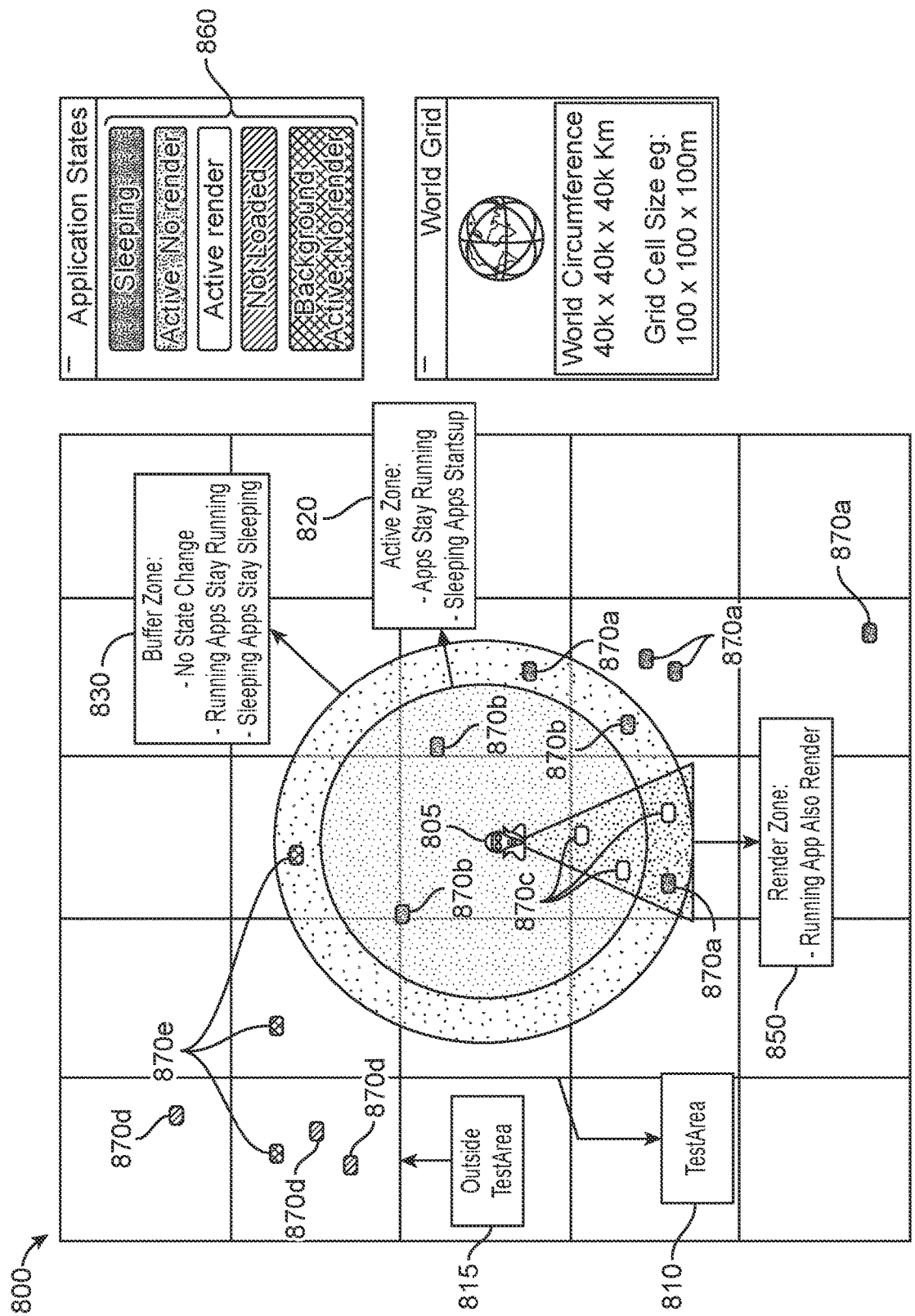
FIG. 8 is a diagram for managing application states, according to some embodiments.

FIG. 8 shows an example of a diagram for managing application states, according to some embodiments. The problem of high computing load for managing, rendering and displaying augmented reality content may be solved by automatically changing the state of Prisms based on a relative position and location of the Prisms to the user and in some embodiments, the user's field of view. Diagram 800 shows a bird's eye view of a user's location, according to some embodiments. The user 805 is shown to be within a volumetric grid that is a coarse representation of the planet (e.g., a physical environment) in an x, y, and z axis. Grid lines are shown for illustrative purposes to indicate a distance of the user 805 to Prisms have different Prism states of 870. Here, a 2D representation of the user's current location is depicted. One of ordinary skill in the art may appreciate this view may be a 3D representation of the user's current location. However, for simplicity purposes, FIG. 8 has been illustrated to show a 2D space.

The user 805 is shown to be in the center of a three by three cell external zone 810. Additionally, the external zone 810 is segmented into two circular areas comprising an active zone 820 and a buffer zone 830. The external zone 810 comprises a three by three cell grid wherein the user 805 is located in the center of the grid. As the user 805 moves through the user's landscape, other Prisms associated with respective applications may enter and leave the various zones as depicted in FIG. 8. The active zone 820 illustrates an area around the user 805 (e.g., a circular area) to indicate certain Prism states 870 of Prisms located within the active zone 820. For example, sleeping Prisms within the active zone 820 of the user 805 need to startup, while other Prisms that are running must remain running, even though their states are active but not rendering 870b located within the active zone 820.

Buffer zone 830 is a zone that is further away from the user than the active zone 820. Prisms within this zone may not require a state change. For example, running Prisms remain running as in, for example, the one Prism located in the buffer zone having a Prism state of Active but not rendering 870b. As another example, sleeping Prisms may remain sleeping as in the two Prisms within the buffer zone 830 with a Prism state of sleeping 870a. Prisms outside of the buffer zone 830 but within the external zone 810 may remain in a sleeping state since they are far enough from the user 805 that they may not need change state. Finally, Prisms located in the outside relevant cells 815 may have Prism states of not loaded, sleeping or background because they are located so far away from the user 805 that it may be beneficial to the mixed reality system to save processing resource by not running those particular Prism until the user 805 is within a closer distance from the respective Prisms.

Prism state legend 860 discloses the various different Prism states of Prisms based on a color scheme, wherein a red color Prism indicates a Prism state of sleeping 870a, an orange color Prism indicates a Prism state of Active, no render 870b, a green color Prism indicates a Prism state of Active and render 870c, a purple color Prism indicates a Prism state of not loaded 870d, and a blue color Prism indicates a Prism state of Background, active no render 870e.

The user 805 may have a particular field of view 840 where Prisms within the field of view 840 may be in a frustum 850. Wherein a frustum is a 3D region that is visible on a screen of the user 805 (e.g., via a head-mounted system 160 from FIG. 1). Running Prisms within the frustum 850 should be rendering, as indicated by Prisms having Prism state of Active and Rendering 870c. Since there is one Prism with a Prism state of sleeping 870a located within the frustum 850 and buffer zone 830, that particular Prism may be starting up and rendering when that particular Prism is located within both the buffer zone 830 and the frustum 850. In some embodiments, a head pose frustum may be used for culling the rendering of Prisms, wherein frustum culling is a method of determining hidden surfaces, such as hidden surfaces of Prisms.

Table 1 below illustrates a Prism state change chart wherein rows of the first column describe a current state of a Prism. The rows of the subsequent columns describe the change in Prism state from the current state into the new state as the Prism moves from a current zone into the new zone as indicated by the subsequent columns. The values in the rows of the subsequent columns describe the new state the Prism may change into (if at all), based on a relative distance of the Prism to the user 805.

TABLE 1

Prism State Change Chart

| Current State | New Event | | | | | |
|---|---|---|---|---|---|---|
| | Active Zone | Active Zone + Frustum | Buffer Zone | Buffer Zone + Frustum | External Zone | Outside relevant Cells |
| Sleeping | Active No Render | Active + Render | Sleeping | Sleeping | Sleeping | Not Loaded |
| Active + No Render | Active + No Render | Active + Render | Active + No Render | Active + Render | Sleeping | Not Loaded |
| Active + Render | Active + No Render | Active + Render | Active + No Render | Active + Render | Sleeping | Not Loaded |
| Not Loaded | Active + No Render | Active + Render | Sleeping | Sleeping | Sleeping | Not Loaded |
| Background Capable App | Active + No Render | Active + Render | Active + No Render | Active + Render | Active + No Render | Active + No Render |

For example, if a Prism is in a current state of "Sleeping" and based on the user 805's movement that may place the Prism within the active zone 820 relative to the user 805, the Prism state of the Prism may be changed to "Active No Render", because sleeping Prisms should start up when it is within the active zone 820 of the user 805. Additionally, following the same example, if a Prism is in a current state of "Sleeping" and once the Prism is within both the buffer zone 830 and frustum 850, the state remains unchanged since within a buffer zone 830, sleeping apps may remain sleeping, even within the buffer zone 830 and frustum 850. However, once that sleeping Prism transitions into the active zone 820 and frustum 850, the Prism may begin to start up and the Prism state may change to Active and render 870c.

Figure 9:
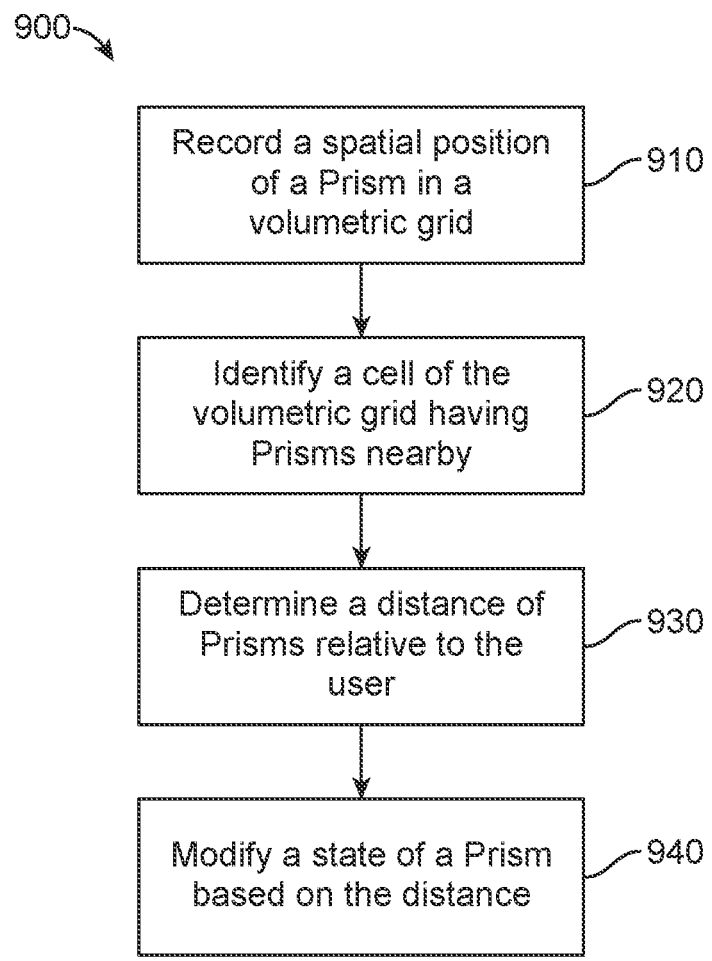
FIG. 9 shows a flowchart for managing an application state relative to a user location, according to some embodiments.

FIG. 9 shows a flowchart for managing a Prism state relative to a user location, according to some embodiments. At 910, a spatial position of Prisms may be recorded in a volumetric grid. The spatial position may be an anchoring location of a particular Prism that is placed/anchored within a user's landscape. For example, a Prism may be anchored to an object within the user's landscape, such as a wall or a table. As another example, a Prism may be anchored to a fixed location in space that is not associated to any particular object within the user's landscape, such as a floating 3D globe of planet Earth. When a Prism is started, its spatial position is recorded in a volumetric grid that may have an x, y and z axis relative to the world to identify the location of the Prism that the content of the Prism may be rendered into. Each Prism placed into the user's landscape may have a particular location stored (e.g., as a volumetric grid) within the Prism's data structure stored in the passable world system. The volumetric grid, as discussed above, may represent a coarse representation of the planet in an x, y and z axis format. Any other plausible coordinate or relative placement system could also be used.

At 920, a cell of the volumetric grid representing a 3D spatial area is identified. The cell may include one or more Prisms if the Prisms are spatially in close vicinity to one another. In some embodiments, the width of the cell may be equal to or larger than the radius of an active zone. In some embodiments, the width of the cell may be less than the radius of an active zone. The radius of the active zone denotes a measurement of distance from the user using a mixed reality device to a pre-configured distance (e.g., 25 meters) that would define a circular and/or spherical (or other suitable shaped) area of space as an Active zone 820 as depicted in FIG. 8. Alternatively, the volumetric grid may be divided into cells having a predefined length to further establish boundaries and borders corresponding to distances from the user using the mixed reality device to establish the different zones to implement embodiments of this disclosure.

At 930, a distance of known positions of each Prism within the cell and neighboring cells is determined when a user using a mixed reality device moves into a location of the cell. When a user using the mixed reality device moves through the user's landscape, a distance check to each Prisms' last known position is checked in order to manage the state of the Prisms within the vicinity of the user. In-order to prevent performing distance check across Prisms all over the world, the system may minimize the amount of distance checking/calculating/determining by using the volumetric grid and restricting the searching/checking/calculating/determining to only the cells around the mixed reality devices (e.g., the cell and neighboring cells). In some embodiments, only Prisms in cells occupied by the user are distance checked. In some embodiments, only Prisms in cells occupied by the user or adjacent to the cells occupied by the user are distance checked. In some embodiments, Prisms in all of the cells within the user's FOV/view frustum are distance checked. In some embodiments, Prisms within a distance of a user may be distance checked, such as within 10 feet or 25 feet of the user.

At 940, depending on the distance between the Prism and the user, the Prism's state may be modified. In addition to the distance, other factors may dictate whether or not a Prism's state may be modified such as the current state of the Prism relative to the different zones and the field of view of the user. For example, if a Prism's current state is sleeping and the user moves to a location where the Prism is located within an active zone 820 and a frustum 850, then the Prism's state may be changed from sleeping to active and rendering, per Table 1. However, if the sleeping Prism is located within a buffer zone 830 and a frustum 850, then the Prism's state may not be changed because according to Table 1, a current state of sleeping remains in the sleeping state when the Prism is moved into the buffer zone and frustum zone. The buffer zone, as disclosed above, mainly prevents intermittent or rapid changes to the state of the Prism. The head pose of the user may modify the state of a Prism because the head pose of the user helps to define the user's field of view, which ultimately aids in the definition of the frustum zone 850. As disclosed above, a head pose of the user is a measurement of a location and/or orientation of the user's head. The head pose information can be used to render a scene to match a user's dynamically changing head location and orientation to provide an increased sense of immersion in a virtual/augmented/mixed space.

In some embodiments, a wall may separate a user from a Prism, such that the Prism may remain in a sleep state even though the distance of the user places the Prism within an active zone 820 and/or a field of view direction of the user places the Prism within the frustum zone 850, the state of the Prism may not be changed from sleeping because of the occlusion of the wall, which prevents the user from seeing the Prism. Further computational processing may be avoided by the system recognizing that even though the distance and head pose may indicate a state change for the Prism, other factors such as walls or objects blocking the Prism may keep the Prism's state unchanged.

Managing Prism relationships and Groupings

In some embodiments, the centralized rendering system may not have support for transforming/managing Client Prisms 215 as part of a larger (e.g. universe space) scene graph. A Universe Prism may be an instance of a Client Prism with additional logic and functionality. In the Universe, the capability to transform a group of Client Prisms 215 may be handled via a transform tree. For example, each panel of the launcher may be a separate application, wherein each panel corresponds to its own Prism. It may be beneficial for the Universe to be able to group the multiple Prisms associated with the launcher into a group so the multiple Prisms may be managed together such that when one Prism within the group is modified, the other Prisms within the group may be affected and thus may need to be modified as well. This may enable multiple applications to appear and behave as if it were a single application. For example, if the launcher is anchored to the user's body (e.g., body dynamic), as the user moves throughout his environment, the location of the launcher, as well as the location of its panels corresponding to multiple Prisms may also need to be modified/transformed as a group.

As another example, an application requesting a Prism may have a secondary UI (with a close button, pin/unpin, settings, etc.) that is positioned relatively close to the application's Prism. The Universe may group these two Prisms together as a group and manage the two Prisms as a group having two nodes. Managing the association of multiple Prisms in a hierarchical/relational manner and/or in a logical grouping structure may be handled with a transform tree and/or a group tree (discussed below).

In some embodiments, a transform tree is a tree data structure configured to transform/organize Prisms and/or groups of Prisms in the Universe, and may be rendered by the central rendering system. A transform tree structure may have a scene graph of nodes where each node provides a moveable local space corresponding to a Prism. A node of the scene graph may correspond to a Prism. A Prism may be a tree node. There may be other tree nodes that are not Prisms. These "other tree nodes" may be used for grouping content or as an intermediate transform. Furthermore, nodes may be grouped with other nodes such that when one node is transformed, the other nodes in the same group are transformed along with it. In some embodiments, a group tree may manage the grouping of nodes.

A group tree may be a tree data structure that stores a logical grouping of nodes.

In some embodiments, since Prisms may not overlap and may be treated as independent content displayed in the user's landscape, this may introduce the problem of virtual content from one application not being able to closely interact with virtual content from a different application. However, creating multiple smaller Prisms closely fit around virtual content from a single application may solve this problem. For example, there may be multiple Prisms open for a single application, but the user may perceive the multiple Prisms as one unified system (e.g., parent/child Prisms of a transform tree). Additionally, the Prisms may also be grouped together such that some Prisms may be peers to one another essentially. If all of the content from one application is within a big box, there may be more "air" or dead space within the Prism. This may prevent content from different applications from interacting with content in those areas, thus preventing certain types of "realistic" interactions from occurring.

For example, an interaction may be a simple collision of two 3D cars. The collision may not seem "real" to a user if each of the Prisms that the two 3D cars are rendered into have so much "dead space" in between the invisible boundaries of the Prisms relative to the 3D cars that a user may not be able to see the two cars actually contacting one another. However, if the Prisms are smaller and closely fit around each of the 3D cars, from certain view angles, it may appear to the user as though the two 3D cars are slightly touching one another and bouncing off one another as a result of the collision.

FIG. 10 shows an example tree node of a scene graph, according to some embodiments. Tree node 1000 depicts an example tree node for the launcher menu. The universe node 1002 is the root node in this tree node of a scene graph of the user's mixed reality system. As the mixed reality system starts up, a launcher application may be started to display to the user as a launcher menu. As the launcher application is launched, a launcher tree node 1004 representing the launcher menu's position in the scene graph may be created. The launcher tree node 1004 may serve as an anchor for other nodes that depend from or is a child of the launcher menu.

For example, an icon grid application may also be launched. An icon grid tree node 1009a may be added to the tree node with a scene graph identifier (SGID) of the launcher application. Since the icon grid application may be displayed as one panel of a carousel of panels for the launcher menu, the icon grid tree nodes 1009 may be children nodes of the launcher tree node 1004, as depicted within the child nodes 1008 indicated with the dash border labeled as Launcher Panes. More of the Launcher's subordinate applications may be launched and added to the tree node as child nodes (e.g., recently assessed applications tree node 1027 and social application tree node 1029) of the launcher tree node 1004. The group of nodes associated to the launcher menu may be grouped together as launcher group 1006.

When the launcher menu is moved (e.g., billboard), the nodes within the launcher group 1006 may be moved as a group. Setting the launcher node as an anchor node may be necessary for providing an exact means to position/billboard the launcher menu precisely, rather than applying logic to one of the launcher panels and hoping for the best to maintain the groupings of the other related panels. The child nodes (e.g., the icon grid, the recently accessed applications and the social applications) are automatically repositioned relative to the launcher tree node. The Universe may own the entire scene graph of the plurality of Prisms. In some embodiments, each Prism may start off with a null parent and zero children, effectively making it a scene graph with one node. In some embodiments, when an application requests a Prism, the Universe may create (1) a node for the requested Prism, and (2) a node for the Secondary UI. The Universe may then position the Secondary UI relative to the Prism. In some embodiments, the Universe may place the secondary UI node as a child of the Prism node.

Transform Tree

As discussed above, a transform tree is a tree data structure configured to transform/organize Prisms and/or groups of Prisms in the Universe. A transform tree structure may be considered a scene graph comprising nodes, where each node provides a moveable local space that may correspond to a Prism. A node of the scene graph may correspond to a Prism or it may be a node used only for transforming a group of Prisms or other tree nodes. In this case, nodes may be grouped with other nodes under a parent node such that when one node is transformed, the other nodes in the same group are transformed along with it. In some embodiments, Prisms are in a transform tree with just one Prism (i.e. itself), but when the need arises to parent one Prism with another, the ability is there. In some embodiments, the Prism scene-graph/transform tree may differ from a conventional scene graph in that, when a child Prism changes its parent, the world transform of the child may not change. For example, if a Prism is rendering in front of the user, when the Prism's parent changes, the Prism would not move from its current position. In some embodiments, the matrices of each Prism within the transform tree may be column-major, which means calculating the world matrix of a Prism within the tree must be done by appending the parent transform to the left of the Prism's local transform. For example, a Prism's world transform may equal the parent's world transform times the Prism's local transform.

In some embodiments, basic tree logic may be defined as one or more of the following: (1) A node may set itself as a child to another node; (2) A node may set a different node as a child to itself; (3) A node may get its parent; (4) A node may get its children; (5) A node may remove any of its children (this doesn't orphan the children—they may just attach to this node's parent, or attach to any other node in the tree, including the root Universe node, which may put it in world space); and (6) A node may remove its parent. Inserting and removing nodes may update the local transforms of the nodes and its children. This means changing the parent of a node may not change its world transform, in fact the world transforms may be preserved. In some embodiments, any operation that changes the local transform of a node may update the world transforms of the node and its children.

In some embodiments, each node in the transform tree may contain one or more of the following matrix components: (1) Local transform; (2) Rotation matrix (this may be used to compute the local transform); (3) Scale vector (this may be used to compute the local transform); (4) Position vector (this may be used to compute the local transform); (5) Local to world transform (this may be cached for convenience); and (6) Local to world scale (this may be cached for convenience). In some embodiments, the local transform may be thought of as the transform applied to its parent node. If the node does not have a parent, then the local transform may equal the local to world transform. The local transform may be computed as follows:

local transform=position*rotation matrix*scale

This formula may be read as, "Transform this node, using the parent node as its origin, by first scaling it, then rotate it, then change its position relative to its origin node." Rotation, scale, and position may be kept separate to make it easy to provide getters/setters to modify any of them separately through an interface. When a node changes position, the child node world transforms may be updated with it. When these matrices are multiplied in sequence, then a local-to-world matrix may be constructed. For the sake of efficiency, the calculated local-to-world matrix may also be stored. In some embodiments, to calculate the local to world transform of a node, the following equation may be used:

world transform=parent world transform*local transform

Note the order of matrix multiplications. In some embodiments, the matrices are column-major, implying that x, y, z and position are laid out in each column. This means parent node matrices always appear to the left of the children matrices. FIG. 10B illustrates a small transform tree 1010 and how each world transform for each node is calculated.

Other suitable methods or systems utilizing transform trees may be used.

Group Tree

In some embodiments, an additional feature of the transform tree is the ability to group any Prism within the transform tree with any other Prism. The Prisms in the group may be in the same, or different, transform tree. Additionally, the Prisms can be a child or descendant of another Prism within the same group and Transform Tree. In some embodiments, when a transform is applied to one of the Prisms in the group, all of the other Prisms within the group are transformed along with it. The Prism group logic takes care of updating the transforms in whatever transform trees the group members belong to. Any Prism not within the group, but that is a child of a Prism that is in the group, may also transform along with the group. When a Prism in the group is transformed, its children are also transformed. For example, if Prisms A and B are in a group, and Prism C is a child of Prism B but not within the group, and Prism B is moved 1 meter to the left, then both Prisms B and C are moved one meter to the left. If, however, Prism C moves 1 meter to the left, then only Prism C is moved 1 meter to the left. The present disclosure shares some features with conventional scene graphs, but may have additional functionality/behavior as well, such as 1) the ability of an indirect descendent of a node to be grouped with the indirect descendent so the node and indirect descendent undergo the same transformation (if they are grouped), and/or 2) the ability to group two nodes that are located on entirely separate transform trees. In some embodiments, an indirect descendent may be a node that is not directly connected to the parent node, for example, possibly separated by two or more intervening nodes. In some embodiments, the grouping logic may be implemented by creating a Root Group Node for all Prisms that belong in the current group. If any Prisms in the same group are descendants of other Prisms within the group, then they are also descendants of those Prisms within the transform group tree. Note that, in some embodiments, a separate data structure may not be created for a group; instead the group may have an additional flag attached to the Prism. In some embodiments, if any Prism within the group is transformed, a transform may be calculated and applied to the Root Group Node. This transform may propagate down the Transform Tree like any other transform, where the transform propagates down to each child within the transform tree, as well as each Prism within the group.

Following are various embodiments of adding and removing nodes to and from a group tree. FIGS. 10C-10E illustrate one embodiment for creating a new group. For the transform tree 1020 in FIG. 10C, this embodiment will illustrate a grouping of nodes A and E together, which are currently in separate transform trees. (1) A determination is made as to whether or not A or E is already in a group. Currently, neither A nor E have a group-parent, so neither are in a group. Therefore, create a Group Root. At FIG. 10D, a group tree 1022 having a Group Root 1024 is created. (2) Assign A and E's group parent to the Group Root 1024 as depicted in FIG. 10E. (3) Determine if E is an ancestor (or parent) of A. A has no parents, so E is not an ancestor of A. (4) Determine if A is an ancestor (or parent) of E. E has no parents, so A is not an ancestor of E.

Figure 10A:
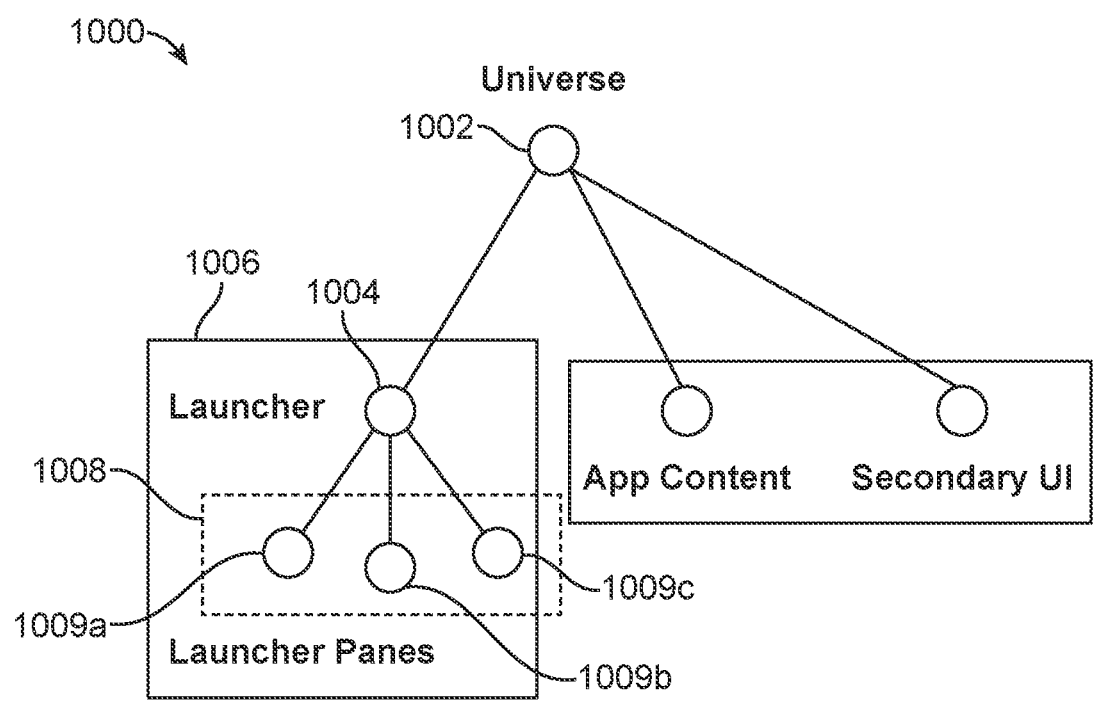
FIG. 10A illustrates a tree node of a scene graph, according to some embodiments.
Figure 10B:
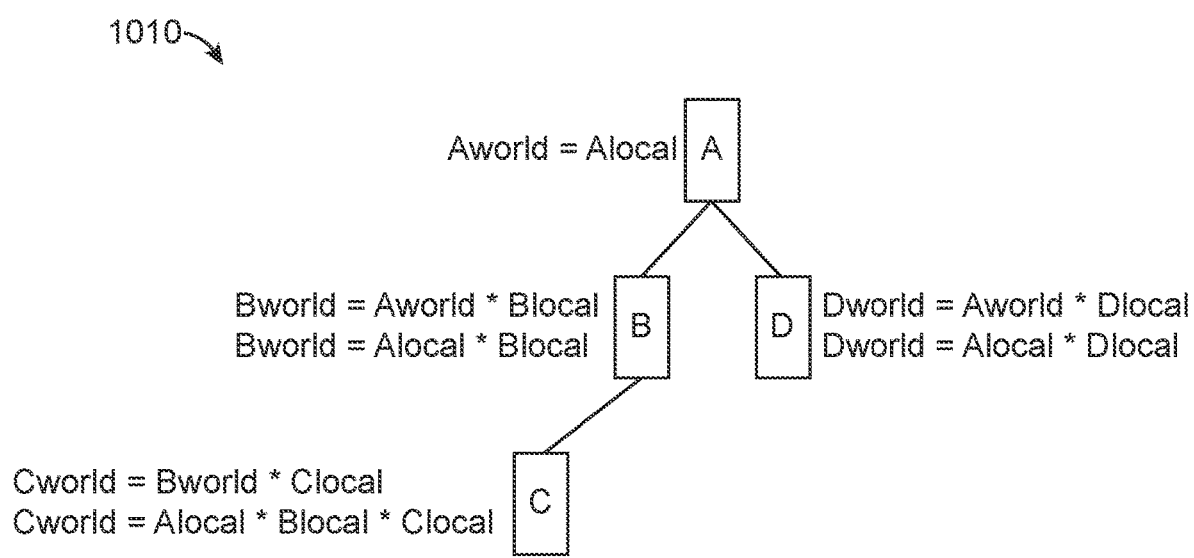
Figure 10D:
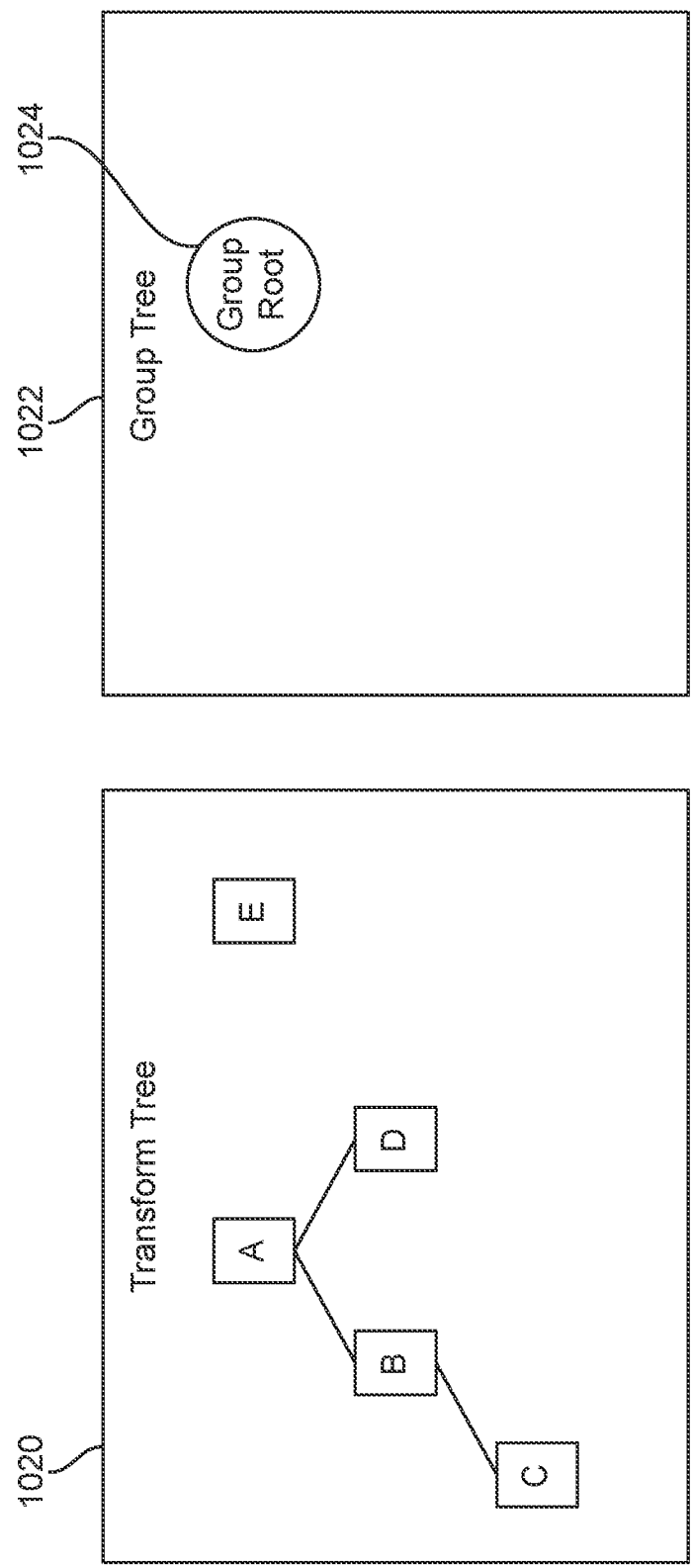
Figure 10E:
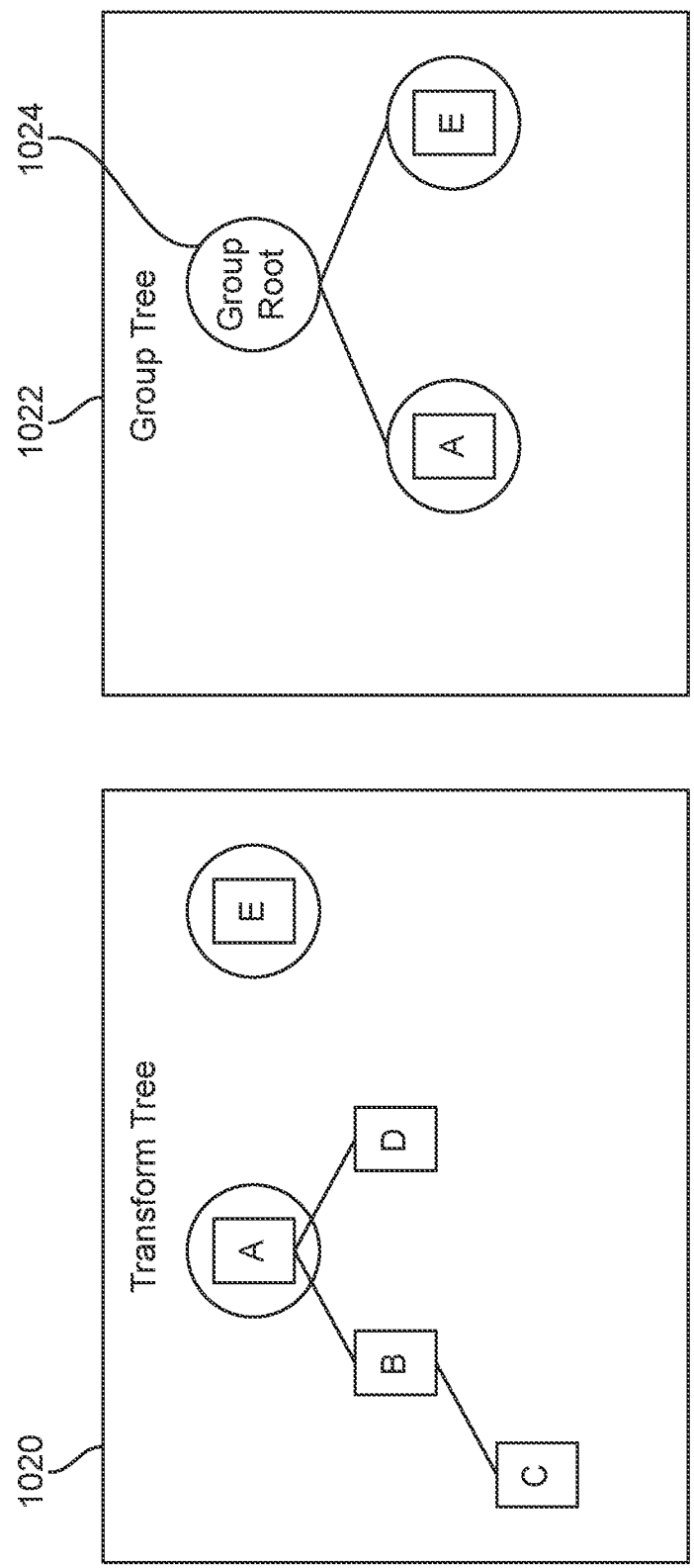
Figure 10G:
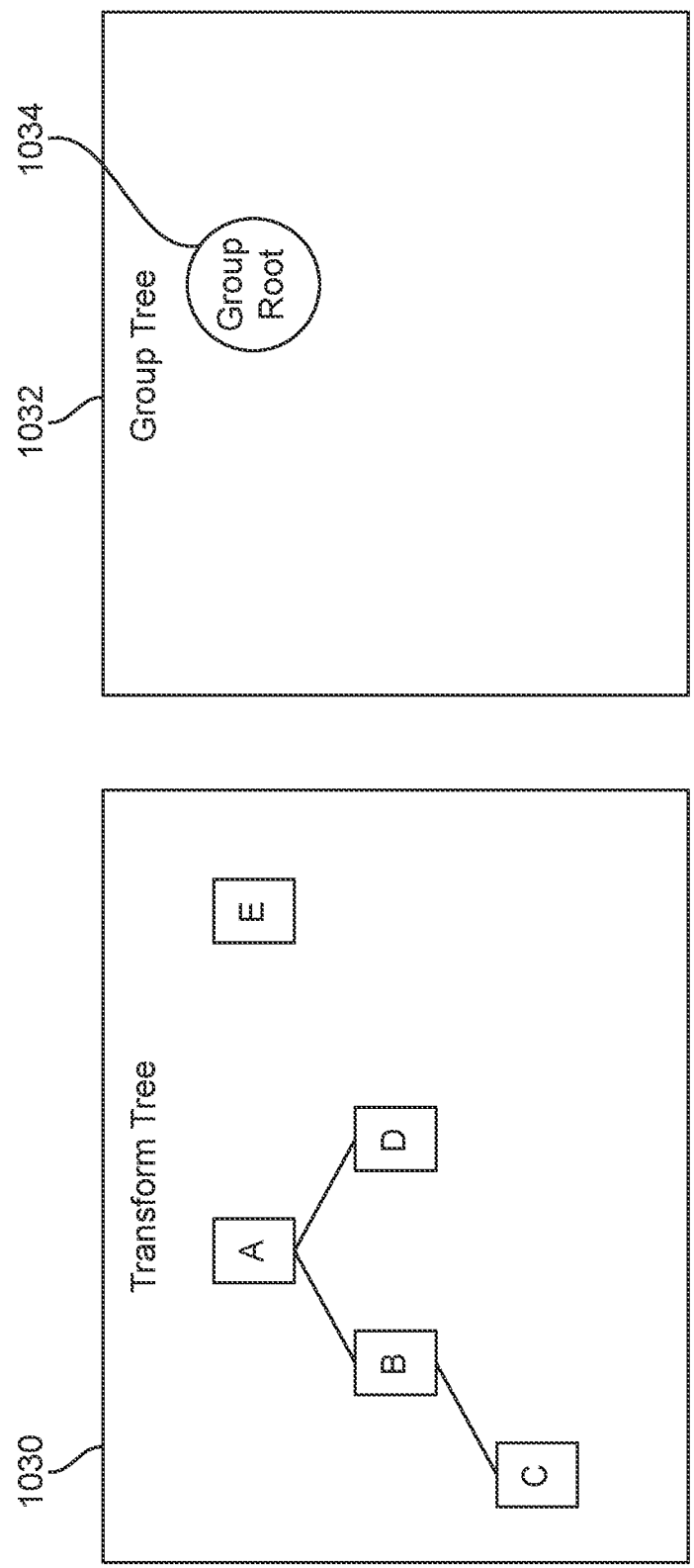
Figure 10H:
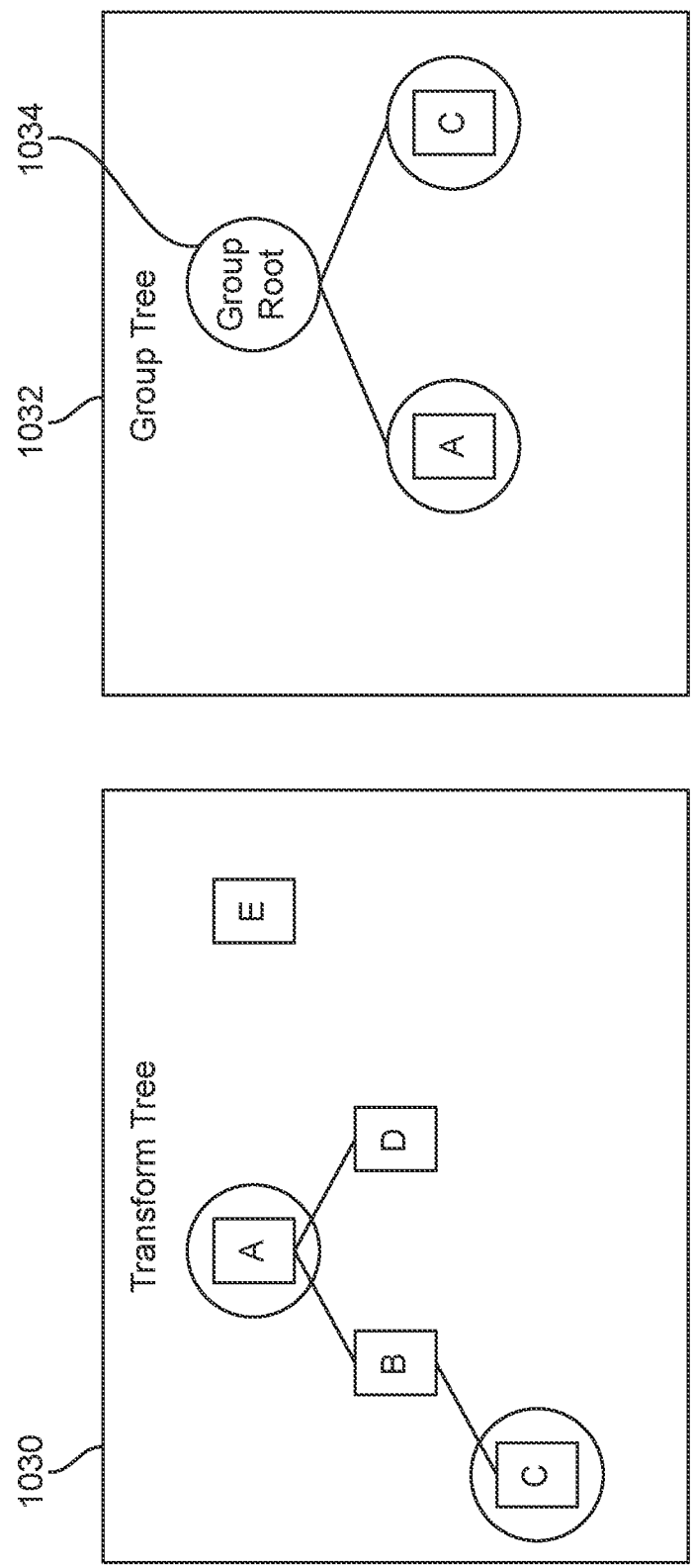
Figure 10I:
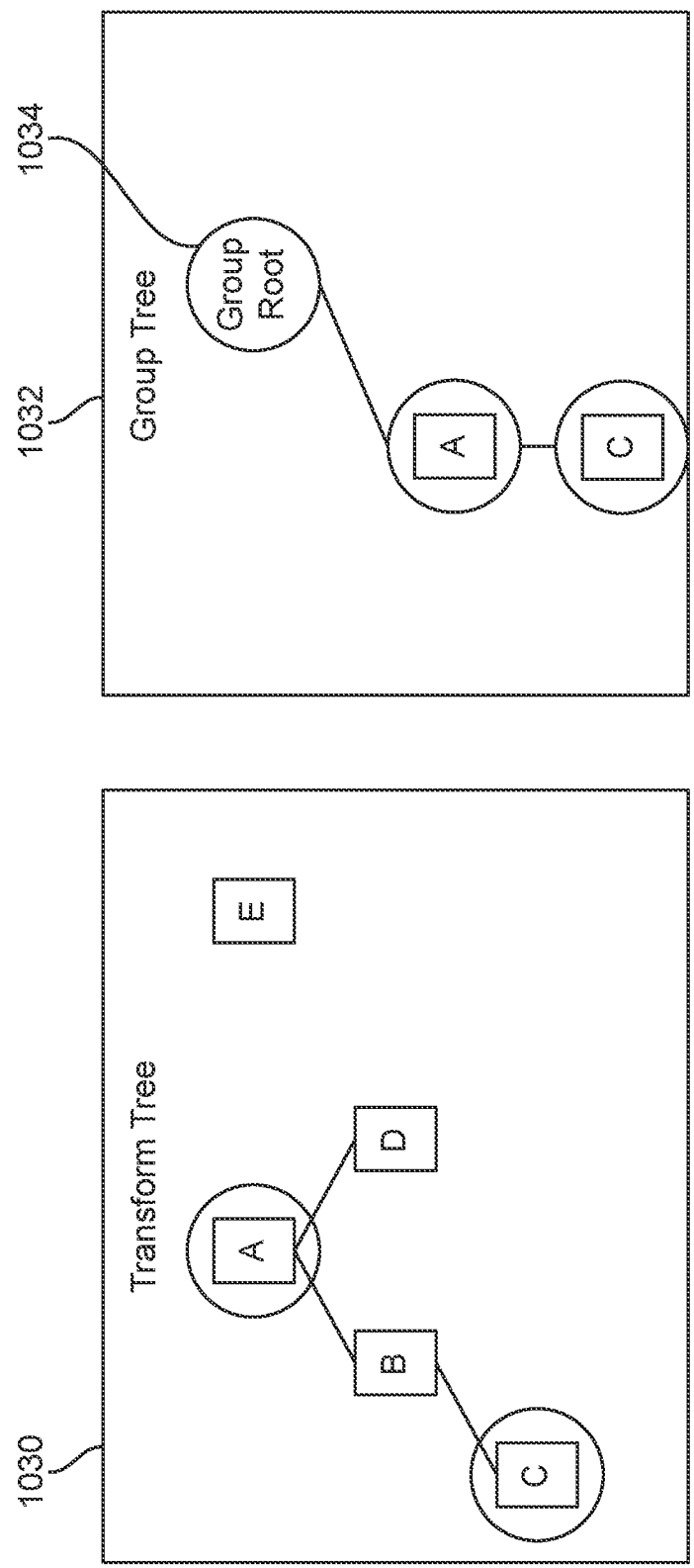

FIGS. 10F-10I illustrate another embodiment for creating a new group. For the transform tree 1030 in FIG. 10F, this embodiment illustrates a grouping of nodes A and C together, where node C is a child node of node A as depicted in the transform tree 1030. (1) A determination is made as to whether A or C is already in a group. Currently, neither A nor C have a group-parent, so neither are in a group. Therefore, create a Group Root. At FIG. 10G, a group tree 1032 having a Group Root 1034 is created. (2) A and C's group parent is the Group Root 1034. Assign A and C to Group Root 1034 as depicted in FIG. 10H. (3) Determine if C is an ancestor (or parent) of A. A has no parents, so C is not an ancestor of A. (4) Determine if A is an ancestor (or parent) of E. A is an ancestor of C. Therefore, re-assign C's group parent to A.

Figure 10J:
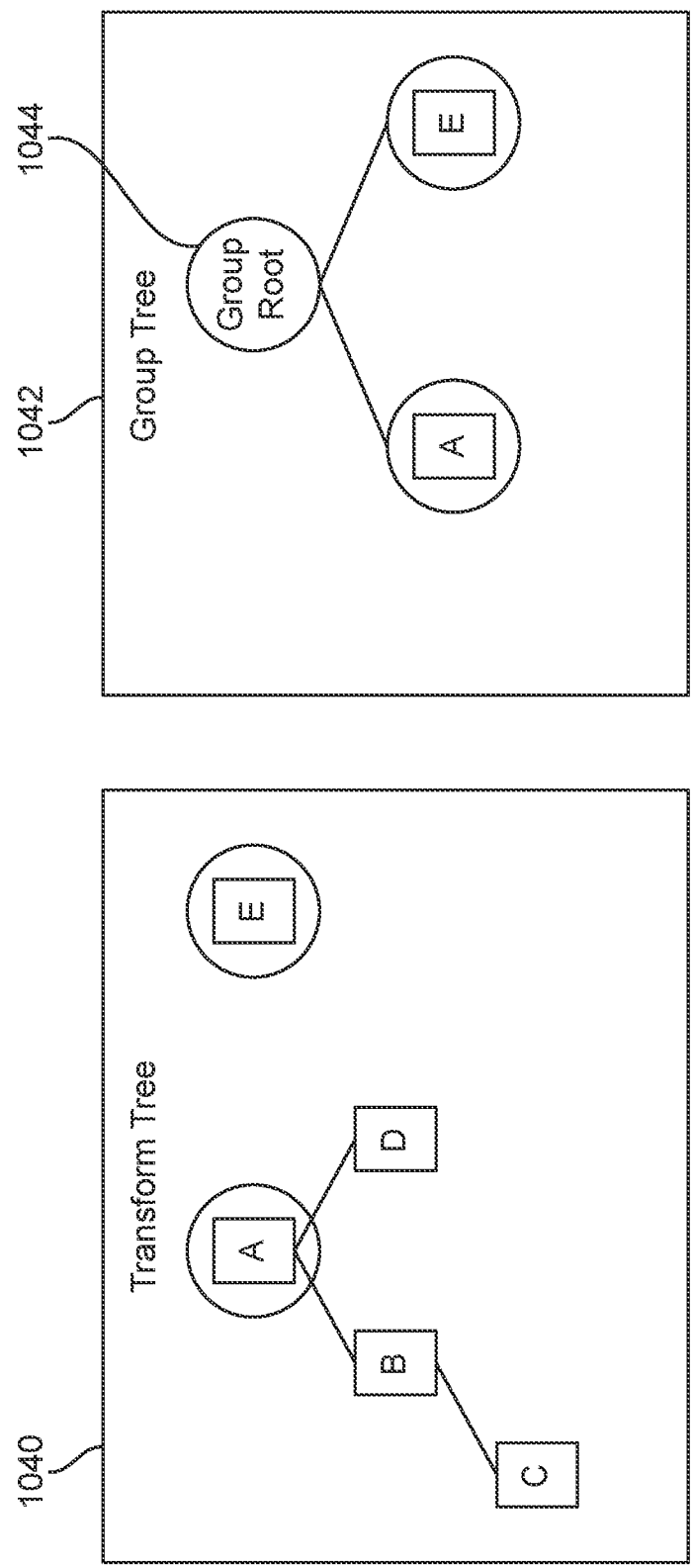
Figure 10K:
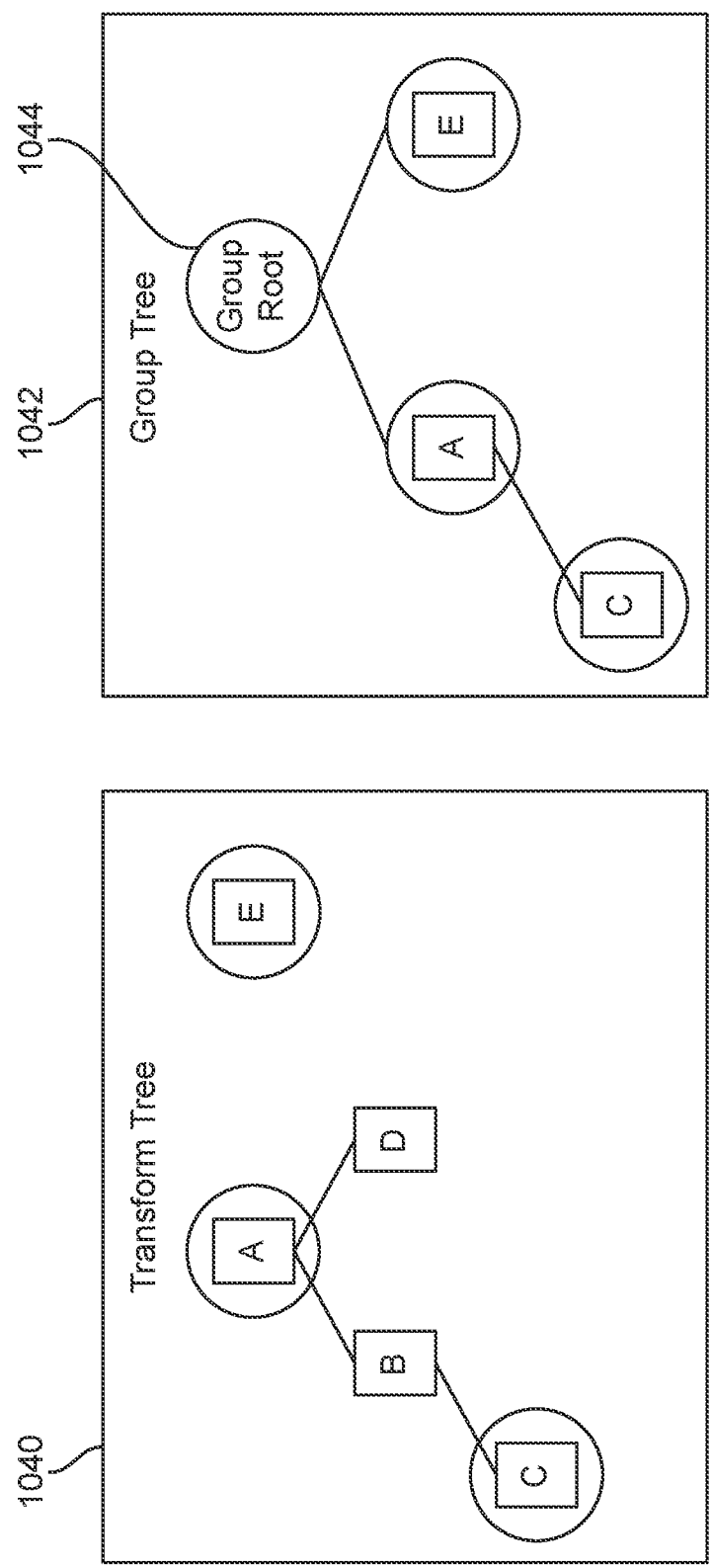

FIGS. 10J-10K illustrate an embodiment of adding an ungrouped node to an existing group. For the transform tree 1040 and group tree 1042 in FIG. 10J, this embodiment illustrates a grouping of nodes C and E from the transform tree 1040 into a same group. (1) Determine if C or E is already in a group. As depicted in FIG. 10J, E is in a group with A. (2) Determine C's group parent—find a parent or ancestor of C that belongs in the same group as E. Here, A is in a group with E. A is an ancestor of C. Assign C's group parent to A (See FIG. 10K). (3) Determine if C has an ancestor or parent of any other nodes in the group. C has no children. Processing stops.

Figure 10L:
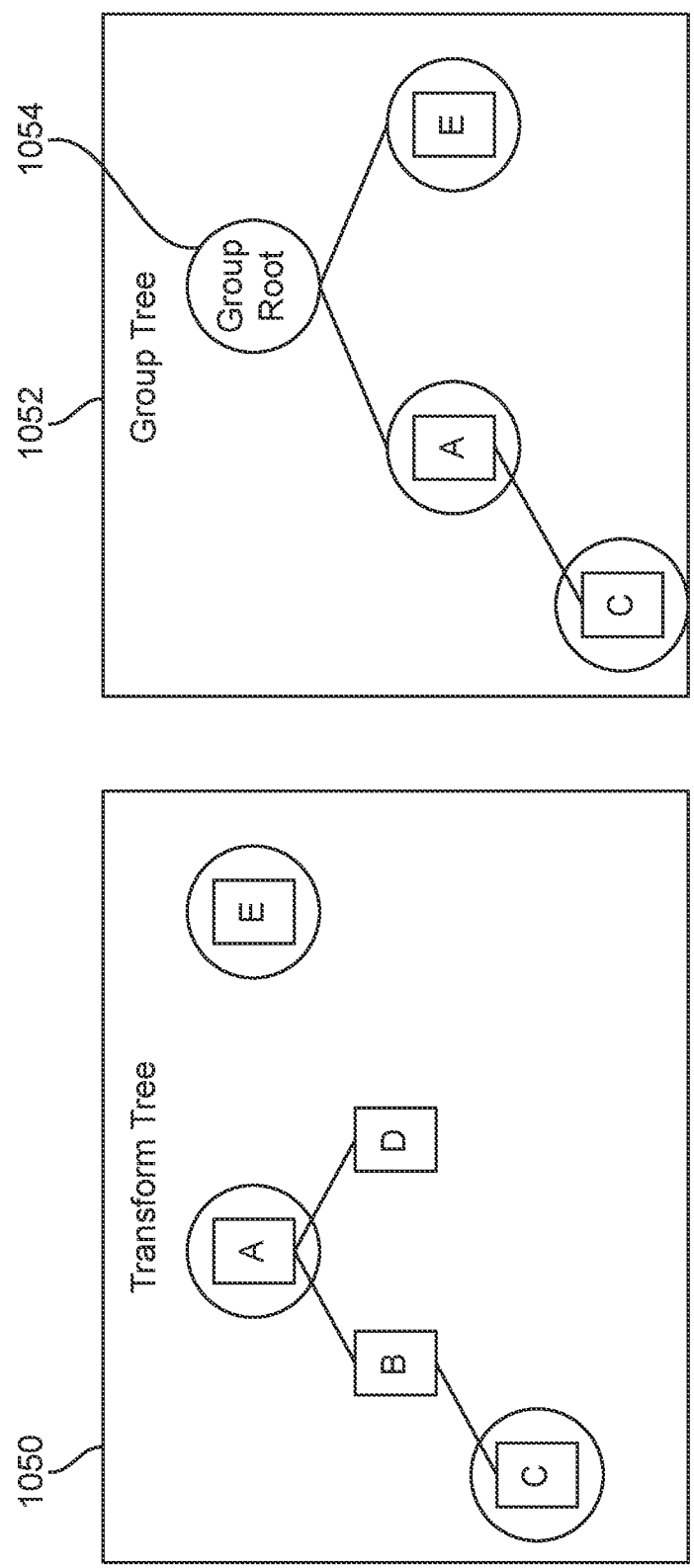
Figure 10M:
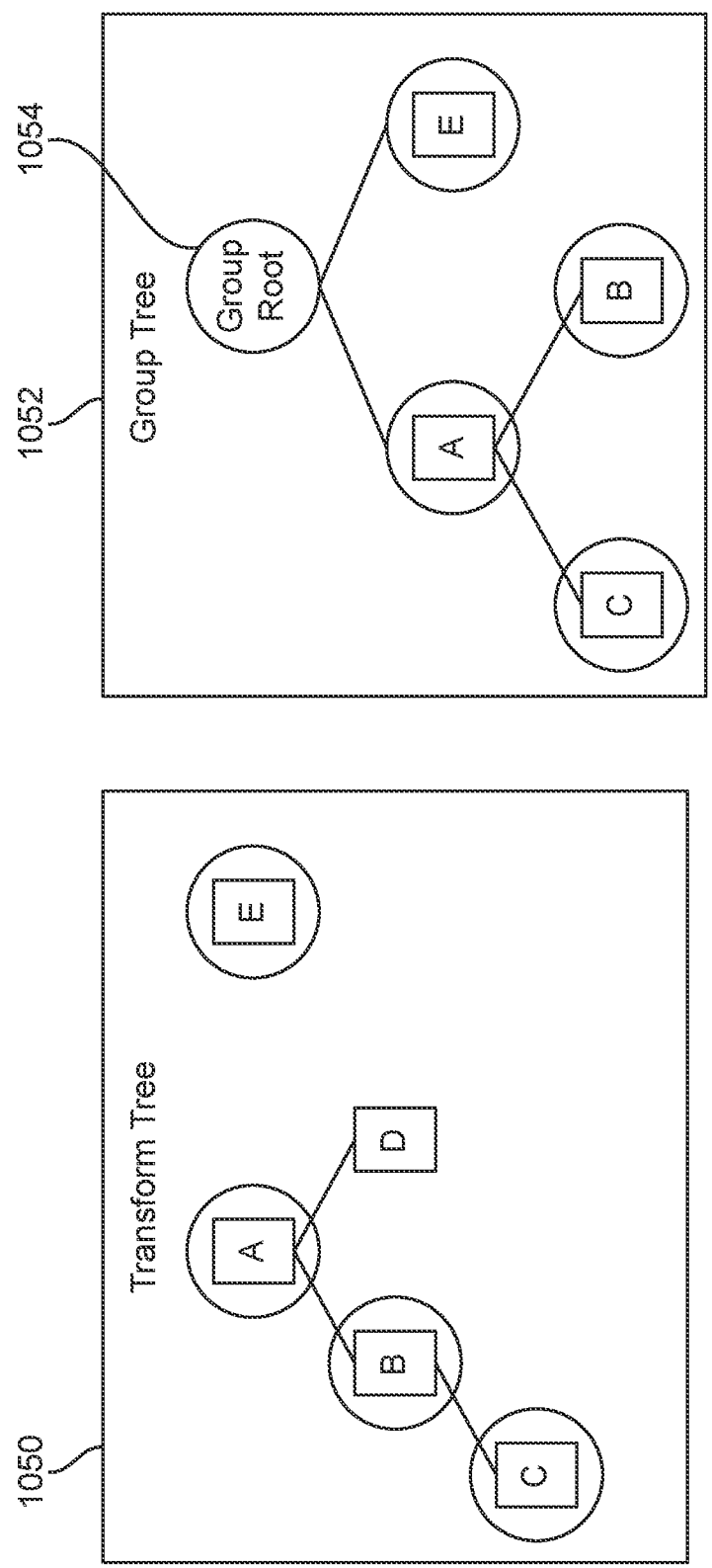
Figure 10P:
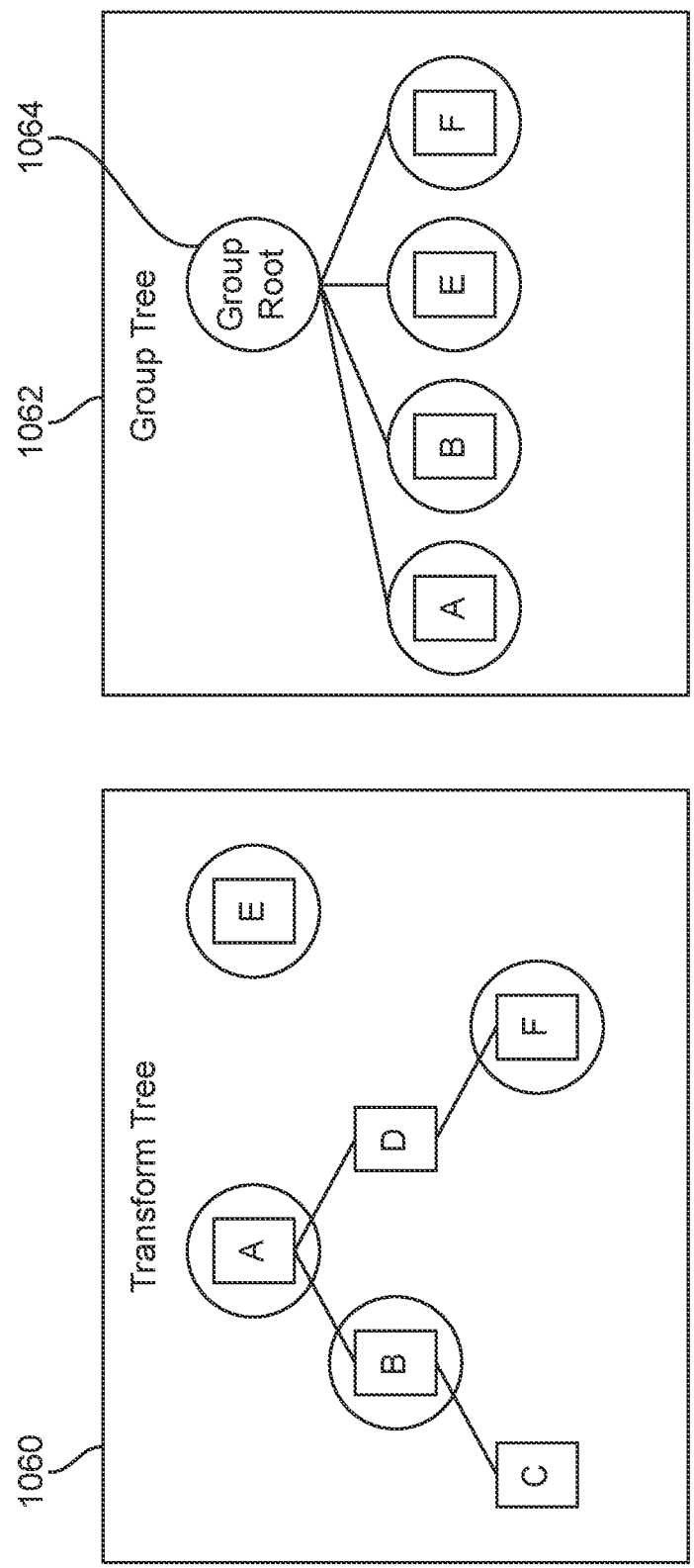
Figure 10Q:
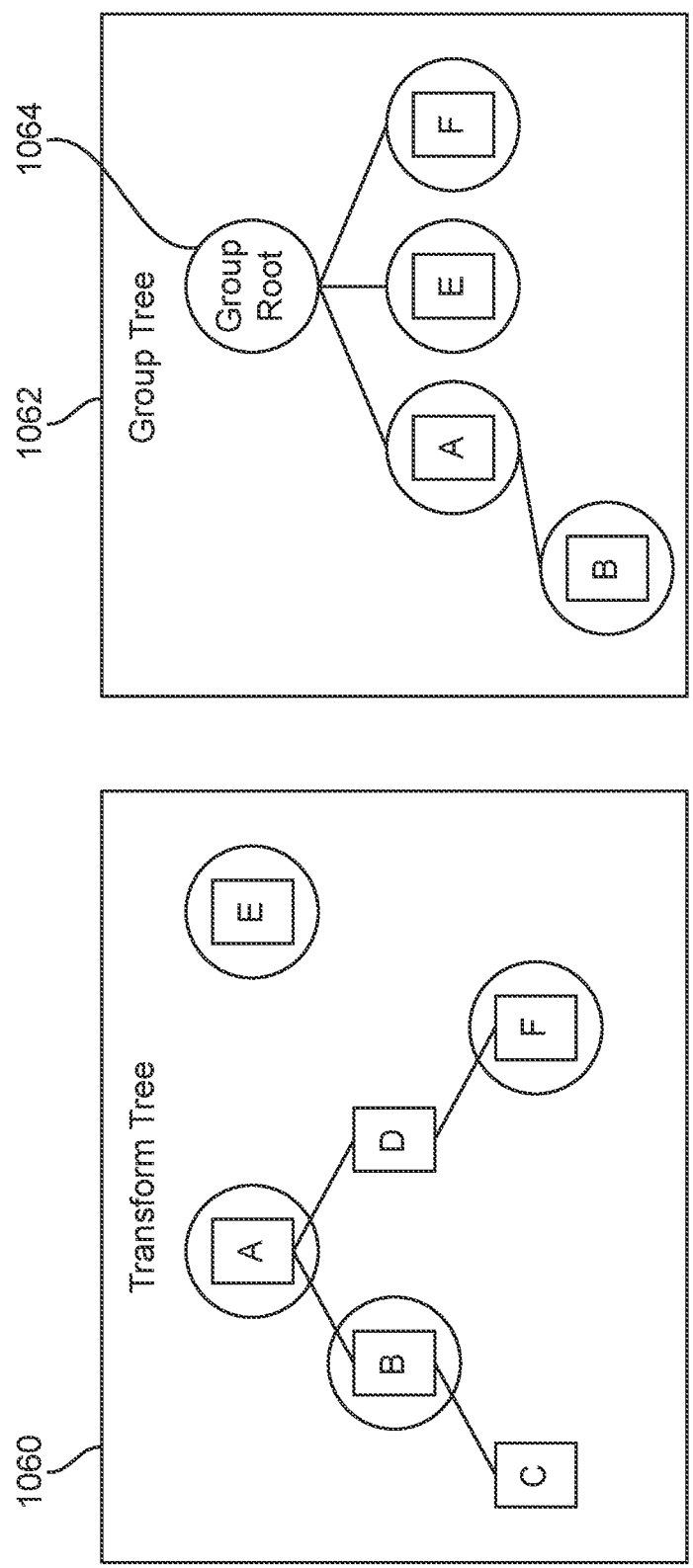
Figure 10R:
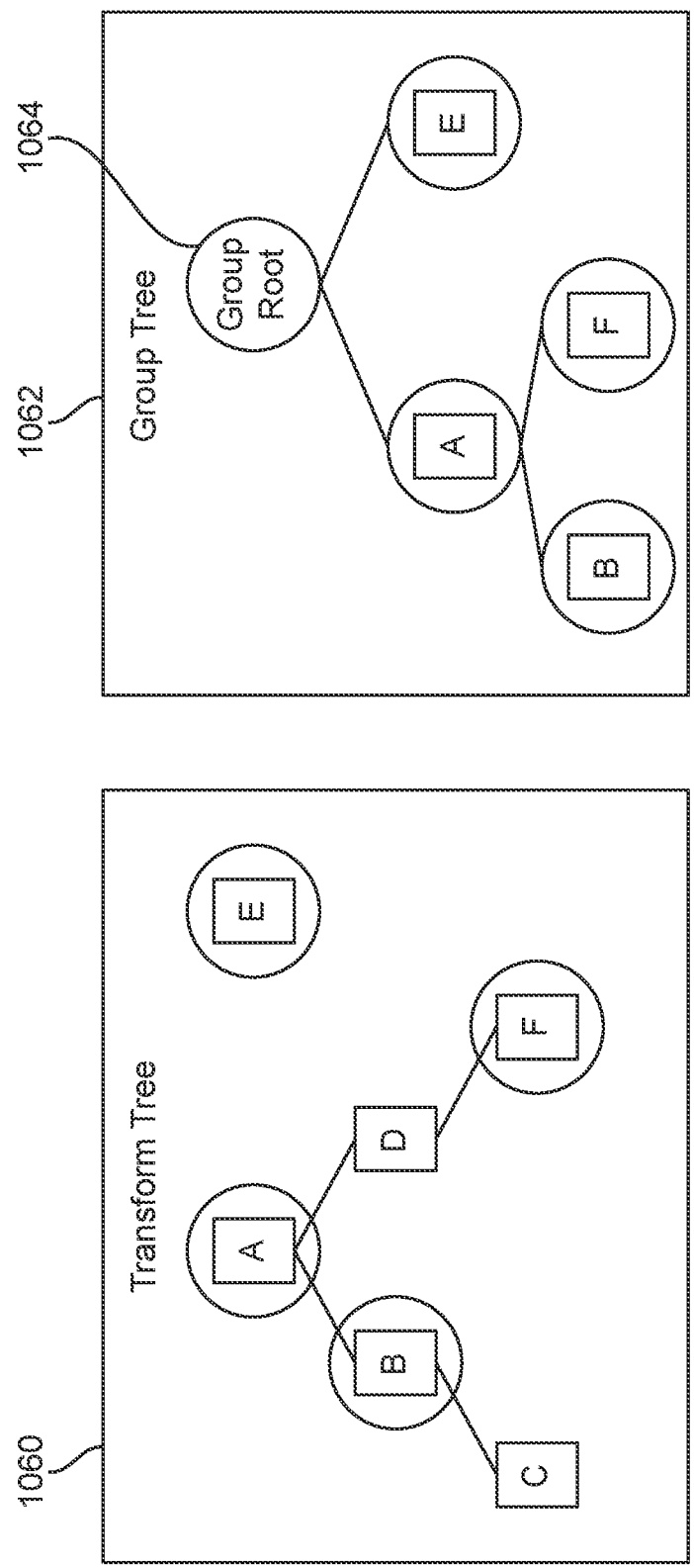
Figure 10U:
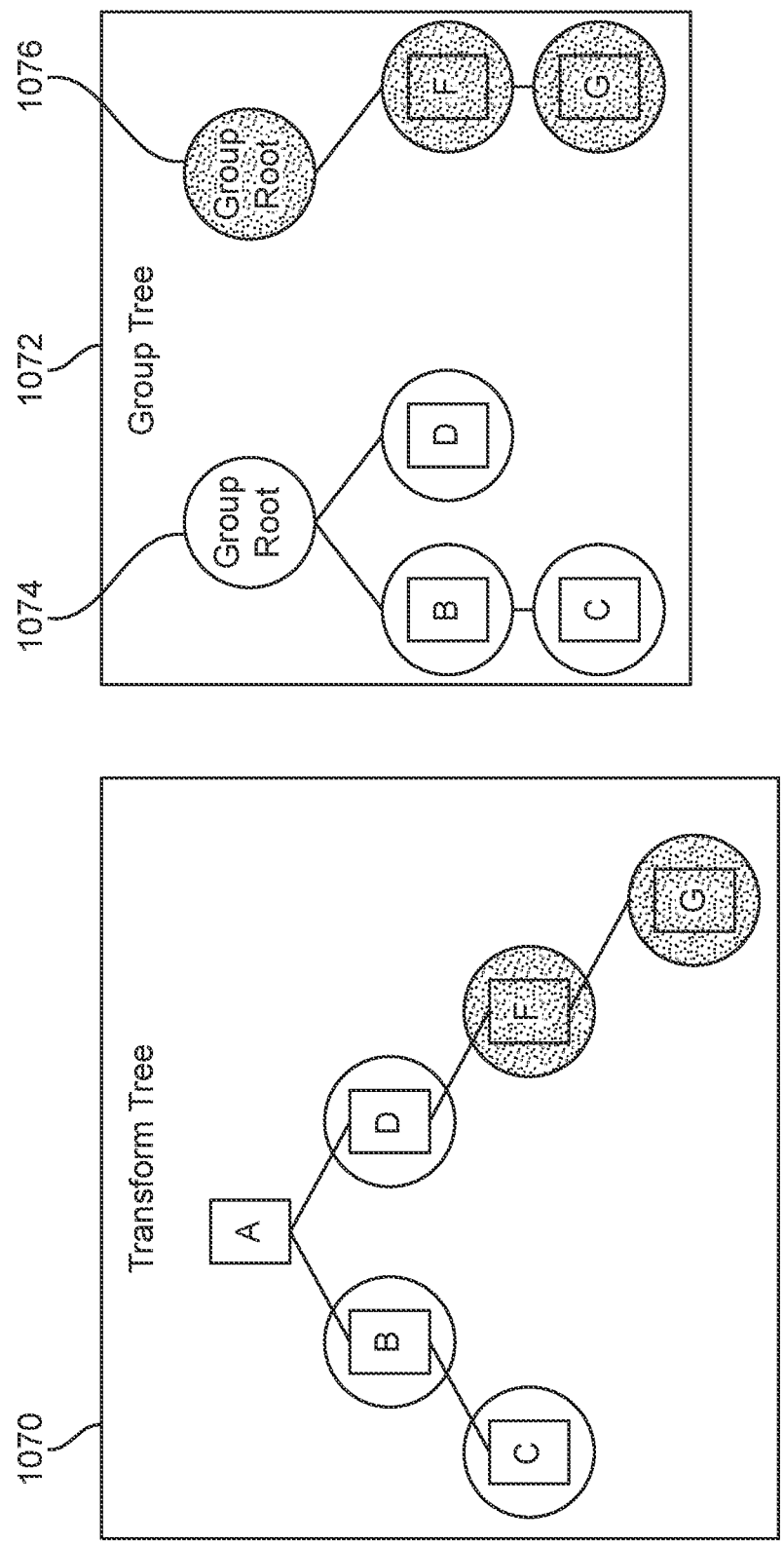
Figure 10V:
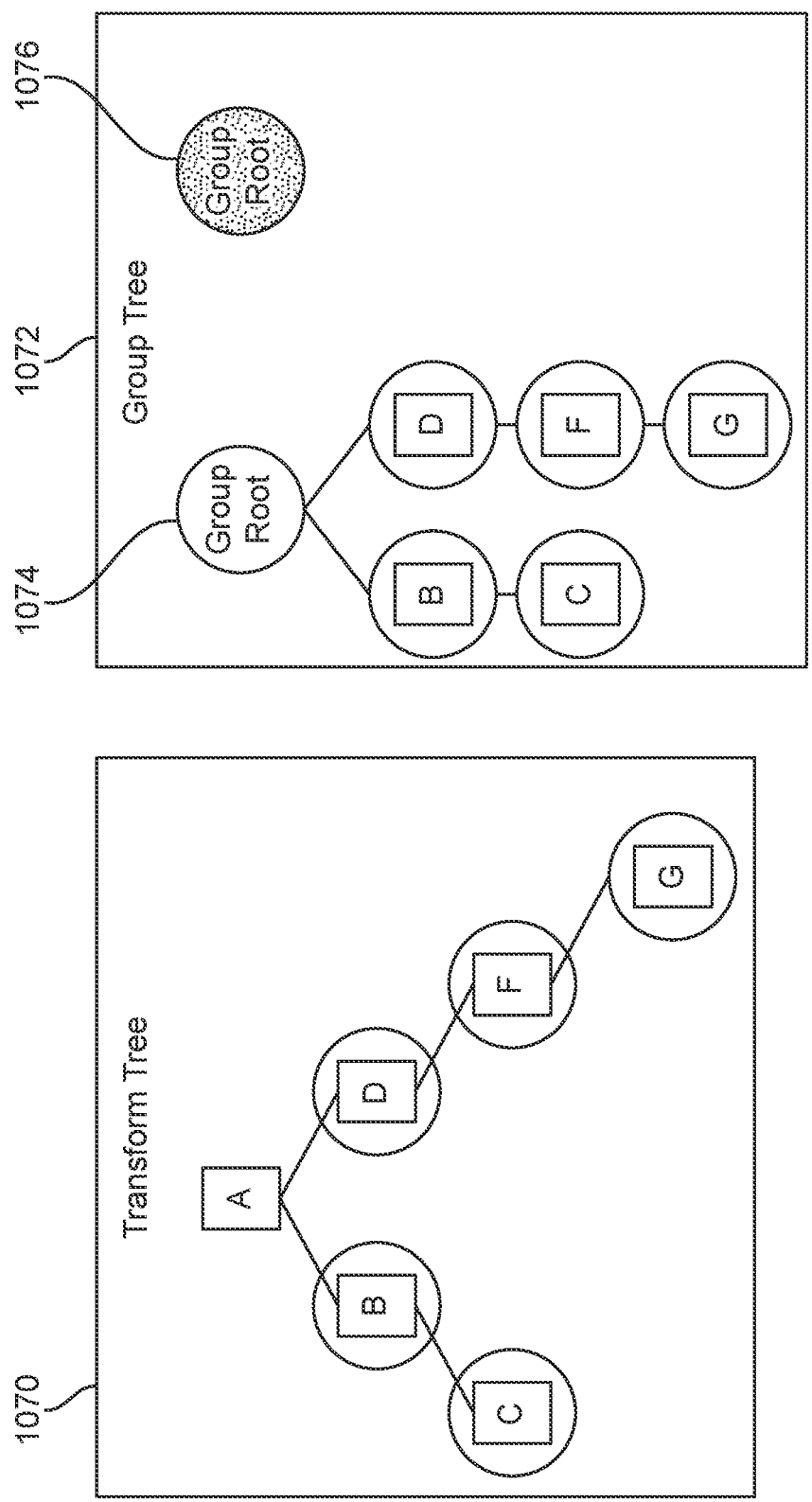
Figure 10W:
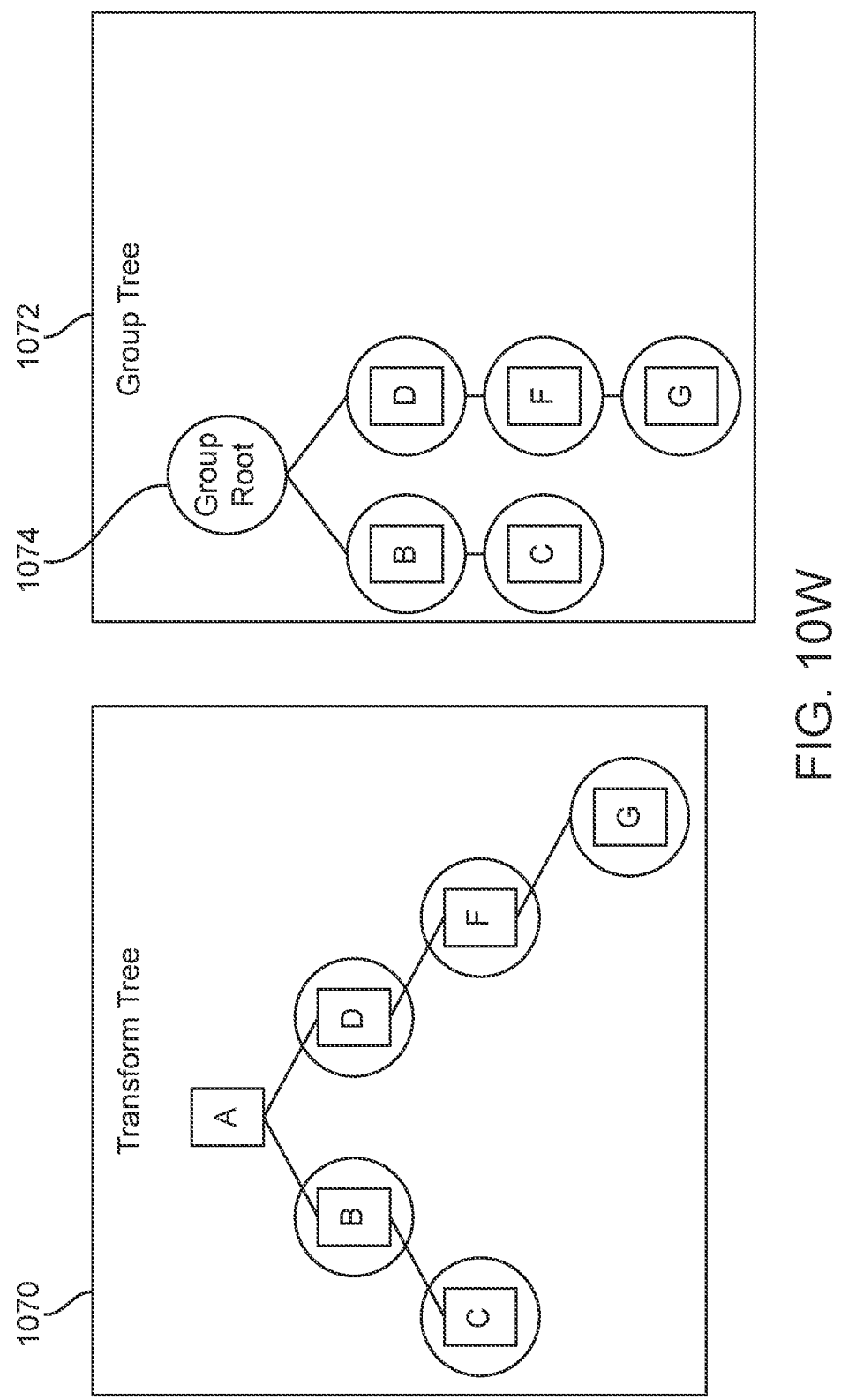

FIGS. 10L-10N illustrate another embodiment of adding an ungrouped node to an existing group. For the transform tree 1050 and group tree 1052 in FIG. 10L, this embodiment illustrates a grouping of nodes B and E from the transform tree 1050 into the same group (e.g., group tree 1052). (1) Determine if B or E is already in a group. Here, E is in a group with A and C. (2) Determine B's group parent by finding a parent or ancestor of B that belongs in the same group as E. Here, A is in a group with E and is a parent of B. Assign B's group parent to A (see FIG. 10M). (3) Determine if B is a parent or ancestor of any of the other nodes in the group. Here, C is a child or descendent of B. Change C's group parent to B (see FIG. 10N).

FIGS. 10O-10R illustrate another embodiment of adding an ungrouped node to an existing group. For the transform tree 1060 and group tree 1062, this embodiment illustrates a grouping of nodes A and E from transform tree 1060 into the same group (e.g., group tree 1062). (1) Determine if A or E is already in a group. Here, E is in a group with B and F. (2) Determine A's group parent by finding a parent or ancestor of A that belongs in the same group as E. Here, A has no parents, so assign A to the Group Root 1064 (see FIG. 10P). (3) Determine if A is a parent or ancestor of any of the other nodes in the group. Here, A finds B as a child. Therefore, B sets its group parent to A (see FIG. 10Q). Additionally, A finds F as a descendant. A and F belong in the same group (e.g., group tree 1062). Therefore, F sets its group parent to A. (see FIG. 10R).

FIGS. 10S-10W illustrate an embodiment of adding grouped nodes to another group. For the transform tree 1070 and group tree 1072 in FIG. 10S, this embodiment illustrates a grouping of nodes C and G into the same group. (1) Determine if C or G is already in a group. Here, C is in a group with D. G is in a group with B and F. (2) Since both C and G are in groups, merge the two into a single group by arbitrarily choosing the final group to be C and D's group (e.g., Group Root 1074). (3) Only add the immediate children of the old Group Root 1076. This means add just B and F to C's group. (4) Add B to C's group. (4a) determine B's group parent by finding a parent or ancestor of B that belongs in the same group as C. Here, there is no group parent. Therefore, add B as a child of Group Root 1074 (See FIG. 10T). (4b) Determine if B is a parent or ancestor of any of the other nodes in the group. Here, B finds C as a child. B and C belong in the same group. C sets its group parent to B (See FIG. 10U). (5) Add F to C's group (NOTE: this is not arbitrary. G will never be chosen to be added next, it will just get pulled along with F). (5a) Determine F's group parent by finding a parent or ancestor of F that belongs in the same group as C. Here, F finds D as a parent. F sets its group parent to D (See FIG. 10V). Note that G is automatically put into the same group. (5b) Determine if F is a parent or ancestor of any of the other nodes in the group. Here, F finds G, but G's parent is already F. (6) Delete the old Group Root 1076 (see FIG. 10w).

Transforming a Group

In some embodiments, any transform applied directly to a node that belongs in a group may transform the group along with it. Indirect transforms done to a group node may not transform the group. For example, if the parent node is not in a group, its child is in a group, and the parent is transformed, then the nodes in the child's group DO NOT transform with it even though the child's transform is changing. If moving the whole group was desired, then the parent ought to be added to the group.

To calculate the transform to apply to a group, the transform to use must be applied to each immediate child of the Group Root.

Figure 10X:
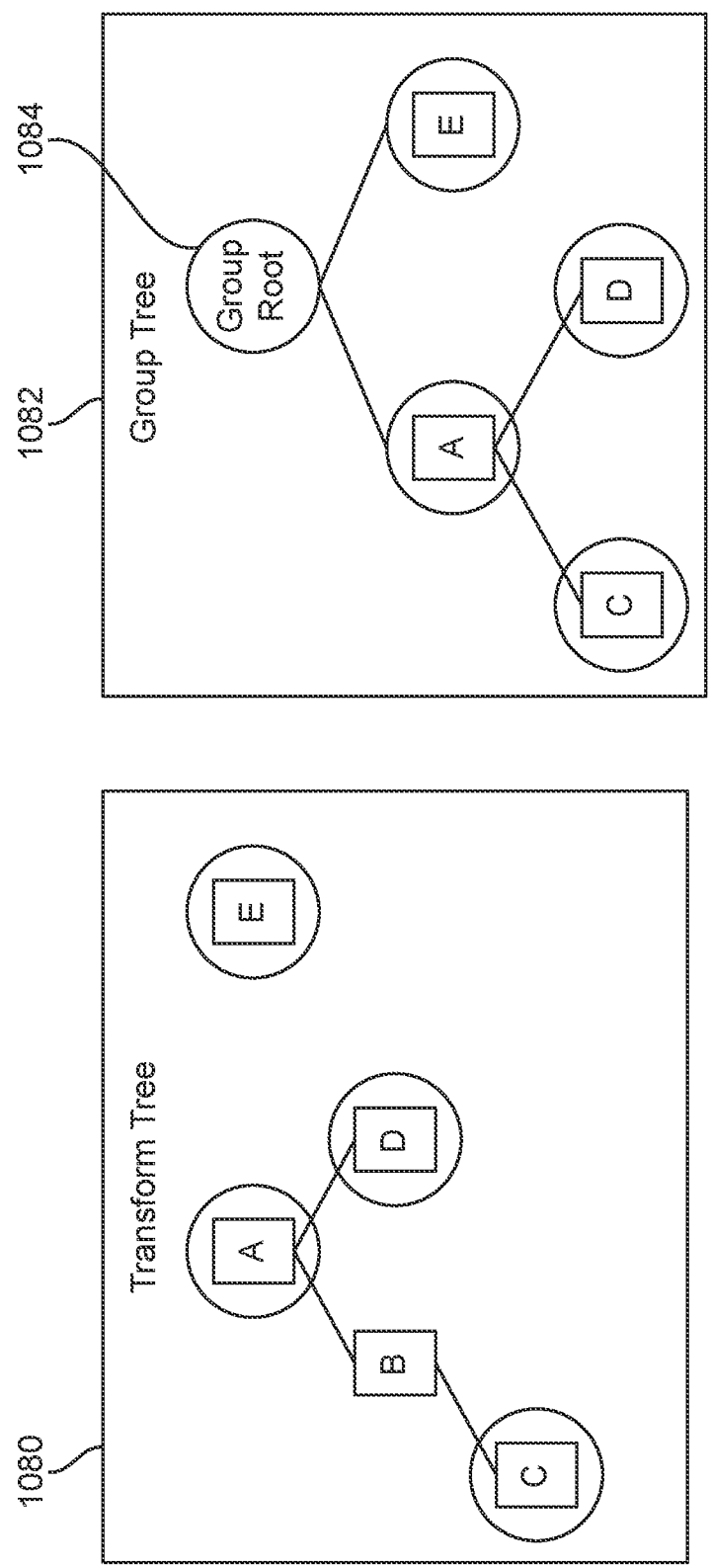
Figure 10Y:
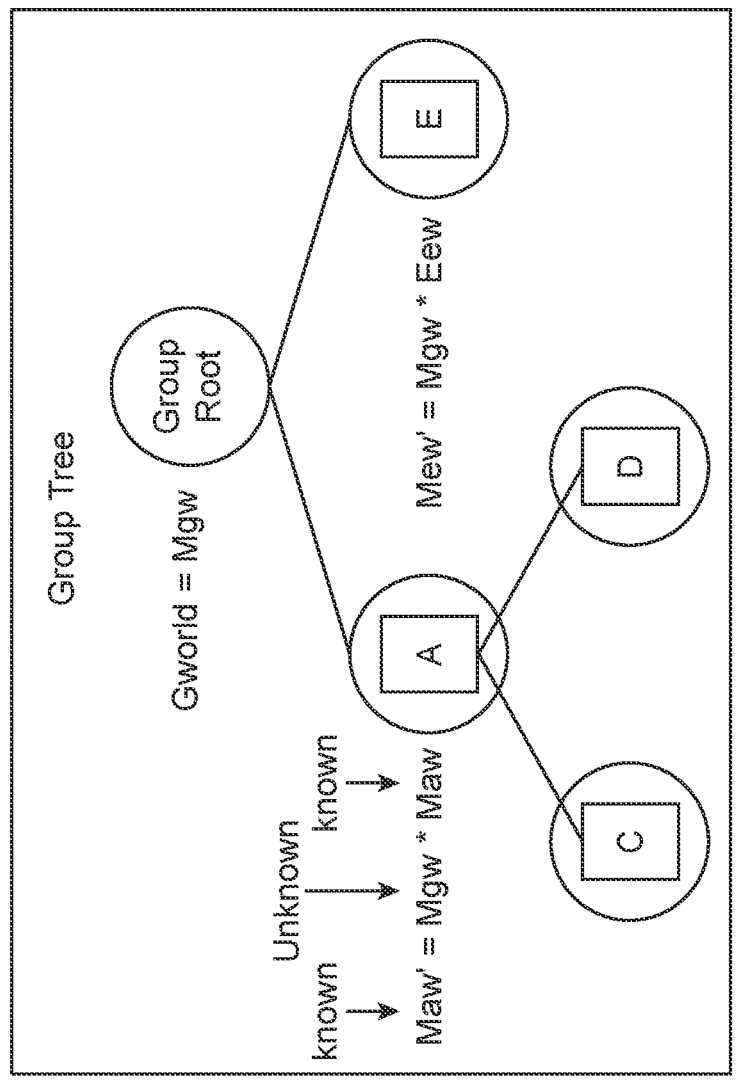

FIG. 10X-10Y illustrates a sample calculation, according to some embodiments of the present disclosure. For the given transform tree 1080 and group tree 1082 as depicted in FIG. 10X, this embodiment applies a transform to node A. Since A belongs in the group tree 1082, nodes C, D, and E are expected to be transformed with node A. Additionally, node B, which does not belong in the group, must also transform with the group because it is a child of A. We are going to denote A's new world matrix as: Maw', where Maw' stands for "matrix a world new." We are going to denote A's old world matrix as: Maw, where Maw stands for "matrix a world old." We are going to denote the matrix to apply to A to get Maw' as: Mgw, where Mgw stands for "matrix group world." The goal is to find a matrix that we can set to the Group Root (Mgw) where when it's applied to node A's world matrix, it will equal node A's new matrix. This same matrix is applied to the other immediate children of the Group Root.

FIG. 10Y illustrates a sample calculation for apply a transform to node A. From FIG. 10Y, we care about Node A because it is the one whose matrix changed. So:

Maw'=Mgw*Maw

We know Maw' and Maw, solve for Mgw

Mgw=Maw'*Maw^-1

So, for each child node of the group root, set the world transform of the node to: Child node new world matrix=Mgw*(child node old world matrix). For this example, apply Mgw to the two immediate children of group Root, A and E:

$$Maw' = Mgw * Maw$$
$$= (Maw' * Maw\wedge -1) * Maw$$
$$= Maw'$$
$$Mew' = Mgw * Mew$$
$$= (Maw' * Maw - 1) * Mew$$

Figure 10Z:
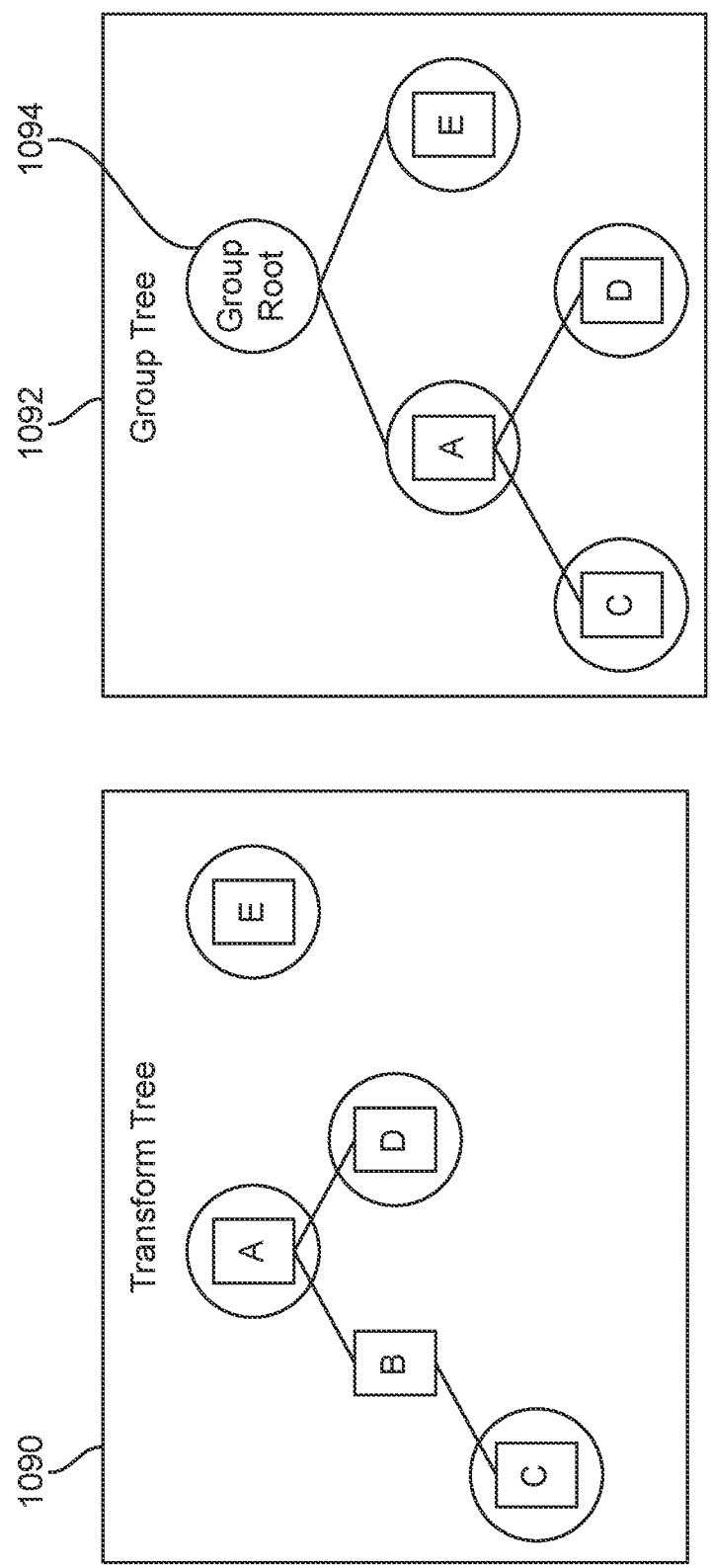
Figure 10A:
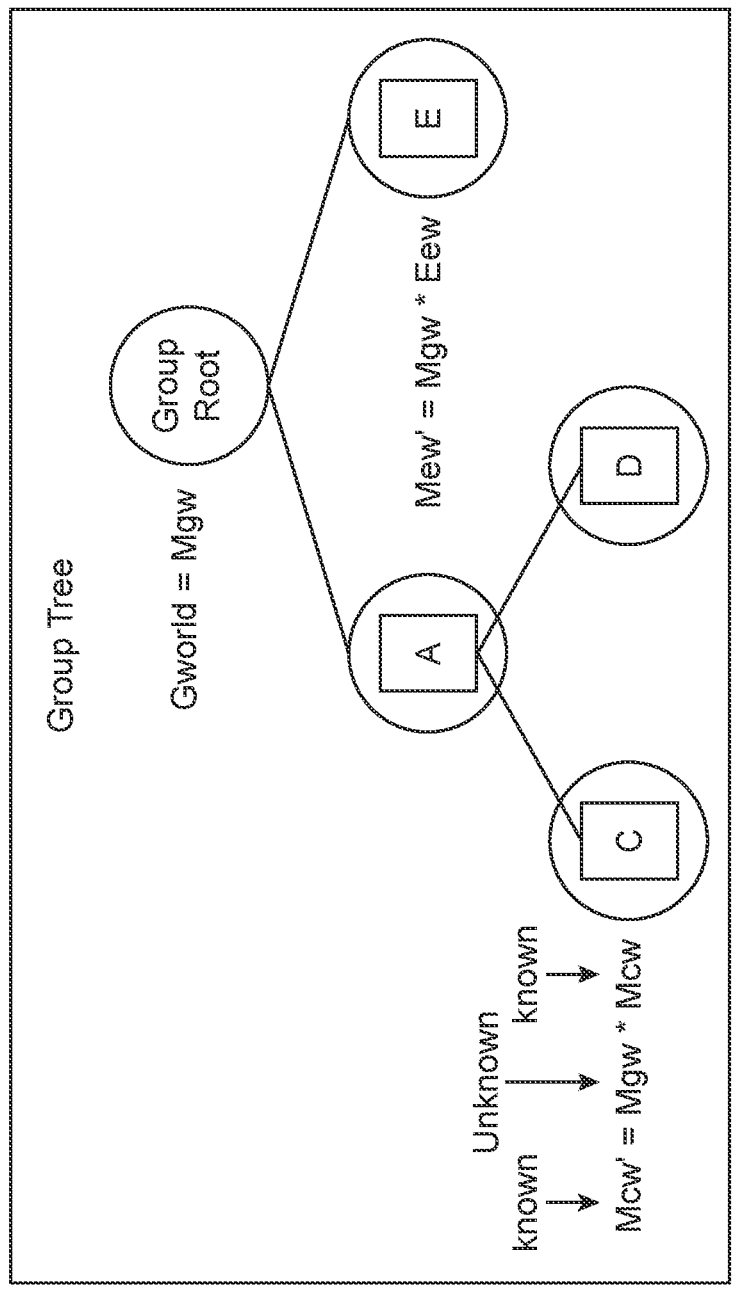

Note that the final world transform of A is what we wanted, Maw'. And since transforms propagate down the transform tree, all children nodes (whether they're part of the same group or not) are updated. This means node B is also updated FIG. 10Z-10AA illustrates a sample calculation, according to some embodiments of the present disclosure. For the given transform tree 1090 and group tree 1092 as depicted in FIG. 10Z, this embodiment applies a transform to node C. Since C belongs in the group, nodes A, D, and E are expected to be transformed with it. Additionally, node B, which does not belong in the group, must also transform with the group because it is a child of A. We are going to denote C's new world matrix as: Mcw', where Mcw' stands for "matrix c world new." We are going to denote C's old world matrix as: Mcw, where Mcw stands for "matrix c world old." We are going to denote the matrix to apply to c to get Maw' as: Mgw, where Mgw stands for "matrix group." The goal is to find a matrix that we can set to the Group Root (Mgw) where when it's applied to node C's world matrix it will equal node C's new matrix. This same matrix is applied to the other immediate children of the Group Room.

In referring to FIG. 10AA, we care about Node C because it's the one whose matrix changed. So Mcw'=Mgw*Mcw. We know Mcw' and Mcw, solve for Mgw. Mgw=Mcw' * Mcw^−1. So, for each child node of the group root, set the world transform of the node to: "Child node new world matrix=Mgw*(child node old world matrix). For this example, recall what Mcw equals (Mcw=Ma1*Mb1*Mc1). Combine that with Mgw=Mcw*Mcw^−1 and we get Mgw=Mcw' *(Ma1*Mb1*Mc1) ^−1 which Mgw=Mcw' *Mc1^−1*Mb1^−1*Ma1 ^−1. And do not forget that since And E are root nodes, Maw=Ma1 and Mew=Mc1. With that, we can find the new transforms of every node. Apply Mgw to the two immediate children of the Group Root, E and A:

(E is a transform tree root node, so Mew==Mc1).

$$Mew' = Mgw * Mew$$
$$= (Mcw' * Mc1\wedge -1 * Mb1\wedge -1 * Ma1\wedge -1) * Mew$$
$$= (Mcw' * Mc1\wedge -1 * Mb\wedge -1 * Ma1\wedge -1) * Me1$$

(A is a transform tree root node, so Maw==Ma1)

$$Maw' = Mgw * Maw$$
$$= (Mcw' * Mc1\wedge -1 * Mb1\wedge -1 * Ma1\wedge -1) * Maw$$
$$= (Mcw' * Mc1\wedge -1 * Mb1\wedge -1 * Ma1\wedge -1) * Ma1$$

(Since A is a parent of other nodes, update the world transforms of the child nodes B and C)

$$Mbw' = Maw' * Mb1$$
$$= (Mcw' * Mc1\wedge -1 * Mb1\wedge -1) * Mb1$$
$$= Mcw' * Mc1\wedge -1$$
$$Mcw' = Mbw' * Mc1$$
$$= (Mcw' * Mc1\wedge -1) * Mc1$$
$$= Mcw'$$

Notice that the final world transform of node C is what we wanted, Mcw'.

In some embodiments, the transform tree and transform group functionality may be implemented within the Universe itself. In some embodiments, other applications (e.g., application(s) 140, icon grid application 260, status bar app 270, social panel app 280, store panel app 290, etc.) may not need this kind of functionality since the Universe may be managing this functionality. Other suitable methods or systems utilizing group trees and/or transforming groups may be used.

Placed Launcher

In some embodiments, users may be able to place a launcher within their landscape where they want to launch an application or pin the launcher persistently. This allows the launcher to be a natural extension of the user's environment and creates a clear connection between the digital and physical world. A placed launcher in its open state may have the same layout and structure as a normal launcher except that it is tied to a location and may be scaled up and/or down. In some embodiments, when a user creates a placed launcher, the user has the option of pinning the launcher persistently to that location. In this case, the launcher may stay in that location until the user moves or removes it. The normal launcher may still spawn when the user hits the home button even if a launcher has been pinned. In some embodiments, users are able to pin multiples launchers (so they may, for example, put them in places they launch content the most). Pinned launchers may show the recent applications that have been launched from that location. This allows each launcher to be tailored to the space that it is in. In some embodiments, the behavior of pinning a launcher application to a location is simulated by the extractable content manager (ECM) which gives the appearance of pinning launcher icons. It does this by literally copying the icon into a separate Prism and allowing the user to move that Prism around.

In some embodiments, since the launcher may be an application and the panels of the launcher carousel and the launcher menus may be presented inside separate Prisms, the Prisms themselves may be placed within the user's landscape.

Figure 11:
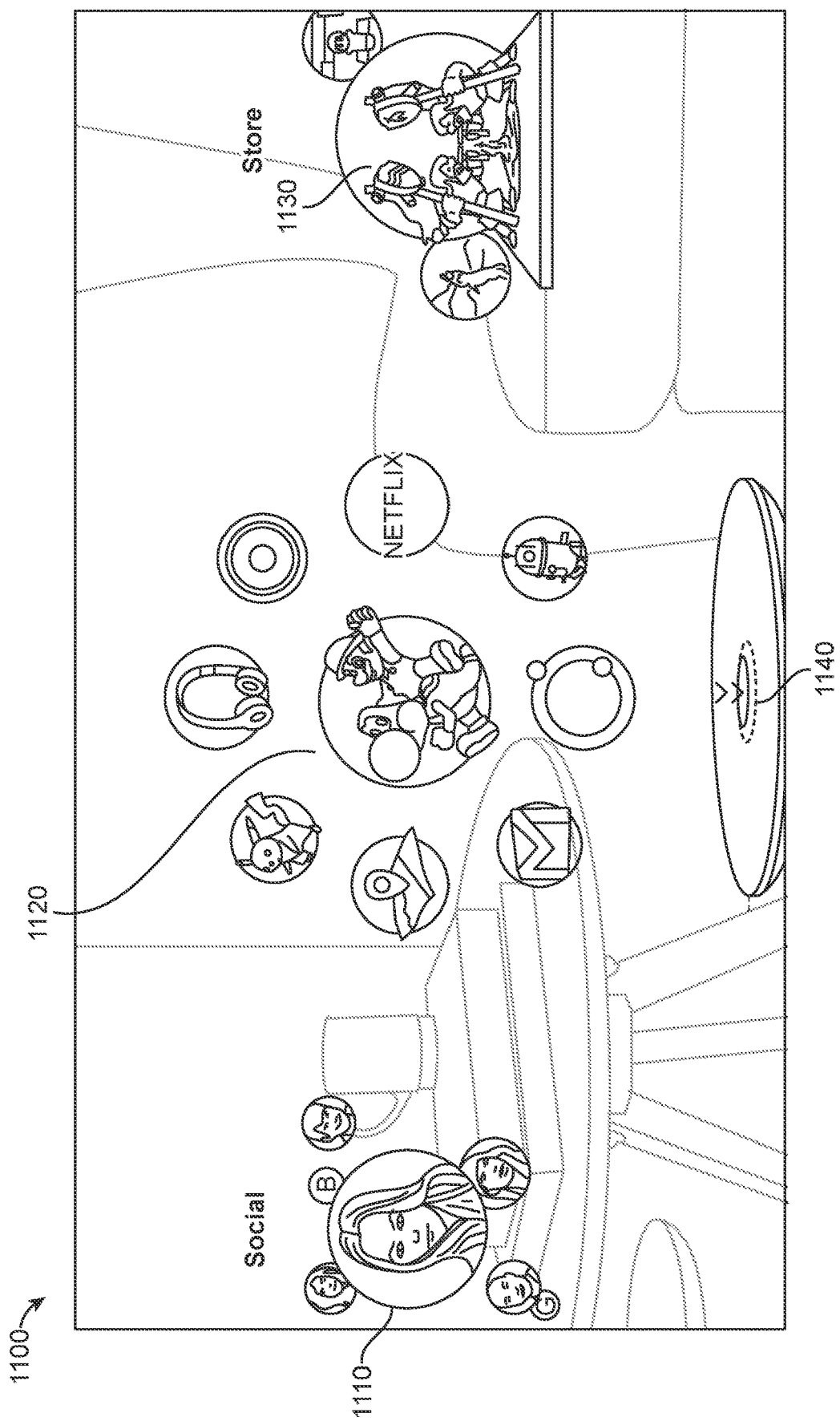
FIG. 11 shows a view of a placed launcher, according to some embodiments.

FIG. 11 shows an example view of a placed launcher, according to some embodiments. As shown in FIG. 11, launcher menu 1100 may include an icon grid panel 1120, a minimized social panel 1110 and a minimized store panel 1130. The icon grid panel 1120 may actively display icons of applications a user may launch with the minimized social panel 1110 to the left and the minimized store panel 1130 to the right of the icon grid panel 1120. An image icon 1140 may indicate to the user that the launcher has been placed at the particular location, in this example, on top of a stool. A different image icon 1140 may indicate a pinned launcher, as opposed to a placed launcher. In some embodiments, different numbers of panels, and/or different content for the panels may be used.

In some embodiments, pinned launcher menus are persistently stored and may remain pinned at the location until the user move or removes the launcher from the location. Even if the user shuts down the mixed reality system, upon restart of the mixed reality system, a launcher menu may be displayed at the location after the system is fully launched, assuming a set of criteria is met, such as the user is in the vicinity of the pinned launcher menu. In some embodiments, applications launched from a placed or pinned launcher, may spawn and display in the same location as the pinned or placed launcher. In some embodiments, once the user selects a landscape application, the launcher may disappear and the application (e.g., a Prism) may appear in the same location.

If the user chooses to pin the launcher persistently to the location, the launcher may remain there and the user may interact with the launcher and launch applications from that location until the user moves or removes the launcher from the location. If the user does not interact with the launcher, it may go into its idle minimize state. When the user is not interacting with the launcher, the state of the placed or pinned launcher may be changed to a minimized/idle state. From here the placed launcher may show things like the time, featured store content, featured social contacts, branded moments/experiences, and/or other content.

Figure 12:
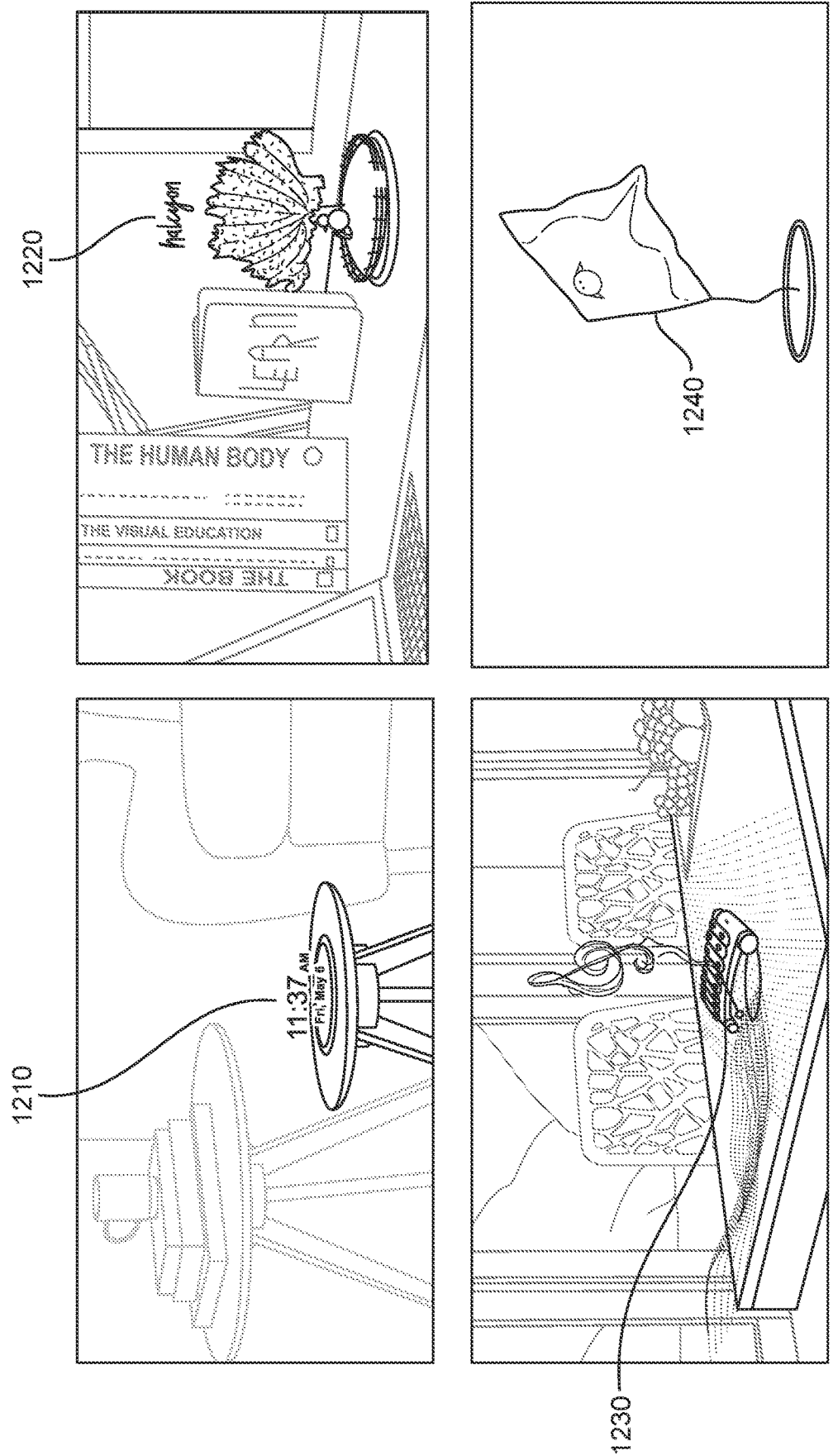
FIG. 12 shows types of content that may be displayed while a launcher is in an idle/sleeping state, according to some embodiments.

FIG. 12 shows example types of content that may be displayed while a placed launcher is in an idle/sleeping state, according to some embodiments. A standard view of the placed launcher in its minimized/sleeping state may display a time 1210 showing the current time and date. When the user hovers over the placed launcher with a head pose and/or clicks/selects the placed launcher, the launcher may change state from sleeping to active and rendering and launch into its full active view, for example, showing at least an icon grid and corresponding panels. In some embodiments, featured store content 1220 may be displayed in place of the standard view time and date 1210. Featured store content 1220 may be a pre-downloaded preview of an application that gives a quick interactive glimpse of the product. Other types of content that may be displayed may include magical experiences such as, for example, a child's toy 1230 or a balloon with daily messages 1240. These magical experiences may include a content and inspiration for users of the device. Artists, musicians and influencers may create these content.

Secondary UI—Application Options Displayed in a Carousel

Figure 13:
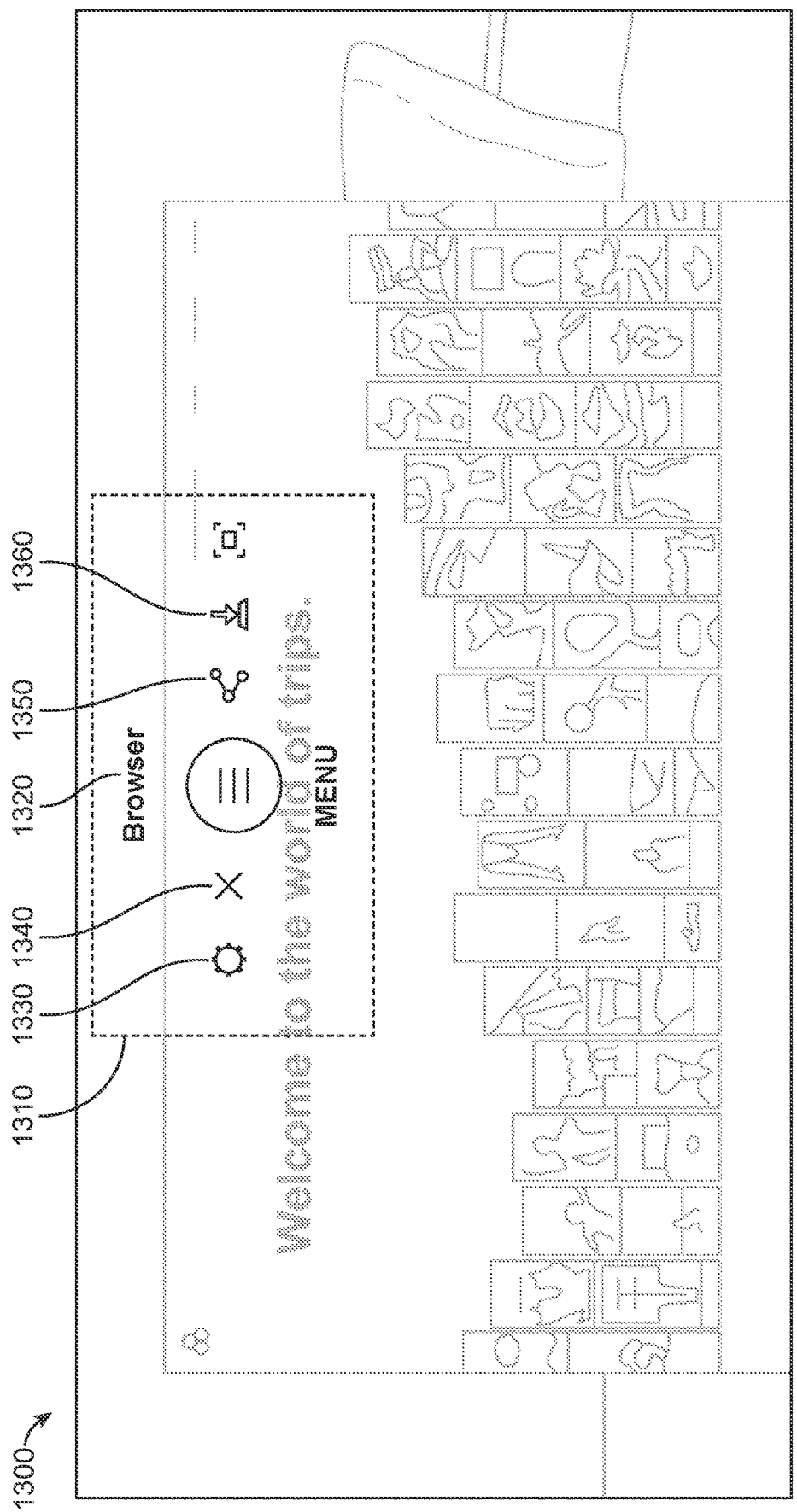
FIG. 13 shows a Secondary UI volume, according to some embodiments.

FIG. 13 shows an example Secondary UI volume, according to some embodiments. Applications options menu 1310 may show the different interactions a user may have with the content provided by an application that is rendered into a Prism. The application options menu 1310 may be displayed within the volumetric space of the Secondary UI volume 220 from FIG. 2. In some embodiments, the application options menu may be a carousel with the center object always highlighted. When the user swipes to the next item, the icon may become more visible and display the appropriate text describing the option. The application title 1320 may help the user to recognize the application that is providing the content. Here, as an example, the application is a 2D Internet browser displaying a web page. The settings 1330 may display the application settings and/or link contextually to the universe settings application. The close application 1340 may close/remove the application from the user's landscape. The share 1350 may allow users to start a sharing session with this application to other users. The download 1360 may download content displayed within the Prism. For example, the user may want to download an article displayed within the 2D Internet browser. One of ordinary skill in the art may appreciate that the application options menu 1310 may include more options or fewer options and could be in a different order than what has been disclosed and shown.

Body Dynamics

Body dynamics refer to how a displayed virtual content, anchored relative to a User's body may be managed and displayed to the user.

Figure 14:
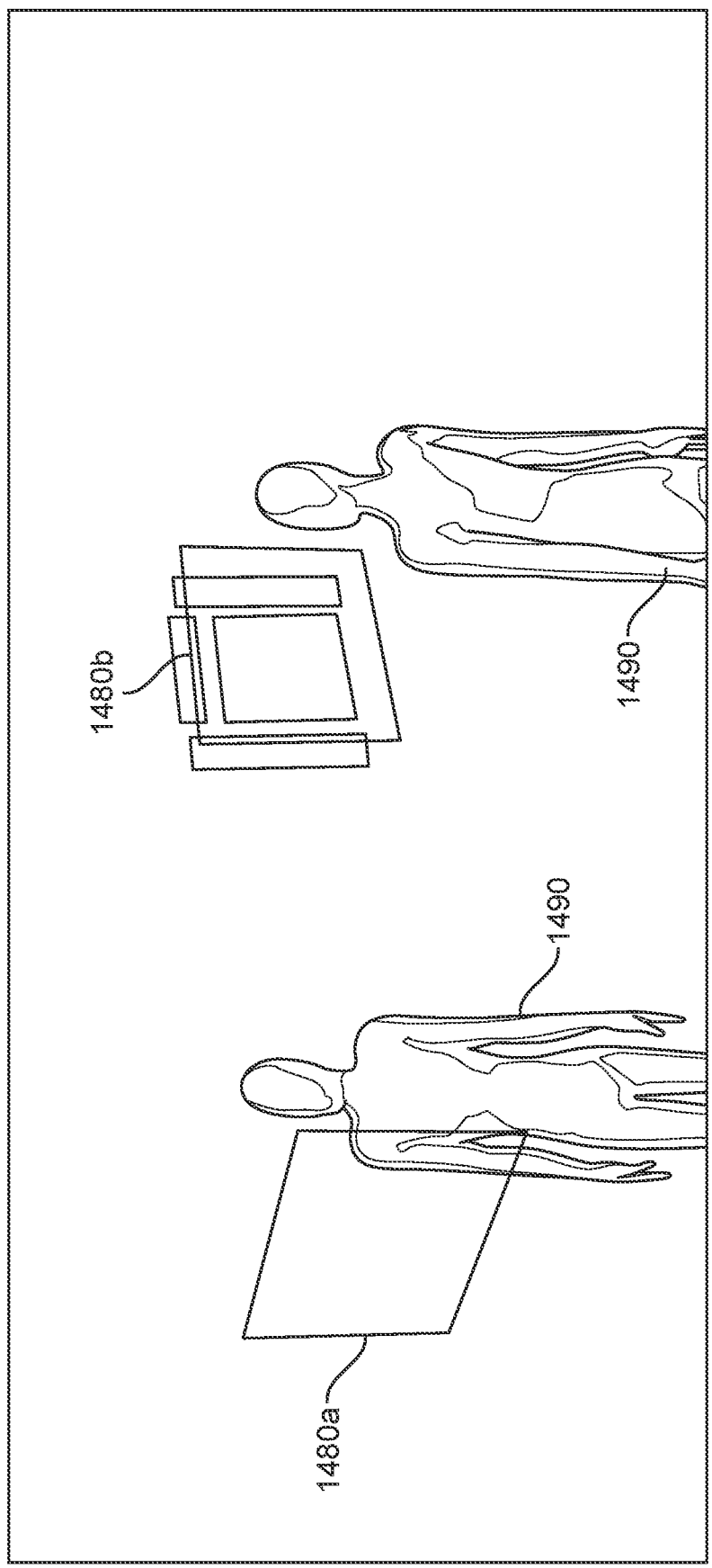
FIG. 14 shows an example of body dynamics, according to some embodiments.

FIG. 14 shows an example of body dynamics, according to some embodiments. Body dynamics may refer to how the user application/user interface/content 1480 moves in relationship to the user 1490. There may be different types of body dynamics that may have different types of user interface effects. The body dynamic types may also be referred to as anchor types for how Prisms and/or applications within the Prisms are anchored and displayed in the user's landscape.

Figure 15:
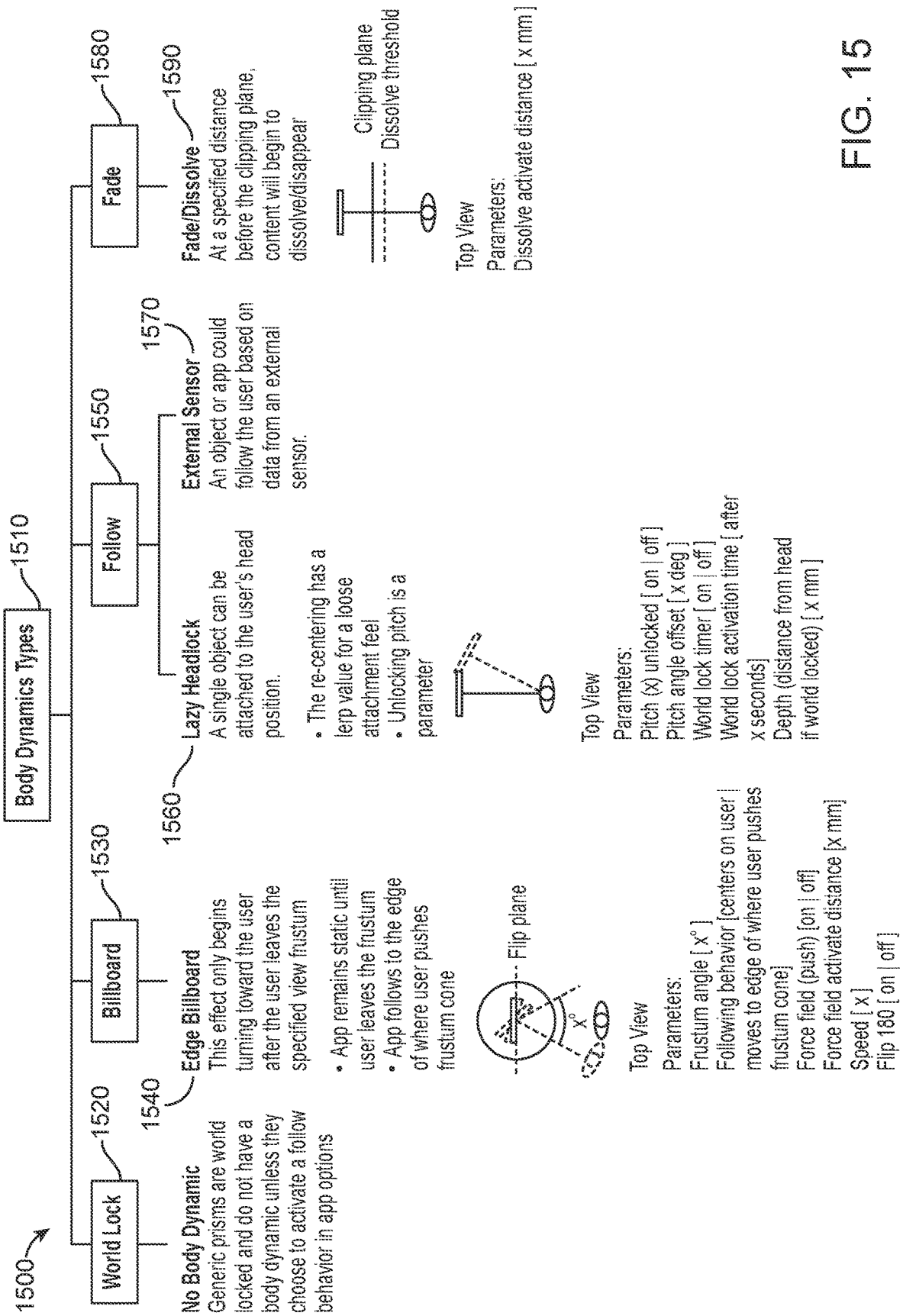
FIG. 15 shows different types of body dynamics, according to some embodiments.

FIG. 15 shows different types of body dynamics, according to some embodiments. One example of a type of body dynamic is a world lock 1520, where there are no body dynamics. In some embodiments, generic Prisms are world locked and may not have a body dynamic unless the user chooses to activate a follow behavior from the application options. Another example of a type of body dynamic is a Billboard 1530. In some embodiments, a billboard is when the angle and/or orientation of the application content changes to maintain a fixed orientation and/or angle relative to the user. The relative angle and/or orientation may be determined any number of ways. For example, the virtual content may have a pre-defined forward or front direction. The system may require the forward vector of the virtual content to point at the user's forward direction, as determined by head pose. In some embodiments, the billboard behavior maintains a fixed location in 3D space, whereas other embodiments, may allow the location to vary. In some embodiments, a billboard dynamic may also include an edge billboard 1540, which only begins turning toward the user if the user would be viewing the content from too oblique of an angle. For example, the application remains static until the user is looking at a web page from a sideways angle that makes the text difficult to read. The application follows to the edge of where the user pushes the frustum cone as projected from the planar surface of the front of a Prism. Parameters for an edge billboard (e.g., application specific parameters) may include a frustum angle, a following behavior such as centers on user or moves to edge of where user pushes frustum cone, a force field (push) Boolean, a force field activate distance, a speed, and/or a flip Boolean.

Body dynamic type of Follow 1550 is another type of body dynamic. In some embodiments, follow 1550 is a specific mode that a single object (e.g., a Prism) may be put in by the user, for example, temporarily attaching the object to the user's head position. This is useful when a user wants an object to move along with their head positions. A feature of follow is that it ignores the pitch (e.g., up/down rotation) of the user's head, which gives the user greater freedom to look around at their physical space. If the user looks to the left or right, the object may re-center in their field of view. In some embodiments, this re-centering has a lerp value, wherein it takes time to move and feels somewhat loosely attached to the user. In some embodiments, the Follow behavior may directly mimic the user's head movement, for example, on a one to one movement. In some embodiments, follow may be accessed and activated by the application options menu on a Prism-by-Prism basis. In some embodiments, the Follow mode may be a default assignment to a Prism and/or be a non-temporary property of the Prism (e.g. fixed as a Follow Prism until a user, for example, changes the Prism properly).

In some embodiments, the Follow 1550 body dynamic type may have one of two settings such as a lazy headlock 1560 and an external sensor 1570. During a lazy headlock 1560 setting, a single object, Prism, or application may be attached to the user's head position, similar to a follow 1550 setting, however, the pitch parameter may be unlocked by the user so that if the user looks up and down, the object may follow as well. During an external sensor 1570 setting, an object, Prism, or application may follow the user based on data from an external sensor. In some embodiments, an inertial measurement unit (IMU) may be included in a belt pack unit of the user. In some embodiments, an IMU is a unit in an electronics module which collects angular velocity and linear acceleration data which is sent to a main processor. The IMU housing may contain two separate sensors. The first sensor may be the accelerometer triad. It may generate three analog signals describing the accelerations along each of its axes produced by and acting on the user. The second sensor may be an angular rate sensor triad. It may also output three analog signals. These signals may describe the user's angular rate about each of the sensor axes. This IMU would allow the mixed reality system to have Prisms that are relative to the body instead of having to be relative to the user's head pose.

For the fade 1580 body dynamic setting, at a specified distance before a clipping plane, content may begin to dissolve/disappear. At the specified distance before the clipping plane, in some embodiments, where the mixed reality system may no longer render content comfortably, and/or as the user gets near that cutoff point, the content should fade out smoothly, rather than turn off abruptly. In some embodiments, fading may occur when the user is close to the clipping plane (e.g., exact measurement may depend upon hardware). Virtual content in the landscape may have this effect when the user passes through or gets too close to the content.

Simultaneously Launching and Placing an Application

In some embodiments, it may be beneficial to simultaneously launch and place an application in a mixed reality environment. In one embodiment, every time a cursor moves over a web page, a browser engine may perform a hit test on the web page content to see what is under the cursor position. The hit test may detect elements in the web page and then analyzes what kind of element it is. Every html element may have different parameters, some of which are common to all elements, some of which are common to multiple elements and some of which are element-specific. In the case of links, the most common and most recommended element is the use of an anchor tag <a href="mylink">. This anchor tag may be used with any element, image or text. At any time, we may request the element type that the cursor is currently on top of. The browser engine may cache the result of the hit test and pass the node or node type to the browser application. In some embodiments, this caching of the results of the hit test may be performed when a user selects a link using an extraction trigger.

In another embodiment, when a cursor is moved over any element in a web page that is clickable, the web engine may call an API to the browser application to request that the cursor change from an "arrow" or "i-beam" to a "hand".

When this API is called, the browser application may then request information about what kind of element the cursor is over.

Figure 16:
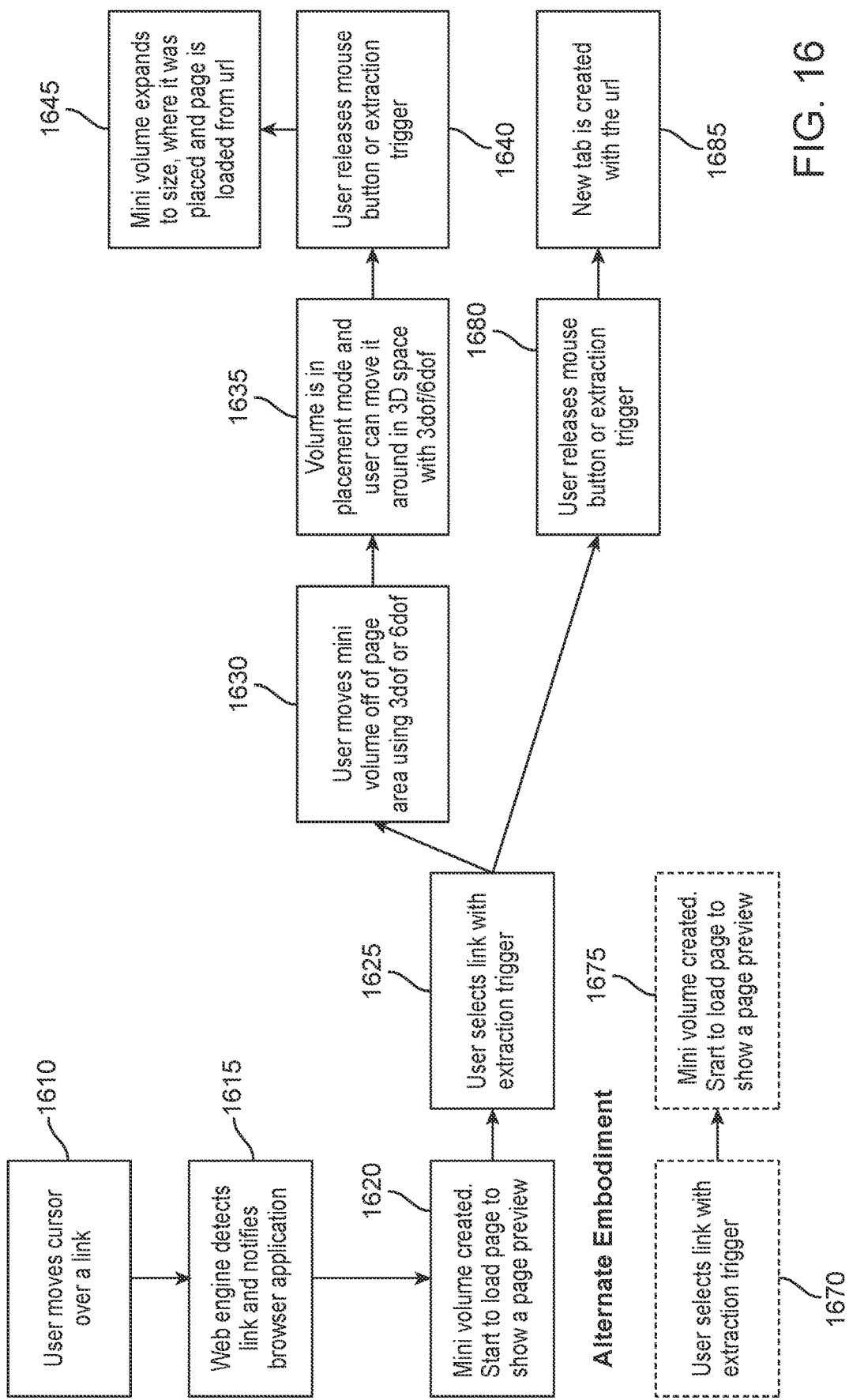
FIG. 16 shows a flowchart for simultaneously launching and placing an application in a mixed reality environment, according to some embodiments.

FIG. 16 shows a flowchart for simultaneously launching and placing an application in a mixed reality environment, according to some embodiments. At 1610, a user may move a cursor over a link from a web page displayed in a browser application displayed inside of a Prism within the user's landscape. The cursor may be moved by either a handheld controller device such as a mouse, a totem, etc. or an eye gaze where the user's eyes may be focused on the web page and sensors from the user's head-mounted system may detect that the user is looking over a link from the web page, or any other suitable method. The link may be a uniform resource locator (URL). The movement of the cursor over the link and/or an eye gaze focusing on a web page (or any other suitable user selection method) having a link may send a user input to an application rendering the content indicating that the user may have an interest in content corresponding to the link.

At 1615, a web engine and/or a browser application may detect links that the user moves over with a cursor or an eye gaze. Upon detecting links, the web engine may notify a browser application that the user may be interested in the content so that the browser application may request the Universe to create a mini display volume (e.g., a mini Prism). The mini Prism may be an initial default size of a standard 3D display volume managing unit (e.g., a Prism) for the purpose of serving as a placeholder Prism for the browser application as the browser application is loading the content from the link into the mini Prism.

At 1620, the Universe creates the mini Prism and starts to load the mini Prism to show a page preview of the content being loaded. At 1625, the user may select the link using an extraction trigger to indicate that the user is interested in viewing the content from which the link is directed to. The use of the extraction trigger may indicate to the application that the user may be very interested in viewing the content corresponding to the link. The browser may cache the result of the hit test and pass the node or node type to the browser application to load the Prism. At 1630, the user may move the mini Prism off of the web page using the handheld controller. This movement of the mini Prism may send a user input to the Universe indicating that the user is moving the mini Prism.

At 1635, the mini Prism is in placement mode and the user may move the mini Prism to place the mini Prism in a location in the user's landscape. At 1640, the user may release the mouse button or extraction trigger to place the mini Prism in a location in the user's landscape. The release of the mouse button or extraction trigger may send a user input to the Universe indicating that the mini Prism is placed at a location in the augmented reality environment (e.g., the user's landscape).

At 1645, the mini Prism may be expanded to regular size (e.g., not the mini Prism size) at the placement location with the page of the link fully loaded within the Prism to be displayed to the user. In effect, the user is able to simultaneously open/launch and place an application in an augmented reality environment by selecting a link and placing a mini Prism of the link in the mixed reality environment while in the background, the mixed reality system is loading and preparing the Prism for display.

In an alternative embodiment, at 1670, after 1615, the user may select the link with an extraction trigger before the mini Prism is requested by the application and created by the Universe at 1675. This may help to reduce system processing of creating a mini Prism before the user actually decide to extract the content from the link for display.

In an alternative embodiment, at 1680, after the user selects the link with the extraction trigger, the user may release the extraction trigger without moving the mini Prism. In this embodiment, at 1685, instead of expanding the mini Prism into the standard size Prism fully loaded with the content from the link, the Universe may just create a new tab within the web browser application using the link, wherein the content of the link has already been loaded and cached when the user selected the link with the extraction trigger equivalent user input.

What has been disclosed is a system and methods for managing and displaying virtual content in a mixed reality environment. In particular, the system and methods disclose a universe application that may function as a 3D windows manager by managing 3D windows, such as Prisms. Prisms are bounded volumes that are positioned in space (e.g. by the user). Applications may render graphics into the Prism via the Universe. The Universe renders the scene graphs, in cooperation with *Kali*, and has full control over the placement, scaling, etc. of each Prism. In some embodiments, the Universe may provide the ability to attach Prisms to walls and surfaces, register Prisms with the passable world system, and/or control sharing of content between multiple users of a mixed reality system. In some embodiments, the Universe also manages the Prisms themselves (e.g., creates Prisms, manages placement and/or snapping rules, provides basic user interface controls—close button, action bar, etc.), does not care what is inside the Prism, and/or keeps track of records of the Prism (e.g., what application owns the Prism, where to place the Prism, how the Prism is anchored—body centric, world fixed, etc.). In some embodiments, Prism behavior may be based, in part, on anchors. In some embodiments, Prism behavior may be based, in part, on placement (e.g. user placement through a user interaction) and/or body dynamics (e.g. billboard, body centric, lazy headlock, etc.).

The Universe may provide even more functionality as a 3D windows manager than the standard 2D windows manager. One or more additional features (e.g. functionality) that the Universe may provide, in some embodiments, as a 3D windows manager (e.g. over a 2D windows manager) may include:

Persistence: An application sitting on a user's kitchen counter may appear on the kitchen counter unless the user changes it. The user may not have to re-launch the application every time the system is turned on/off or every time the user leaves the room and comes back. Since the Universe stores Prism information in the passable world system, the Universe may restart the application sitting on the user's kitchen each time the user uses the mixed reality system and is in a close proximity to the application in the user's kitchen.

Application State relative to user: An application may start, suspend/pause, re-start automatically—no explicit user action required. In contrast to a 2D windows manager, where a user interaction is required in order to change the operation state of an application (e.g., user clicks the close button).

Locality—Real world vs. a 2D windows: A 2D windows manager may be restricted to a screen, regardless of where the screen may be placed. However, in a mixed reality environment, an application may be placed in context to the real world, for example, relative to something else like a physical object in the user's environment, the user's body, a fixed location, etc.

Physicality: Prisms may move. Therefore, the movement and tracking of the movement of the Prisms needs to be managed (e.g., billboarding to user/body-centric, lazy billboarding, sway when move, collision bounce, etc.).

Private but interactable: 2D windows are private but they don't interact, or they interact but are not private. However, the Universe may enable both privacy and interaction of the 3D windows (e.g., Prisms).

ADDITIONAL EMBODIMENTS

Additional embodiments of the disclosure are described below. These additional embodiments may incorporate elements from the embodiments disclosed above.

1. A method for starting a mixed reality system, the method comprising:
   determining a current location of a user;
   retrieving one or more prisms previously deployed at the current location;
   restoring the one or more prisms at the current location of the user; and
   displaying the one or more prisms restored at the current location of the user.

2. The method of embodiment 1, wherein a prism is a volume of space that virtual content from an application is contained within.

3. The method of embodiment 2, wherein the application is an application instance of the application when the application renders into more than one prism.

4. The method of embodiment 1, wherein a prism represents a portion of a scene graph, the scene graph corresponding to the current location of the user.

5. The method of embodiment 4, wherein the scene graph comprises data from a first application and a second application 6. The method of embodiment 1, wherein retrieving the one or more prisms previously deployed at the current location comprises:
   retrieving instance data for the one or more prisms from an external database; and
   reconstructing a local prism database with the instance data for the one or more prisms.

7. The method of embodiment 6, wherein the instance data for each prism includes a data structure of prism properties defining the prism, the prism properties comprising at least one of a location, an orientation, an extent width, an extent height, an extent depth, a body dynamic, an anchor type, or an anchor position.

8. The method of embodiment 7, wherein the instance data for each prism include data of application specific properties comprising state information of virtual content previously rendered into the prism by an application.

9. The method of embodiment 1, wherein restoring the one or more prisms comprises:
   launching respective applications corresponding to the one or more prisms previously deployed at the current location;
   creating one or more new prisms corresponding to the one or more prisms previously deployed; and
   rendering respective virtual content into the one or more new prisms.

10. The method of embodiment 9, further comprising displaying placeholder prisms at locations corresponding to locations of the one or more prisms previously deployed and displaying the one or more prisms further comprises replacing respective placeholder prisms with the one or more new prisms having the respective virtual content.

11. The method of embodiment 1, further comprising:

updating the local prism database of the user with updated prism instance data as the user interacts with the one or more prisms; and synchronizing the local prism database with the external database.

12. A method for displaying virtual content in a 3D spatial environment, the method comprising:

receiving, from an application, a request to display a virtual content in a 3D spatial environment;

creating a prism, wherein the prism is a volume of space configured to bound the virtual content inside a boundary of the prism;

receiving the virtual content from the application;

rendering the virtual content inside the boundaries of the prism; and associating the prism to an object in the 3D spatial environment.

13. The method of embodiment 12, wherein boundaries of the prism are not displayed.

14. The method of embodiment 12, wherein the 3D spatial environment is a physical real world environment of a user.

15. The method of embodiment 12, wherein the prism is created automatically having a set of functionalities.

16. The method of embodiment 15, wherein the set of functionalities comprises an association between the prism to the object in the 3D spatial environment.

17. The method of embodiment 15, wherein the set of functionalities comprises one or more of a minimum size allowed for the prism, maximum size allowed for the prism, and an aspect ratio for resizing the prism.

18. The method of embodiment 12, wherein the application renders a first virtual content into a first prism and a second virtual content into a second prism, the first prism and the second prism being different prisms.

19. The method of embodiment 18, wherein the prism does not overlap with other prisms in the 3D spatial environment.

20. The method of embodiment 12, wherein the prism is placed in context to an object in the 3D spatial environment.

21. The method of embodiment 20, wherein the object is a user of an augmented reality device.

22. The method of embodiment 12, wherein the prism comprises:

one or more universal features;

one or more application-specific features; and wherein the one or more universal features and the one or more application-specific features are selected from a list of pre-approved options.

23. The method of embodiment 22, wherein the one or more universal features ensure different applications interact in a consistent manner with one another.

24. A method for managing application states of virtual content in a mixed reality system, the method comprising:

segmenting a 3D volume into a volumetric grid;

determining a first location of a user within the volumetric grid;

determining a second location of an application within the 3D volume;

calculating a distance between the user and the application within the 3D volume; and modifying a state of the application based at least in part on the distance calculated between the user and the application.

25. The method of embodiment 24, wherein a radius of an active zone defines a circular/spherical area around the user using a mixed reality device.

26. The method of embodiment 25, further comprising a buffer zone around an exterior of the active zone, wherein the buffer zone prevents intermittent or rapid changes to the state of the applications.

27. The method of embodiment 24, wherein modifying the state of the application is based at least in part on whether the application is occluded by another application.

28. The method of embodiment 24, wherein modifying the state of the application is based at least in part on a head pose of the user.

29. The method of embodiment 24, wherein the distance of known positions of applications within the cell is determined only for the cell the user using the mixed reality device is in and the neighboring cells.

30. A method for opening and placing an application in an augmented reality environment, the method comprising:

receiving a first user input from a user indicating a request for new content;

launching an application to generate the content;

creating a mini display volume of a 3D display volume managing unit, wherein a page preview is displayed in the mini display volume, wherein the 3D display volume managing unit is created simultaneously with the launching of the application;

receiving a second user input indicating a movement of the mini display volume;

receiving a third user input indicating a placement of the mini display volume at a location in the augmented reality environment; and expanding the 3D display volume managing unit in place of the mini display volume at the location, the 3D display volume managing unit displaying the content fully loaded within the 3D display volume managing unit.

31. The method of embodiment 30, wherein the first user input is a cursor movement over a link on a web page.

32. The method of embodiment 31, wherein the second user input is a selection of the link, and movement of the mini display volume.

33. The method of embodiment 30, wherein the 3D display volume managing unit replaces the mini display when the 3D display volume managing unit expands in place of the mini display.

34. The method of embodiment 30, wherein the content is loaded into the 3D display volume managing unit while the user is moving the mini display.

35. The method of embodiment 30, wherein the location is fixed to an object in the augmented reality environment.

36. The method of embodiment 35, wherein the object is the user.

37. A method for managing virtual content, the method comprising:

receiving content from a content generating application;

displaying the content in a 3D spatial environment by a universe application; and constantly managing the display of the content in the 3D spatial environment by the universe application.

38. A system, method, and computer program product for managing and displaying virtual content in a mixed reality system according to any of the inventive concepts disclosed herein.

39. The system, method, and computer program product of embodiment 38, further comprising displaying virtual content within a sub-set of available 3D displayable space by displaying the virtual content within a volumetric display space, wherein boundaries of the volumetric display space are not displayed.

40. The system, method, and computer program product of embodiment 38, further comprising assigning to a Prism universal features and application selected features from a list of pre-approved options for configurations of display customizations by an application.

41. The system, method, and computer program product of embodiment 38, further comprising displaying virtual content into one or more Prisms, wherein the one or more Prisms do not overlap with one another.

42. The system, method, and computer program product of embodiment 38, further comprising changing a state of a Prism based at least in part on a relative position and location of the Prism to a user.

43. The system, method, and computer program product of embodiment 38, further comprising managing content creation in an application and managing content display in a separate application.

44. The system, method, and computer program product of embodiment 38, further comprising while placing a Prism in a mixed reality environment, opening an application that will provide content into the Prism.

45. The system, method, and computer program product of embodiment 38, further comprising assigning location, orientation, and extent data to a Prism for displaying virtual content within the Prism, the virtual content is 3D virtual content.

46. The system, method, and computer program product of embodiment 45, wherein the location is a coordinate of an anchor position of the Prism in a mixed reality environment.

47. The system, method, and computer program product of embodiment 45, wherein the orientation defines how the Prism is rotated relative to an object, wherein the object is a wall.

48. The system, method, and computer program product of embodiment 45, wherein the extent data defines a size of the Prism.

49. The system, method, and computer program product of embodiment 38, further comprising pinning a launcher application to a real world object within a mixed reality environment.

50. The system, method, and computer program product of embodiment 49, wherein the pinned launcher application launches content of the application within a Prism in a same location as the pinned launcher application.

51. The system, method, and computer program product of embodiment 38, further comprising assigning behavior type to each Prism, the behavior type comprising at least one of a world lock, a billboard, an edge billboard, a follow headlock, a follow based on external sensor, or a fade.

52. The system, method, and computer program product of embodiment 38, further comprising identifying a most used content specific to a placed location of a launcher application.

53. The system, method, and computer program product of embodiment 38, further comprising displaying favorite applications, by a placed launcher application, the favorite applications based at least in part on context relative to a location of the placed launcher.

54. A method comprising:
 accessing a scene graph for a scene, wherein the scene graph comprises one or more transform trees, each tree comprising a plurality of nodes;
 adding a tag to one or more nodes from a plurality of nodes within the one or more transform trees, wherein the one or more nodes tagged form a transform group, wherein the one or more nodes tagged comprise a first tagged node and a second tagged node; and
 moving the first tagged node, wherein moving the first tagged node causes the second tagged node to move.

55. A method of embodiment 54, wherein the second tagged node is not a direct descendant of the first tagged node.

56. A method of embodiment 54, wherein the first tagged node and second tagged node are not from a same transform tree.

57. A method of embodiment 54, wherein the plurality of nodes comprises a first node and a second node, the method further comprising parenting the first node to the second node, wherein parenting the first node to the second node does not cause the parented node to move.

58. A method of displaying virtual content in a 3D shared space, the method comprising:
 generating, by a first application, virtual content in the 3D shared space; and
 displaying, by a second application, the virtual content generated by the first application, the first application and the second application being different applications.

System Architecture Overview

Figure 17:
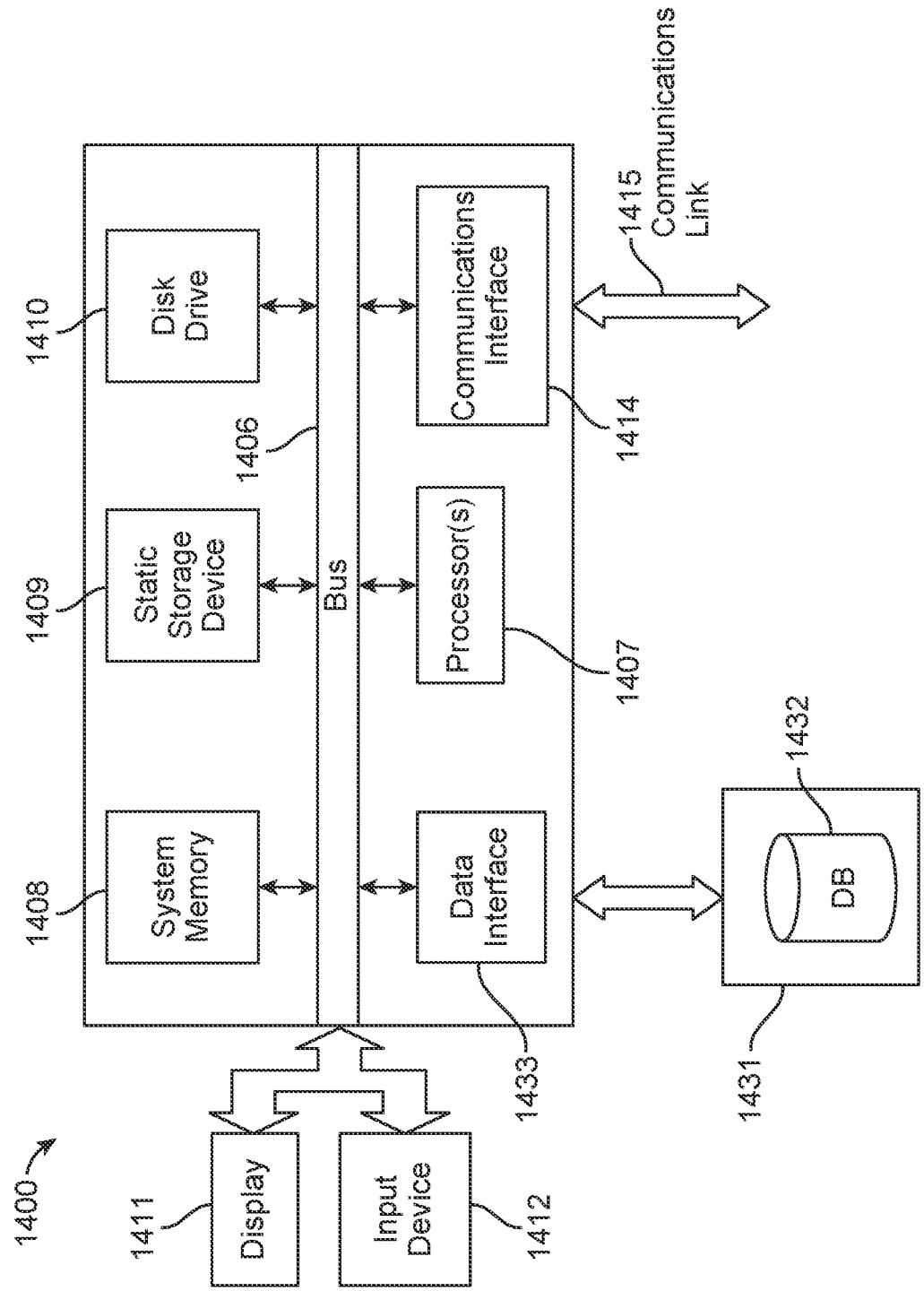
FIG. 17 is a block diagram of an illustrative computing system 1400 suitable for implementing one or more of the embodiments of the present disclosure.

FIG. 17 is a block diagram of an illustrative computing system 1400 suitable for implementing one or more of the embodiments of the present disclosure. The computing system 1400 includes a bus 1406 or other communication mechanism for communicating information, which interconnects subsystems and devices, such as a processor 1407, a main memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., CRT or LCD), an input device 1412 (e.g., keyboard), and cursor control.

According to some embodiments, the computing system 1400 performs specific operations by the processor 1407 executing one or more sequences of one or more instructions contained in the main memory 1408. Such instructions may be read into the main memory 1408 from another computer readable/usable medium, such as the static storage device 1409 or the disk drive 1410. In alternative embodiments, hard-wired circuitry may be used in place of or in combination with software instructions to implement the disclosure. Thus, embodiments are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the main memory 1408. In some embodiments, the system may use a solid state drive (SSD) memory.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In one embodiment, execution of the sequences of instructions to practice the disclosure is performed by a single computing system 1400. According to other embodiments, two or more computing systems 1400 coupled by a communications link 1415 (e.g., LAN, PTSN, or wireless network) may perform the sequence of instructions required to practice the disclosure in coordination with one another.

The computing system 1400 may transmit and receive messages, data, and instructions, including program, e.g., application code, through the communications link 1415 via the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for displaying virtual content in a 3D spatial environment, the method comprising:
   receiving, from an application, a request to display a virtual content in a 3D spatial environment;
   creating a prism, wherein the prism is a volume of space configured to bound the virtual content inside a boundary of the prism, the prism having pre-programmed key-values callable by the application for managing the display of the virtual content by the application;
   receiving the virtual content from the application; and
   rendering the virtual content inside the boundaries of the prism.

2. The method of claim 1, wherein boundaries of the prism are not displayed.

3. The method of claim 1, wherein the 3D spatial environment is a physical real world environment of a user.

4. The method of claim 1, wherein the prism is created automatically having a set of functionalities.

5. The method of claim 1, further comprising:
   associating the prism to an object in the 3D spatial environment.

6. The method of claim 5, wherein the prism is created automatically having a set of functionalities and the set of functionalities comprises an association between the prism and the object in the 3D spatial environment.

7. The method of claim 6, wherein the set of functionalities further comprises one or more of: a minimum size allowed for the prism; maximum size allowed for the prism; and an aspect ratio for resizing the prism.

8. The method of claim 1, further comprising:
   creating a second prism different from the prism, wherein the second prism is a 3D volume of space configured to provide an outer boundary for the display of a second virtual content therein; and
   the application rendering the second virtual content into the second prism.

9. The method of claim 8, wherein the prism and the second prism do not overlap with each other.

10. The method of claim 1, wherein the prism is placed in context to an object in the 3D spatial environment.

11. The method of claim 10, wherein the object is a user of an augmented reality device.

12. The method of claim 1, wherein the prism comprises:
    one or more universal features;
    one or more application-specific features; and
    wherein the one or more universal features and the one or more application-specific features are selected from a list of pre-approved options.

13. The method of claim 12, wherein the one or more universal features ensure different applications interact in a consistent manner with one another.

14. The method of claim 1, wherein the prism occupies less than an entire user's landscape being displayed to a user.

15. A display system for displaying virtual content in a 3D spatial environment, the display system comprising:
    an augmented reality head-mounted display system; and
    one or more modules for processing data, wherein the one or more modules are stored in one or more memory, the one or more modules configured to perform the following process:
    receiving, from an application, a request to display a virtual content in a 3D spatial environment,
    creating a prism, wherein the prism is a volume of space configured to bound the virtual content inside a boundary of the prism, the prism having pre-programmed key-values callable by the application for managing the display of the virtual content by the application,
    receiving the virtual content from the application, and
    rendering the virtual content inside the boundaries of the prism.

16. The display system of claim 15, wherein boundaries of the prism are not displayed.

17. The display system of claim 15, wherein the 3D spatial environment is a physical real world environment of a user.

18. The display system of claim 15, wherein the prism is created automatically having a set of functionalities.

19. The display system of claim 15, wherein the process further comprises:
    associating the prism to an object in the 3D spatial environment.

20. The display system of claim 19, wherein the prism is created automatically having a set of functionalities and the set of functionalities comprises an association between the prism and the object in the 3D spatial environment.

21. The display system of claim 20, wherein the set of functionalities further comprises one or more of: a minimum size allowed for the prism; maximum size allowed for the prism; and an aspect ratio for resizing the prism.

22. The display system of claim 15, wherein the process further comprises:
    creating a second prism different from the prism, wherein the second prism is a 3D volume of space configured to provide an outer boundary for the display of a second virtual content therein; and
    the application rendering the second virtual content into the second prism.

23. The display system of claim 22, wherein the prism and the second prism do not overlap with each other.

24. The display system of claim 15, wherein the prism is placed in context to an object in the 3D spatial environment.

25. The display system of claim 24, wherein the object is a user of an augmented reality device.

26. The display system of claim 15, wherein the prism comprises:
    one or more universal features;
    one or more application-specific features; and
    wherein the one or more universal features and the one or more application-specific features are selected from a list of pre-approved options.

27. The display system of claim 26, wherein the one or more universal features ensure different applications interact in a consistent manner with one another.

28. The display system of claim 15, wherein the prism occupies less than an entire user's landscape being displayed to the user.

\* \* \* \* \*